US010402649B2

(12) United States Patent
Rabinovich et al.

(10) Patent No.: US 10,402,649 B2
(45) Date of Patent: Sep. 3, 2019

(54) AUGMENTED REALITY DISPLAY DEVICE WITH DEEP LEARNING SENSORS

(71) Applicant: Magic Leap, Inc., Plantation, FL (US)

(72) Inventors: Andrew Rabinovich, San Francisco, CA (US); Tomasz Jan Malisiewicz, Mountain View, CA (US); Daniel DeTone, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/683,664

(22) Filed: Aug. 22, 2017

(65) Prior Publication Data

US 2018/0053056 A1 Feb. 22, 2018

Related U.S. Application Data

(60) Provisional application No. 62/377,835, filed on Aug. 22, 2016.

(51) Int. Cl.
*G06F 1/16* (2006.01)
*G06F 3/01* (2006.01)
(Continued)

(52) U.S. Cl.
CPC .......... *G06K 9/00671* (2013.01); *A63F 13/00* (2013.01); *A63F 13/211* (2014.09); *A63F 13/212* (2014.09); *A63F 13/213* (2014.09); *G06F 1/163* (2013.01); *G06F 3/011* (2013.01); *G06F 3/0338* (2013.01);
(Continued)

(58) Field of Classification Search
CPC ........ G06F 3/011; G06N 3/0454; G06N 3/08; G06N 3/04; G02B 27/017; G06K 9/00255; G06K 9/00671; G06K 9/6256; G06K 9/00288
See application file for complete search history.

(56) References Cited

U.S. PATENT DOCUMENTS 5,291,560 A   3/1994 Daugman
5,583,795 A  12/1996 Smyth
(Continued)

FOREIGN PATENT DOCUMENTS

WO   WO 2014/182769   11/2014
WO   WO 2015/164807   10/2015
WO   WO 2018/039269    3/2018

OTHER PUBLICATIONS

"Deep Learning", Wikipedia, printed Apr. 27, 2016, in 40 pages. URL:https://en.wikipedia.org/wiki/Deep_learning#Deep_neural_networks.
(Continued)

*Primary Examiner* — Charles V Hicks
(74) *Attorney, Agent, or Firm* — Knobbe, Martens, Olson & Bear, LLP

(57) ABSTRACT

A head-mounted augmented reality (AR) device can include a hardware processor programmed to receive different types of sensor data from a plurality of sensors (e.g., an inertial measurement unit, an outward-facing camera, a depth sensing camera, an eye imaging camera, or a microphone); and determining an event of a plurality of events using the different types of sensor data and a hydra neural network (e.g., face recognition, visual search, gesture identification, semantic segmentation, object detection, lighting detection, simultaneous localization and mapping, relocalization).

10 Claims, 63 Drawing Sheets

(51) Int. Cl.
*G06K 9/00* (2006.01)
*G06K 9/62* (2006.01)
*G06N 3/00* (2006.01)
*G06N 3/04* (2006.01)
*G06N 3/08* (2006.01)
*G06N 5/00* (2006.01)
*G06N 7/00* (2006.01)
*A63F 13/00* (2014.01)
*G02B 27/01* (2006.01)
*A63F 13/211* (2014.01)
*A63F 13/212* (2014.01)
*A63F 13/213* (2014.01)
*A63F 13/428* (2014.01)
*G06F 3/0338* (2013.01)
*G06F 3/0346* (2013.01)
*G06F 3/0484* (2013.01)

(52) U.S. Cl.
CPC ........ *G06F 3/0346* (2013.01); *G06F 3/04842* (2013.01); *G06K 9/00255* (2013.01); *G06K 9/00288* (2013.01); *G06K 9/6256* (2013.01); *G06N 3/006* (2013.01); *G06N 3/04* (2013.01); *G06N 3/0445* (2013.01); *G06N 3/0454* (2013.01); *G06N 3/08* (2013.01); *A63F 13/428* (2014.09); *G02B 27/017* (2013.01); *G06N 5/003* (2013.01); *G06N 7/005* (2013.01)

(56) References Cited

U.S. PATENT DOCUMENTS

| | | |
|---|---|---|
| 6,850,221 B1 | 2/2005 | Tickle |
| 7,771,049 B2 | 8/2010 | Knaan et al. |
| 7,970,179 B2 | 6/2011 | Tosa |
| 8,098,891 B2 | 1/2012 | Lv et al. |
| 8,341,100 B2 | 12/2012 | Miller et al. |
| 8,345,984 B2 | 1/2013 | Ji et al. |
| 8,363,783 B2 | 1/2013 | Gertner et al. |
| 8,845,625 B2 | 9/2014 | Angeley et al. |
| 8,950,867 B2 | 2/2015 | Macnamara |
| 9,081,426 B2 | 7/2015 | Armstrong |
| 9,141,916 B1 | 9/2015 | Corrado et al. |
| 9,215,293 B2 | 12/2015 | Miller |
| 9,262,680 B2 | 2/2016 | Nakazawa et al. |
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 9,430,829 B2 | 8/2016 | Madabhushi et al. |
| 9,470,906 B2 | 10/2016 | Kaji et al. |
| 9,547,174 B2 | 1/2017 | Gao et al. |
| 9,671,566 B2 | 6/2017 | Abovitz et al. |
| 9,740,006 B2 | 8/2017 | Gao |
| 9,791,700 B2 | 10/2017 | Schowengerdt et al. |
| 9,851,563 B2 | 12/2017 | Gao et al. |
| 9,857,591 B2 | 1/2018 | Welch et al. |
| 9,874,749 B2 | 1/2018 | Bradski et al. |
| 2004/0130680 A1 | 7/2004 | Zhou et al. |
| 2006/0088193 A1 | 4/2006 | Muller et al. |
| 2006/0147094 A1 | 7/2006 | Yoo |
| 2007/0140531 A1 | 6/2007 | Hamza |
| 2011/0182469 A1 | 7/2011 | Ji et al. |
| 2012/0127062 A1 | 5/2012 | Bar-Zeev et al. |
| 2012/0163678 A1 | 6/2012 | Du et al. |
| 2013/0082922 A1 | 4/2013 | Miller |
| 2013/0117377 A1 | 5/2013 | Miller |
| 2013/0125027 A1 | 5/2013 | Abovitz |
| 2013/0128230 A1 | 5/2013 | Macnamara |
| 2014/0071539 A1 | 3/2014 | Gao |
| 2014/0177023 A1 | 6/2014 | Gao et al. |
| 2014/0218468 A1 | 8/2014 | Gao et al. |
| 2014/0267420 A1 | 9/2014 | Schowengerdt et al. |
| 2014/0270405 A1 | 9/2014 | Derakhshani et al. |
| 2014/0279774 A1 | 9/2014 | Wang et al. |
| 2014/0306866 A1 | 10/2014 | Miller et al. |
| 2014/0380249 A1 | 12/2014 | Fleizach |
| 2015/0016777 A1 | 1/2015 | Abovitz et al. |
| 2015/0103306 A1 | 4/2015 | Kaji et al. |
| 2015/0117760 A1 | 4/2015 | Wang et al. |
| 2015/0125049 A1 | 5/2015 | Taigman et al. |
| 2015/0134583 A1 | 5/2015 | Tamatsu et al. |
| 2015/0170002 A1 | 6/2015 | Szegedy et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0268415 A1 | 9/2015 | Schowengerdt et al. |
| 2015/0278642 A1 | 10/2015 | Chertok et al. |
| 2015/0301599 A1 | 10/2015 | Miller |
| 2015/0302652 A1 | 10/2015 | Miller et al. |
| 2015/0326570 A1 | 11/2015 | Publicover et al. |
| 2015/0338915 A1 | 11/2015 | Publicover et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0034811 A1 | 2/2016 | Paulik et al. |
| 2016/0035078 A1 | 2/2016 | Lin et al. |
| 2016/0098844 A1 | 4/2016 | Shaji et al. |
| 2016/0104053 A1 | 4/2016 | Yin et al. |
| 2016/0104056 A1 | 4/2016 | He et al. |
| 2016/0135675 A1 | 5/2016 | Du et al. |
| 2016/0162782 A1 | 6/2016 | Park |
| 2017/0053165 A1 | 2/2017 | Kaehler |
| 2018/0018451 A1 | 1/2018 | Spizhevoy et al. |
| 2018/0018515 A1 | 1/2018 | Spizhevoy et al. |
| 2018/0082172 A1* | 3/2018 | Patel ................... G06N 3/0472 |

OTHER PUBLICATIONS

"Camera Calibration and 3D Reconstruction", OpenCV, retrieved May 5, 2016, from <http://docs.opencv.org/2.4/modules/calib3d/doc/camera_calibration_and_3d_reconstruction.html> in 53 pages.
"Camera calibration with OpenCV", OpenCV, retrieved May 5, 2016, in 7 pages. URL:http://docs.opencv.org/3.1.0/d4/d94/tutorial_camera_calibration.html#gsc.tab=0.
"Camera calibration with OpenCV", OpenCV, retrieved May 5, 2016, in 12 pages. URL:http://docs.opencv.org/2.4/doc/tutorials/calib3d/camera_calibration/camera_calibration.html.
"Convolution", Wikipedia, accessed Oct. 1, 2017, in 17 pages. URL:https://en.wikipedia.org/wiki/Convolution.
"Feature Extraction Using Convolution", Ufldl, printed Sep. 1, 2016, in 3 pages. URL:http://deeplearning.stanford.edu/wiki/index.php/Feature_extraction_using_convolution.
"Machine Learning", Wikipedia, printed Oct. 3, 2017, in 14 pages. URL:https://en.wikipedia.org/wiki/Machine_learning.
"Transfer Function Layers", GitHub, Dec. 1, 2015, in 13 pages; accessed URL:http://github.com/torch/nn/blob/master/doc/transfer.md.
Adegoke et al., "Iris Segmentation: A Survey", Int J Mod Engineer Res. (IJMER) (Aug. 2013) 3(4): 1885-1889.
Anthony, S., "MIT releases open-source software that reveals invisible motion and detail in video", Extreme Tech, Feb. 28, 2013, as archived Aug. 4, 2017, in 5 pages.
Arevalo J. et al., "Convolutional neural networks for mammography mass lesion classification", in *Engineering in Medicine and Biology Society* (EMBC); 37th Annual International Conference IEEE, Aug. 25-29, 2015, pp. 797-800.
Aubry M. et al., "Seeing 3D chairs: exemplar part-based 2D-3D alignment using a large dataset of CAD models", Proceedings of the IEEE Conference on Computer Vision and Pattern Recognition (Jun. 23-28, 2014); Computer Vision Foundation—Open Access Version in 8 pages.
Badrinarayanan et al., "SegNet: A Deep Convolutional Encoder-Decoder Architecture for Image Segmentation", IEEE (Dec. 8, 2015); arXiv: eprint arXiv:1511.00561v2 in 14 pages.
Bansal A. et al., "Marr Revisited: 2D-3D Alignment via Surface Normal Prediction", Proceedings of the IEEE Conference on Computer Vision and Pattern Recognition (Jun. 27-30, 2016) pp. 5965-5974.

(56) References Cited

OTHER PUBLICATIONS

Belagiannis V. et al., "Recurrent Human Pose Estimation", In Automatic Face & Gesture Recognition; 12th IEEE International Conference—May 2017, arXiv eprint arXiv:1605.02914v3; (Aug. 5, 2017) Open Access Version in 8 pages.

Bell S. et al., "Inside-Outside Net: Detecting Objects in Conte t with Skip Pooling and Recurrent Neural Networks", In Proceedings of the IEEE Conference on Computer Vision and Pattern Recognition, Jun. 27-30, 2016; pp. 2874-2883.

Biederman I., "Recognition-by-Components: A Theory of Human Image Understanding", Psychol Rev. (Apr. 1987) 94(2): 115-147.

Bouget, J., "Camera Calibration Toolbox for Matlab" Cal-Tech, Dec. 2, 2013, in 5 pages. URL:https://www.vision.caltech.edu/bouguetj/calib_doc/index.html#parameters.

Bulat A. et al., "Human pose estimation via Convolutional Part Heatmap Regression", arXiv e-print arXiv:1609.01743v1, Sep. 6, 2016 in 16 pages.

Carreira J. et al., "Human Pose Estimation with Iterative Error Feedback", In Proceedings of the IEEE Conference on Computer Vision and Pattern Recognition, Jun. 27-30, 2016, pp. 4733-4742.

Chatfield et al., "Return of the Devil in the Details: Delving Deep into Convolutional Nets", arXiv eprint arXiv:1405.3531v4, Nov. 5, 2014 in 11 pages.

Chen X. et al., "3D Object Proposals for Accurate Object Class Detection", in *Advances in Neural Information Processing Systems*, (2015) Retrieved from <http://papers.nips.cc/paper/5644-3d-object-proposals-for-accurate-object-class-detection.pdf>; 11 pages.

Choy et al., "3D-R2N2: A Unified Approach for Single and Multi-view 3D Object Reconstruction", arXiv; eprint arXiv:1604.00449v1, Apr. 2, 2016 in 17 pages.

Collet et al., "The MOPED framework: Object Recognition and Pose Estimation for Manipulation", The International Journal of Robotics Research. (Sep. 2011) 30(10):1284-306; preprint Apr. 11, 2011 in 22 pages.

Crivellaro A. et al., "A Novel Representation of Parts for Accurate 3D Object Detection and Tracking in Monocular Images", In *Proceedings of the IEEE International Conference on Computer Vision*; Dec. 7-13, 2015 (pp. 4391-4399).

Dai J. et al., "R-FCN: Object Detection via Region-based Fully Convolutional Networks", in *Advances in neural information processing systems*; (Jun. 21, 2016) Retrieved from <https://arxiv.org/pdf/1605.06409.pdf in 11 pages.

Dai J. et al., "Instance-aware Semantic Segmentation via Multi-task Network Cascades", In *Proceedings of the IEEE Conference on Computer Vision and Pattern Recognition*; Jun. 27-30, 2016 (pp. 3150-3158).

Daugman, J. et al., "Epigenetic randomness, complexity and singularity of human iris patterns", Proceedings of Royal Society: Biological Sciences, vol. 268, Aug. 22, 2001, in 4 pages.

Daugman, J., "New Methods in Iris Recognition," IEEE Transactions on Systems, Man, and Cybernetics—Part B: Cybernetics, vol. 37, No. 5, Oct. 2007, in 9 pages.

Daugman, J., "How Iris Recognition Works", IEEE Transactions on Circuits and Systems for Video Technology, vol. 14, No. 1, Jan. 2004, in 10 pages.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

Detone D. et al., "Deep Image Nomography Estimation", arXiv eprint arXiv:1606.03798v1, Jun. 13, 2016 in 6 pages.

Dwibedi et al., "Deep Cuboid Detection: Beyond 2D Bounding Boxes", arXiv eprint arXiv:1611.10010v1; Nov. 30, 2016 in 11 pages.

Everingham M. et al., "The PASCAL Visual Object Classes (VOC) Challenge", Int J Comput Vis (Jun. 2010) 88(2):303-38.

Farabet, C. et al., "Hardware Accelerated Convolutional Neural Networks for Synthetic Vision Systems", Proceedings of the 2010 IEEE International Symposium (May 30-Jun. 2, 2010) Circuits and Systems (ISCAS), pp. 257-260.

Fidler S. et al., "3D Object Detection and Viewpoint Estimation with a Deformable 3D Cuboid Model", Proceedings of the 25th International Conference on Neural Information Processing Systems, (Dec. 3-6, 2012), pp. 611-619.

Fouhey D. et al., "Data-Driven 3D Primitives for Single Image Understanding", Proceedings of the IEEE International Conference on Computer Vision, Dec. 1-8, 2013; pp. 3392-3399.

Geiger A. et al., "Joint 3D Estimation of Objects and Scene Layout", In Advances in Neural Information Processing Systems 24; Dec. 17, 2011 in 9 pages.

Gidaris S. et al., "Object detection via a multi-region & semantic segmentation-aware CNN model", in Proceedings of the IEEE International Conference on Computer Vision; Dec. 7-13, 2015 (pp. 1134-1142).

Girshick R. et al., "Rich feature hierarchies for accurate object detection and semantic segmentation", Proceedings of the IEEE Conference on Computer Vision and Pattern Recognition, Jun. 23-28, 2014 (pp. 580-587).

Girshick R. et al., "Fast R-CNN", Proceedings of the IEEE International Conference on Computer Vision; Dec. 7-13, 2015 (pp. 1440-1448).

Gupta A. et al., "Blocks World Revisited: Image Understanding Using Qualitative Geometry and Mechanics", in European Conference on Computer Vision; Sep. 5, 2010 in 14 pages.

Gupta A. et al., "From 3D Scene Geometry to Human Workspace", in Computer Vision and Pattern Recognition (CVPR); IEEE Conference on Jun. 20-25, 2011 (pp. 1961-1968).

Gupta S. et al., "Learning Rich Features from RGB-D Images for Object Detection and Segmentation", in *European Conference on Computer Vision*; (Jul. 22, 2014); Retrieved from <https://arxiv.org/pdf/1407.5736.pdf> in 16 pages.

Gupta S. et al., "Inferring 3D Object Pose in RGB-D Images", arXiv e-print arXiv:1502.04652v1, Feb. 16, 2015 in 13 pages.

Gupta S. et al., "Aligning 3D Models to RGB-D Images of Cluttered Scenes", in Proceedings of the IEEE Conference on Computer Vision and Pattern Recognition, Jun. 7-12, 2015 (pp. 4731-4740).

Han et al., "Deep Compression: Compressing Deep Neural Networks with Pruning, Trained Quantization and Huffman Coding", arXiv eprint arXiv:1510.00149v5, Feb. 15, 2016 in 14 pages.

Hansen, D. et al., "In the Eye of the Beholder: A Survey of Models for Eyes and Gaze", IEEE Transactions on Pattern Analysis and Machine Intelligence, vol. 32, No. 3, , Mar. 2010, in 23 pages.

Hartley R. et al., *Multiple View Geometry in Computer Vision*, 2nd Edition; Cambridge University Press, (Apr. 2004); in 673 pages.

He et al., "Spatial Pyramid Pooling in Deep Convolutional Networks for Visual Recognition", arXiv eprint arXiv:1406.4729v2; Aug. 29, 2014 in 14 pages.

He et al., "Delving Deep into Rectifiers: Surpassing Human-level Performance on ImageNet Classification", arXiv: eprint arXiv:1502.01852v1, Feb. 6, 2015 in 11 pages.

Hedau V. et al., "Recovering Free Space of Indoor Scenes from a Single Image", in *Computer Vision and Pattern Recognition* (CVPR), IEEE Conference Jun. 16-21, 2012 (pp. 2807-2814).

Hejrati et al., "Categorizing Cubes: Revisiting Pose Normalization", Applications of Computer Vision (WACV), 2016 IEEE Winter Conference, Mar. 7-10, 2016 in 9 pages.

Hijazi, S. et al., "Using Convolutional Neural Networks for Image Recognition", Tech Rep. (Sep. 2015) available online URL: http://ip.cadence.com/uploads/901/cnn-wp-pdf, in 12 pages.

Hoffer et al., "Deep Metric Learning Using Triplet Network", International Workshop on Similarity-Based Pattern Recognition [ICLR]; Nov. 25, 2015; [online] retrieved from the internet <https://arxiv.org/abs/1412.6622>; pp. 84-92.

Hoiem D. et al., "Representations and Techniques for 3D Object Recognition and Scene Interpretation", Synthesis Lectures on Artificial Intelligence and Machine Learning, Aug. 2011, vol. 5, No. 5, pp. 1-169; Abstract in 2 pages.

Hsiao E. et al., "Making specific features less discriminative to improve point-based 3D object recognition", in *Computer Vision and Pattern Recognition* (CVPR), IEEE Conference, Jun. 13-18, 2010 (pp. 2653-2660).

(56) References Cited

OTHER PUBLICATIONS

Huang et al., "Sign Language Recognition Using 3D Convolutional Neural Networks", University of Science and Technology of China, 2015 IEEE International Conference on Multimedia and Expo. Jun. 29-Jul. 3, 2015, in 6 pages.
Iandola F. et al., "SqueezeNet: AlexNet-level accuracy with 50× fewer parameters and <1MB model size", arXiv eprint arXiv:1602.07360v1, Feb. 24, 2016 in 5 pages.
Ioffe S. et al., "Batch Normalization: Accelerating Deep Network Training by Reducing Internal Covariate Shift", International Conference on Machine Learning (Jun. 2015); arXiv: eprint arXiv:1502.03167v3, Mar. 2, 2015 in 11 pages.
Jarrett et al., "What is the Best Multi-Stage Architecture for Object Recognition?", In Computer Vision IEEE 12th International Conference Sep. 29-Oct. 2, 2009, pp. 2146-2153.
Ji, H. et al., "3D Convolutional Neural Networks for Human Action Recognition", IEEE Transactions on Pattern Analysis and Machine Intelligence, vol. 35:1, Jan. 2013, in 11 pages.
Jia et al., "3D-Based Reasoning with Blocks, Support, and Stability", Proceedings of the IEEE Conference on Computer Vision and Pattern Recognition; Jun. 23-28, 2013 in 8 pages.
Jia et al., "Caffe: Convolutional Architecture for Fast Feature Embedding", arXiv e-print arXiv:1408.5093v1, Jun. 20, 2014 in 4 pages.
Jiang H. et al., "A Linear Approach to Matching Cuboids in RGBD Images", in *Proceedings of the IEEE Conference on Computer Vision and Pattern Recognition*. Jun. 23-28, 2013 (pp. 2171-2178).
Jillela et al., "An Evaluation of Iris Segmentation Algorithms in Challenging Periocular Images", Handbook of Iris Recognition, Springer Verlag, Heidelberg (2012); 28 pages.
Kar A. et al., "Category-specific object reconstruction from a single image", in *Proceedings of the IEEE Conference on Computer Vision and Pattern Recognition*. Jun. 7-12, 2015 (pp. 1966-1974).
Krizhevsky et al., "ImageNet Classification with Deep Convolutional Neural Networks", Advances in Neural Information Processing Systems. Apr. 25, 2013, pp. 1097-1105.
Lavin, A. et al.: "Fast Algorithms for Convolutional Neural Networks", Proceedings of the IEEE Conference on Computer Vision and Pattern Recognition, arXiv: eprint arXiv:1509.09308v2; Nov. 10, 2016 in 9 pages.
Lee D. et al., "Geometric Reasoning for Single Image Structure Recovery", in IEEE Conference Proceedings in Computer Vision and Pattern Recognition (CVPR) Jun. 20-25, 2009, pp. 2136-2143.
Lim J. et al., "FPM: Fine pose Parts-based Model with 3D CAD models", European Conference on Computer Vision; Springer Publishing, Sep. 6, 2014, pp. 478-493.
Liu et al., "ParseNet: Looking Wider to See Better", arXiv eprint arXiv:1506.04579v1; Jun. 15, 2015 in 9 pages.
Liu W. et al., "SSD: Single Shot MultiBox Detector", arXiv e-print arXiv:1512.02325v5, Dec. 29, 2016 in 17 pages.
Long et al., "Fully Convolutional Networks for Semantic Segmentation", Proceedings of the IEEE Conference on Computer Vision and Pattern Recognition (Jun. 7-12, 2015) in 10 pages.
Pavlakos G. et al., "6-dof object pose from semantic keypoints", in arXiv preprint Mar. 14, 2017; Retrieved from <http://www.cis.upenn.edu/~kostas/mypub.dir/pavlakos17icra.pdf> in 9 pages.
Rastegari M. et al., "XNOR-Net: ImageNet Classification Using Binary Convolutional Neural Networks", arXiv eprint arXiv:1603.05279v4; Aug. 2, 2016 in 17 pages.
Redmon J. et al., "You Only Look Once: Unified, Real-Time Object Detection", Proceedings of the IEEE Conference on Computer Vision and Pattern Recognition (Jun. 27-30, 2016) pp. 779-788.
Ren, J. et al.: "On Vectorization of Deep Convolutional Neural Networks for Vision Tasks," Association for the Advancement of Artificial Intelligence; arXiv: eprint arXiv:1501.07338v1, Jan. 29, 2015 in 8 pages.
Ren S. et al., "Faster R-CNN: Towards real-time object detection with region proposal networks", arXiv eprint arXiv:1506.01497v3; Jan. 6, 2016 in 14 pages.

Roberts L. et al., "Machine Perception of Three-Dimensional Solids", Doctoral Thesis MIT; Jun. 1963 in 82 pages.
Rubinstein, M., "Eulerian Video Magnification", YouTube, published May 23, 2012, as archived Sep. 6, 2017, in 13 pages (with video transcription). URL: https://web.archive.org/web/20170906180503/https://www.youtube.com/watch?v=ONZcjs1Pjmk&feature=youtu.be.
Savarese S. et al., "3D generic object categorization, localization and pose estimation", in *Computer Vision*, IEEE 11th International Conference; Oct. 14-21, 2007, in 8 pages.
Saxena A., "Convolutional Neural Networks (CNNS): An Illustrated Explanation", Jun. 29, 2016 in 16 pages; Retrieved from <http://xrds.acm.org/blog/2016/06/convolutional-neural-networks-cnns-illustrated-explanation/>.
Schroff et al., "FaceNet: A unified embedding for Face Recognition and Clustering", arXiv eprint arXiv:1503.03832v3, Jun. 17, 2015 in 10 pages.
Shafiee et al., "ISAAC: A Convolutional Neural Network Accelerator with In-Situ Analog Arithmetic in Crossbars", ACM Sigarch Comp. Architect News (Jun. 2016) 44(3):14-26.
Shao T. et al., "Imagining the Unseen: Stability-based Cuboid Arrangements for Scene Understanding", ACM Transactions on Graphics. (Nov. 2014) 33(6) in 11 pages.
Simonyan K. et al., "Very deep convolutional networks for large-scale image recognition", arXiv eprint arXiv:1409.1556v6, Apr. 10, 2015 in 14 pages.
Song S. et al., "Sliding Shapes for 3D Object Detection in Depth Images", in European Conference on Computer Vision, (Sep. 6, 2014) Springer Publishing (pp. 634-651).
Song S. et al., "Deep Sliding Shapes for Amodal 3D Object Detection in RGB-D Images", in Proceedings of the IEEE Conference on Computer Vision and Pattern Recognition. Jun. 27-30, 2016 (pp. 808-816).
Su H. et al., "Render for CNN: Viewpoint Estimation in Images Using CNNs Trained with Rendered 3D Model Views", in Proceedings of the IEEE International Conference on Computer Vision, Dec. 7-13, 2015 (pp. 2686-2694).
Szegedy et al., "Going deeper with convolutions", The IEEE Conference on Computer Vision and Pattern Recognition; arXiv, eprint arXiv:1409.4842v1, Sep. 17, 2014 in 12 pages.
Szegedy et al., "Rethinking the Inception Architecture for Computer Vision", arXiv eprint arXIV:1512.00567v3, Dec. 12, 2015 in 10 pages.
Tulsiani S. et al., "Viewpoints and Keypoints", Proceedings of the IEEE Conference on Computer Vision and Pattern Recognition; Jun. 7-12, 2015 (pp. 1510-1519).
Villanueva, A. et al., "A Novel Gaze Estimation System with One Calibration Point", IEEE Transactions on Systems, Man, and Cybernetics—Part B:Cybernetics, vol. 38:4, Aug. 2008, in 16 pages.
Wilczkowiak M. et al., "Using Geometric Constraints Through Parallelepipeds for Calibration and 3D Modelling", IEEE Transactions on Pattern Analysis and Machine Intelligence—No. 5055 (Nov. 2003) 27(2) in 53 pages.
Wu J. et al., "Single Image 3D Interpreter Network", European Conference in Computer Vision; arXiv eprint arXiv:1604.08685v2, Oct. 4, 2016 in 18 pages.
Xiang Y. et al., "Data-Driven 3D Voxel Patterns for Object Category Recognition", in Proceedings of the IEEE Conference on Computer Vision and Pattern Recognition, Jun. 7-12, 2015 (pp. 1903-1911).
Xiao J. et al., "Localizing 3D cuboids in single-view images", in Advances in Neural Information Processing Systems; Apr. 25, 2013 in 9 pages.
Yang Y. et al., "Articulated human detection with flexible mixtures of parts", IEEE Transactions on Pattern Analysis and Machine Intelligence. Dec. 2013; 35(12):2878-90.
Zheng Y. et al., "Interactive Images: Cuboid Proxies for Smart Image Manipulation", ACM Trans Graph. (Jul. 2012) 31(4):99-109.
International Search Report and Written Opinion for PCT Application No. PCT/US2015/29679, dated Jul. 6, 2017.
International Search Report and Written Opinion for PCT Application No. PCT/US17/29699, dated Sep. 8, 2017.
International Search Report and Written Opinion for PCT Application No. PCT/US2017/034482, dated Aug. 2, 2017.

(56) References Cited

OTHER PUBLICATIONS

International Search Report and Written Opinion for PCT Application No. PCT/US2017/048068, dated Nov. 20, 2017.
International Search Report and Written Opinion for PCT Application No. PCT/US2017/054987, dated Dec. 12, 2017.
International Search Report and Written Opinion for PCT Application No. PCT/US2017/061618, dated Jan. 17, 2018.
International Preliminary Report on Patentability for PCT Application No. PCT/US17/48060, dated Oct. 28, 2018.

* cited by examiner

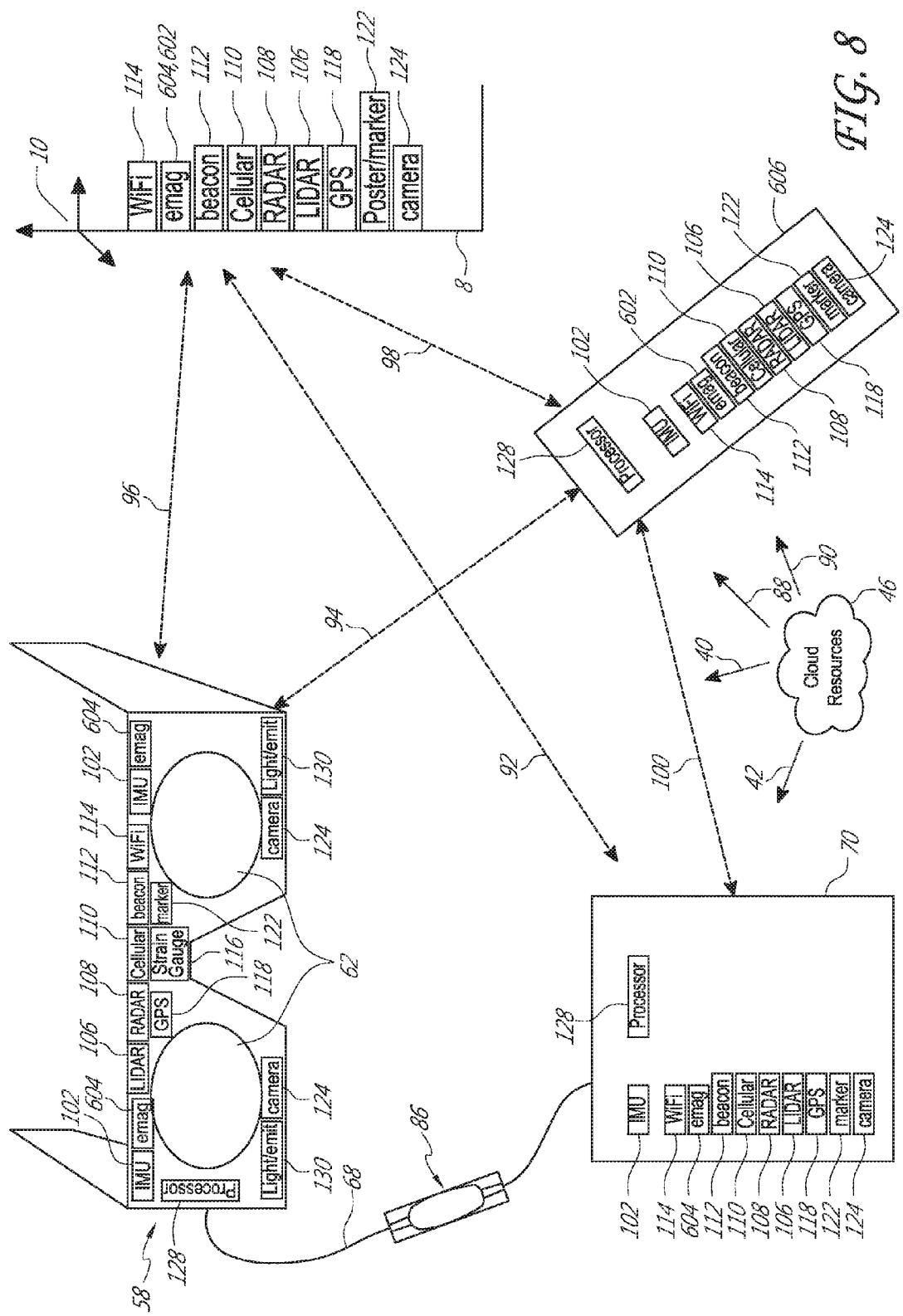

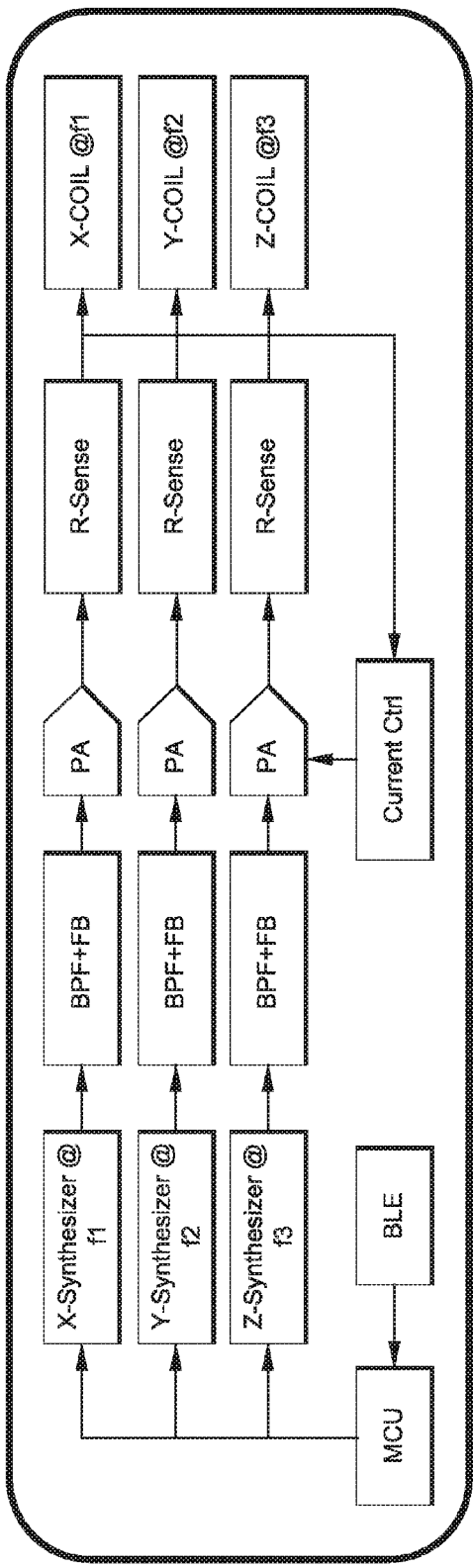
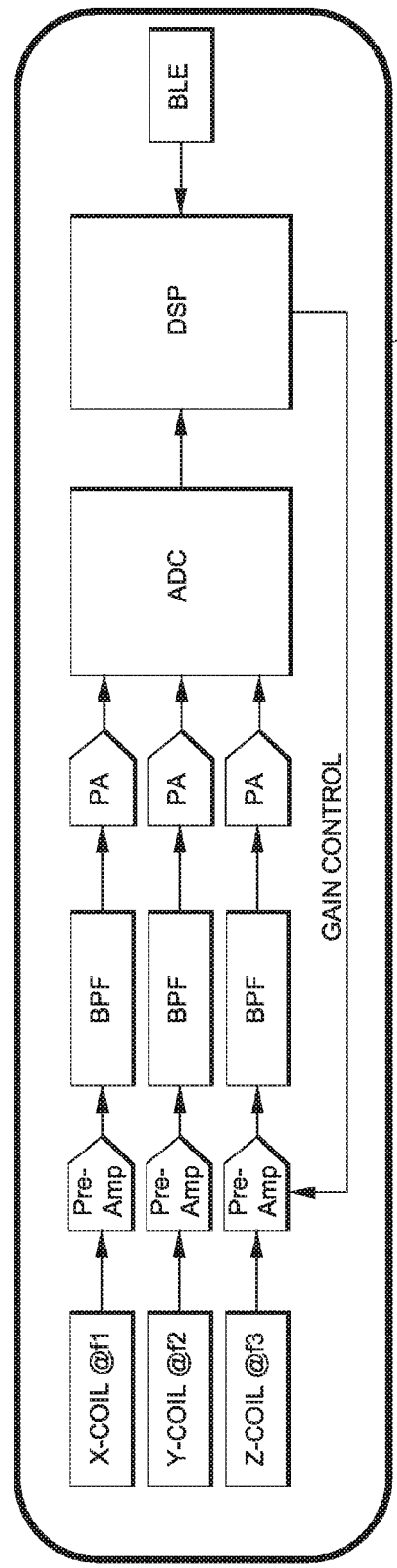
FIG. 13A
FIG. 13B

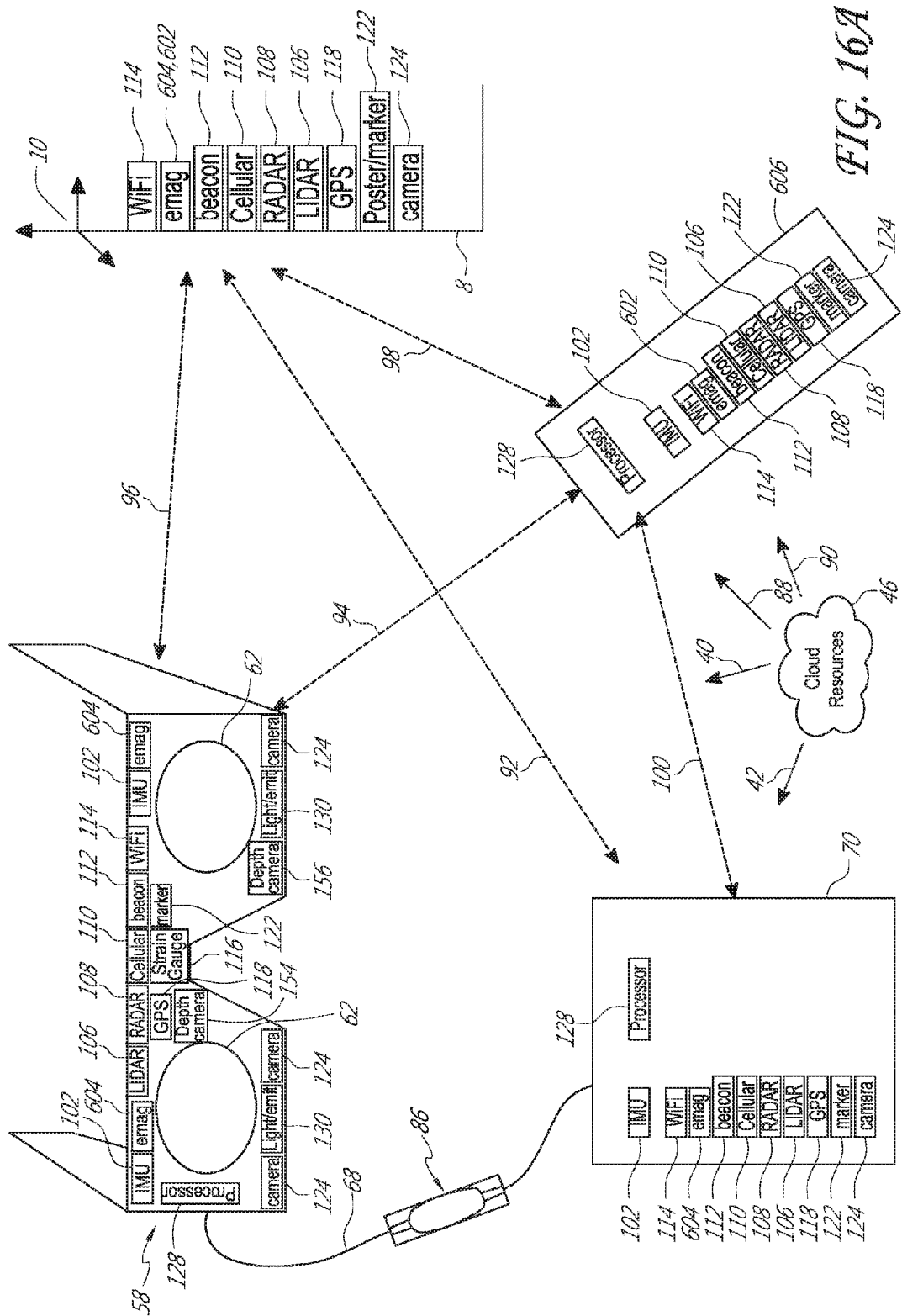

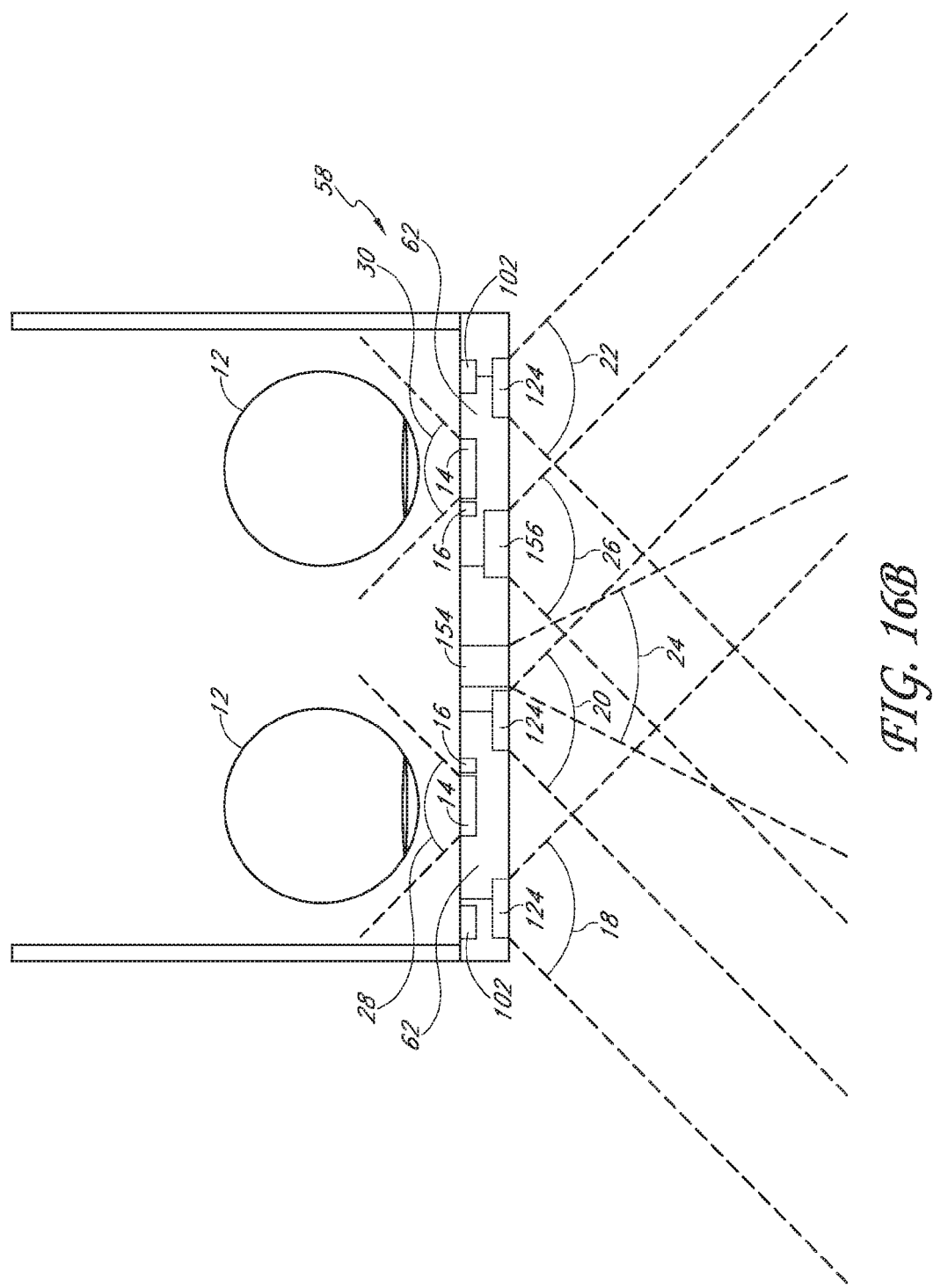

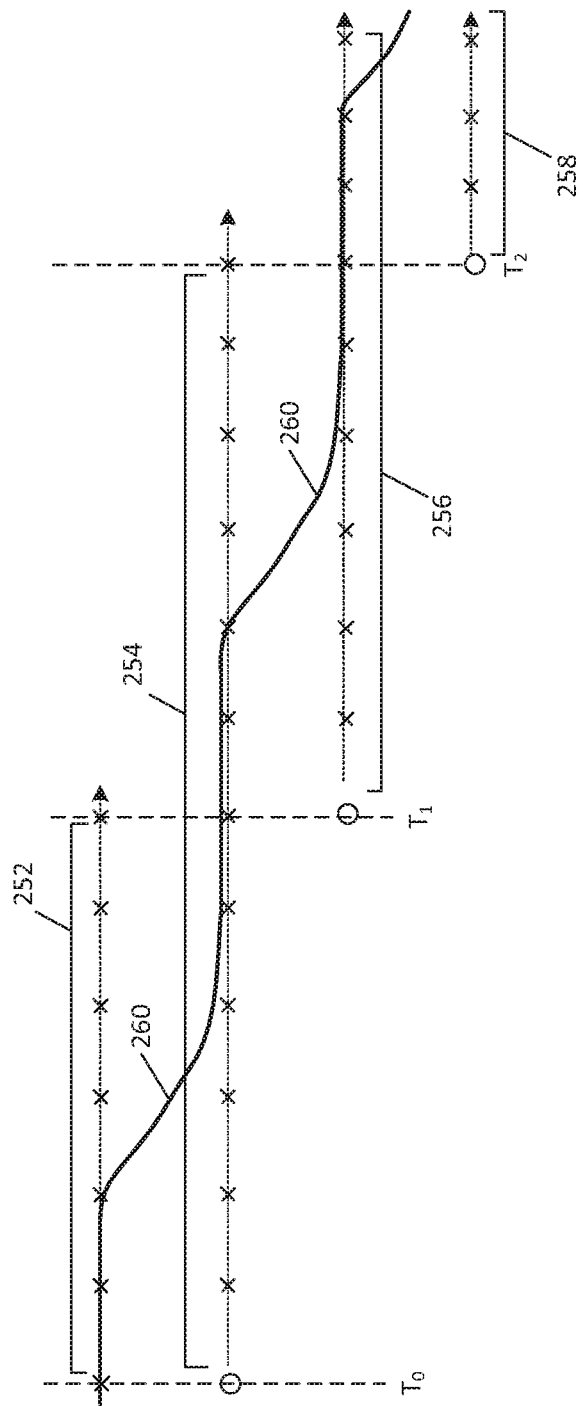

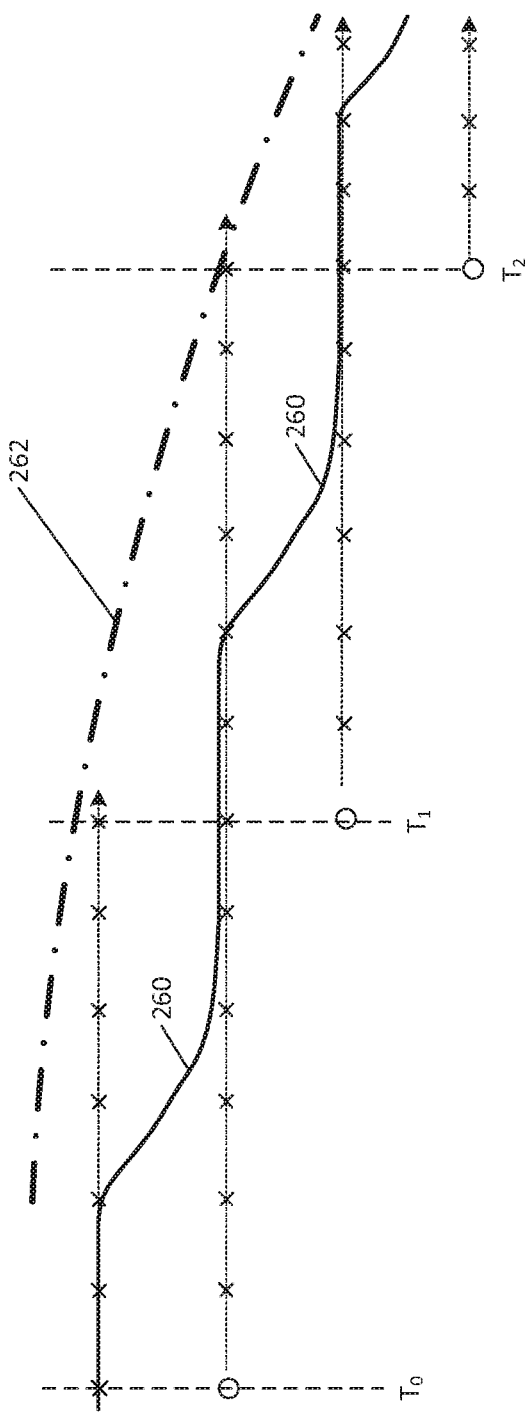

AUGMENTED REALITY DISPLAY DEVICE WITH DEEP LEARNING SENSORS

CROSS-REFERENCE TO RELATED APPLICATIONS

This application claims the benefit of priority to U.S. Patent Application No. 62/377,835, filed Aug. 22, 2016, entitled SYSTEMS AND METHODS FOR AUGMENTED REALITY, which is hereby incorporated by reference herein in its entirety.

BACKGROUND

Field

The present disclosure relates to augmented reality systems that use deep learning neural networks to combine multiple sensor inputs (e.g., inertial measurement units, cameras, depth sensors, microphones) into a unified pathway comprising shared layers and upper layers that perform multiple functionalities (e.g., face recognition, location and mapping, object detection, depth estimation, etc.).

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user.

SUMMARY

In one aspect, a head-mounted augmented reality (AR) device can include a hardware processor programmed to receive different types of sensor data from a plurality of sensors (e.g., an inertial measurement unit, an outward-facing camera, a depth sensing camera, an eye imaging camera, or a microphone); and determining an event of a plurality of events using the different types of sensor data and a hydra neural network (e.g., face recognition, visual search, gesture identification, semantic segmentation, object detection, lighting detection, simultaneous localization and mapping, relocalization). In another aspect, a system for training a hydra neural network is also disclosed. In yet another aspect, a method for training a hydra neural network or using a trained hydra neural network for determining an event of a plurality of different types of events is disclosed.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

BRIEF DESCRIPTION OF THE DRAWINGS

FIG. 8 schematically illustrates examples of components of an embodiment of an AR system.

FIG. 13A is a block diagram that schematically illustrates an example of an EM transmitter circuit (EM emitter) that is frequency division multiplexed (FDM).

FIG. 13B is a block diagram that schematically illustrates an example of an EM receiver circuit (EM sensor) that is frequency division multiplexed.

FIGS. 16A and 16B schematically illustrates examples of components of other embodiments of an AR system.

FIGS. 28A-28F schematically illustrate examples of sensor fusion.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview of AR, VR and Localization Systems

Figure 1:
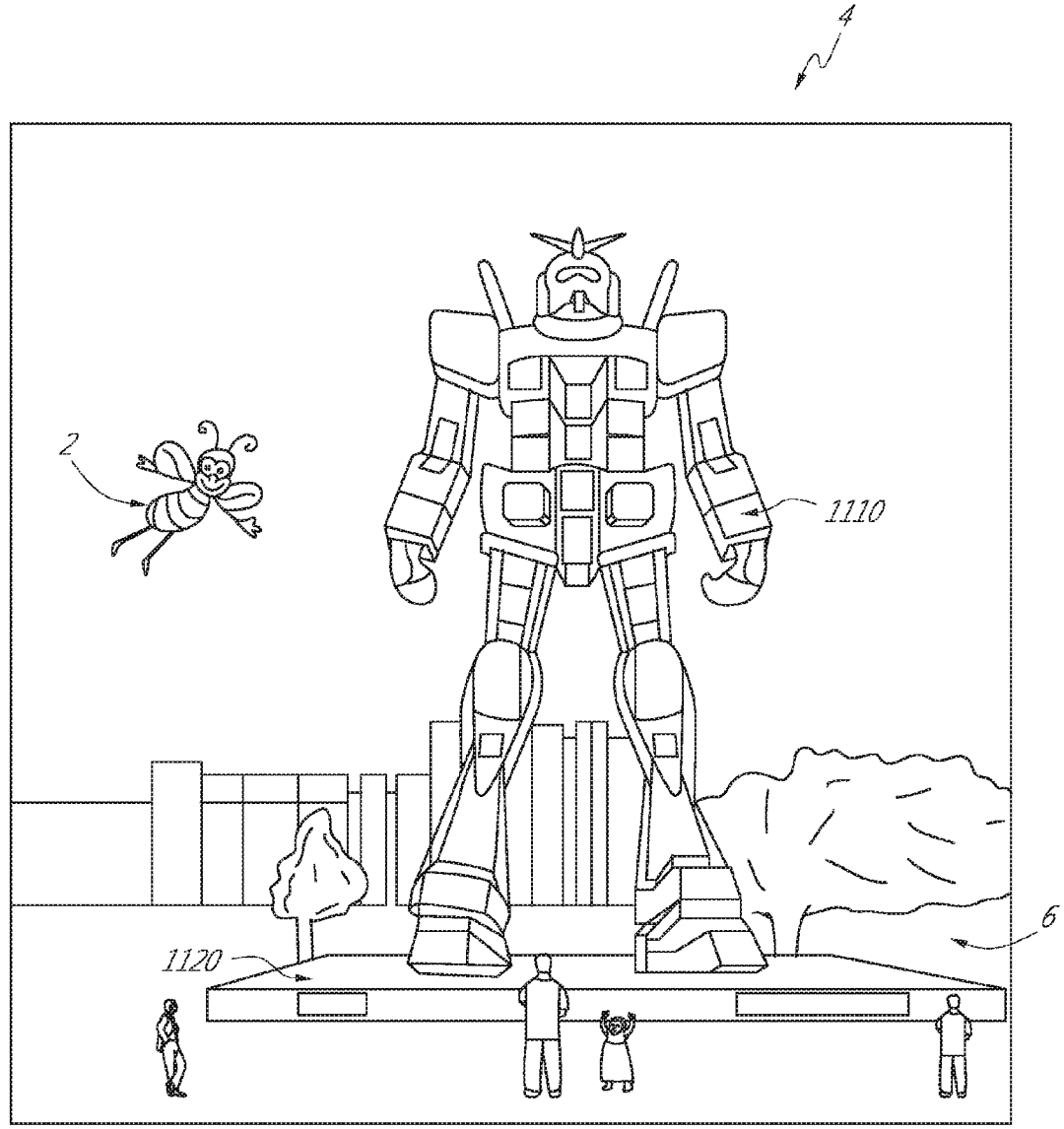
FIG. 1 depicts an illustration of an augmented reality scenario with certain virtual reality objects, and certain physical objects viewed by a person.

In FIG. 1 an augmented reality scene (4) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. As it turns out, the human visual perception system is very complex, and producing a VR or AR technology that facilitates a comfortable, natural-feeling, rich presentation of virtual image elements amongst other virtual or real-world imagery elements is challenging.

For instance, head-worn AR displays (or helmet-mounted displays, or smart glasses) typically are at least loosely coupled to a user's head, and thus move when the user's head moves. If the user's head motions are detected by the display system, the data being displayed can be updated to take the change in head pose into account.

As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. If the head-worn display is used to present multiple objects within a virtual space (for instance, a rich virtual world), measurements of head pose (e.g., the location and orientation of the user's head) can be used to re-render the scene to match the user's dynamically changing head location and orientation and provide an increased sense of immersion in the virtual space.

In AR systems, detection or calculation of head pose can facilitate the display system to render virtual objects such that they appear to occupy a space in the real world in a manner that makes sense to the user. In addition, detection of the position and/or orientation of a real object, such as handheld device (which also may be referred to as a "totem"), haptic device, or other real physical object, in relation to the user's head or AR system may also facilitate the display system in presenting display information to the user to enable the user to interact with certain aspects of the AR system efficiently. As the user's head moves around in the real world, the virtual objects may be re-rendered as a function of head pose, such that the virtual objects appear to remain stable relative to the real world. At least for AR applications, placement of virtual objects in spatial relation to physical objects (e.g., presented to appear spatially proximate a physical object in two- or three-dimensions) may be a non-trivial problem. For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user. Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Head tracking accuracy and latency (e.g., the elapsed time between when the user moves his or her head and the time when the image gets updated and displayed to the user) have been challenges for VR and AR systems. Especially for display systems that fill a substantial portion of the user's visual field with virtual elements, it is advantageous if the accuracy of head-tracking is high and that the overall system latency is very low from the first detection of head motion to the updating of the light that is delivered by the display to the user's visual system. If the latency is high, the system can create a mismatch between the user's vestibular and visual sensory systems, and generate a user perception scenario that can lead to motion sickness or simulator sickness. If the system latency is high, the apparent location of virtual objects will appear unstable during rapid head motions.

In addition to head-worn display systems, other display systems can benefit from accurate and low latency head pose detection. These include head-tracked display systems in which the display is not worn on the user's body, but is, e.g., mounted on a wall or other surface. The head-tracked display acts like a window onto a scene, and as a user moves his head relative to the "window" the scene is re-rendered to match the user's changing viewpoint. Other systems include a head-worn projection system, in which a head-worn display projects light onto the real world.

Additionally, in order to provide a realistic augmented reality experience, AR systems may be designed to be interactive with the user. For example, multiple users may play a ball game with a virtual ball and/or other virtual objects. One user may "catch" the virtual ball, and throw the ball back to another user. In another embodiment, a first user may be provided with a totem (e.g., a real bat communicatively coupled to the AR system) to hit the virtual ball. In other embodiments, a virtual user interface may be presented to the AR user to allow the user to select one of many options. The user may use totems, haptic devices, wearable components, or simply touch the virtual screen to interact with the system.

Detecting head pose and orientation of the user, and detecting a physical location of real objects in space enable the AR system to display virtual content in an effective and enjoyable manner. However, although these capabilities are key to an AR system, but are difficult to achieve. In other words, the AR system can recognize a physical location of a real object (e.g., user's head, totem, haptic device, wearable component, user's hand, etc.) and correlate the physical coordinates of the real object to virtual coordinates corresponding to one or more virtual objects being displayed to the user. This generally requires highly accurate sensors and sensor recognition systems that track a position and orientation of one or more objects at rapid rates. Current approaches do not perform localization at satisfactory speed or precision standards.

Thus, there is a need for a better localization system in the context of AR and VR devices.

Example AR and VR Systems and Components

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 2A:
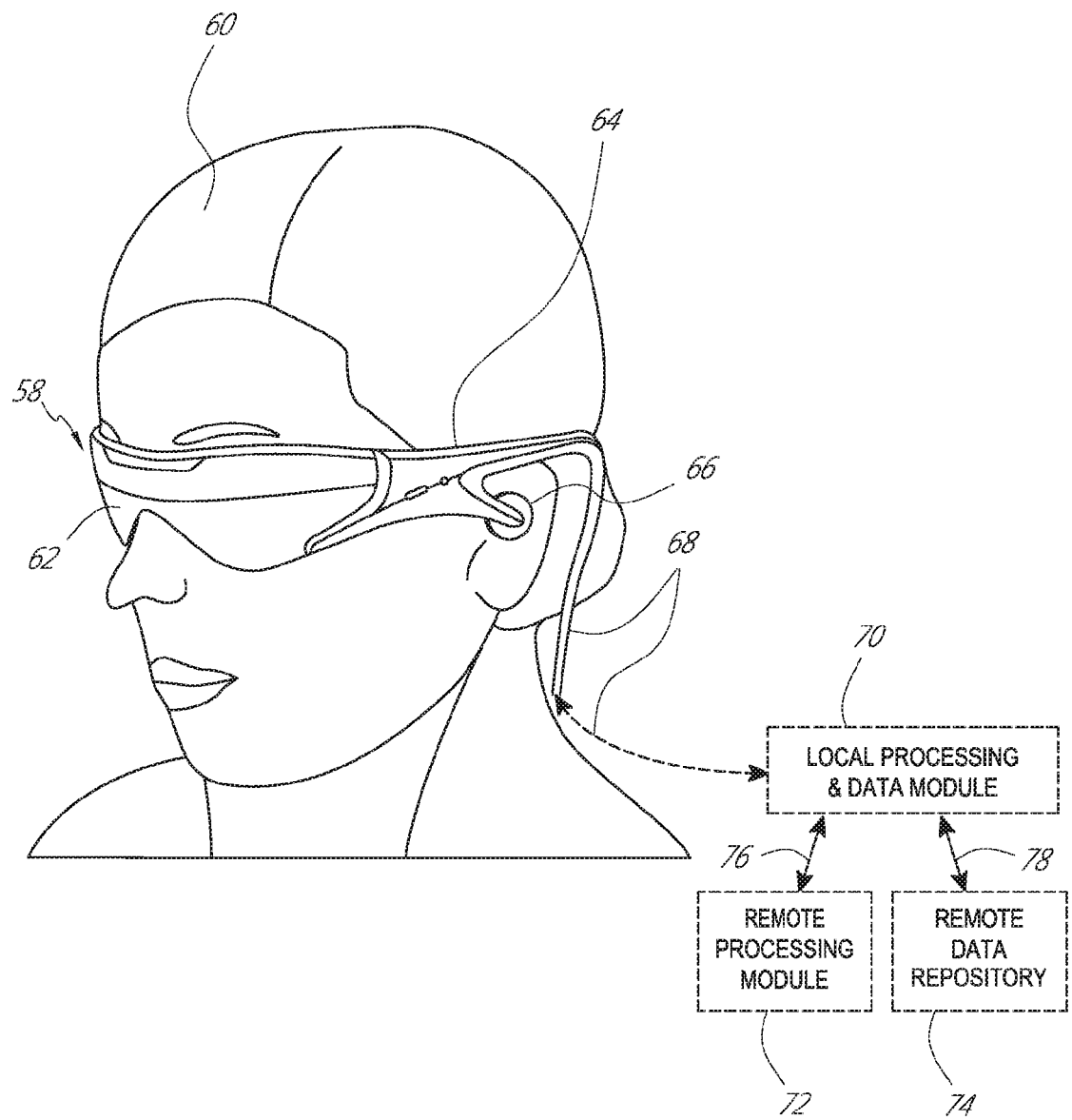
FIGS. 2A-2D schematically illustrate examples of a wearable system.
Figure 2B:
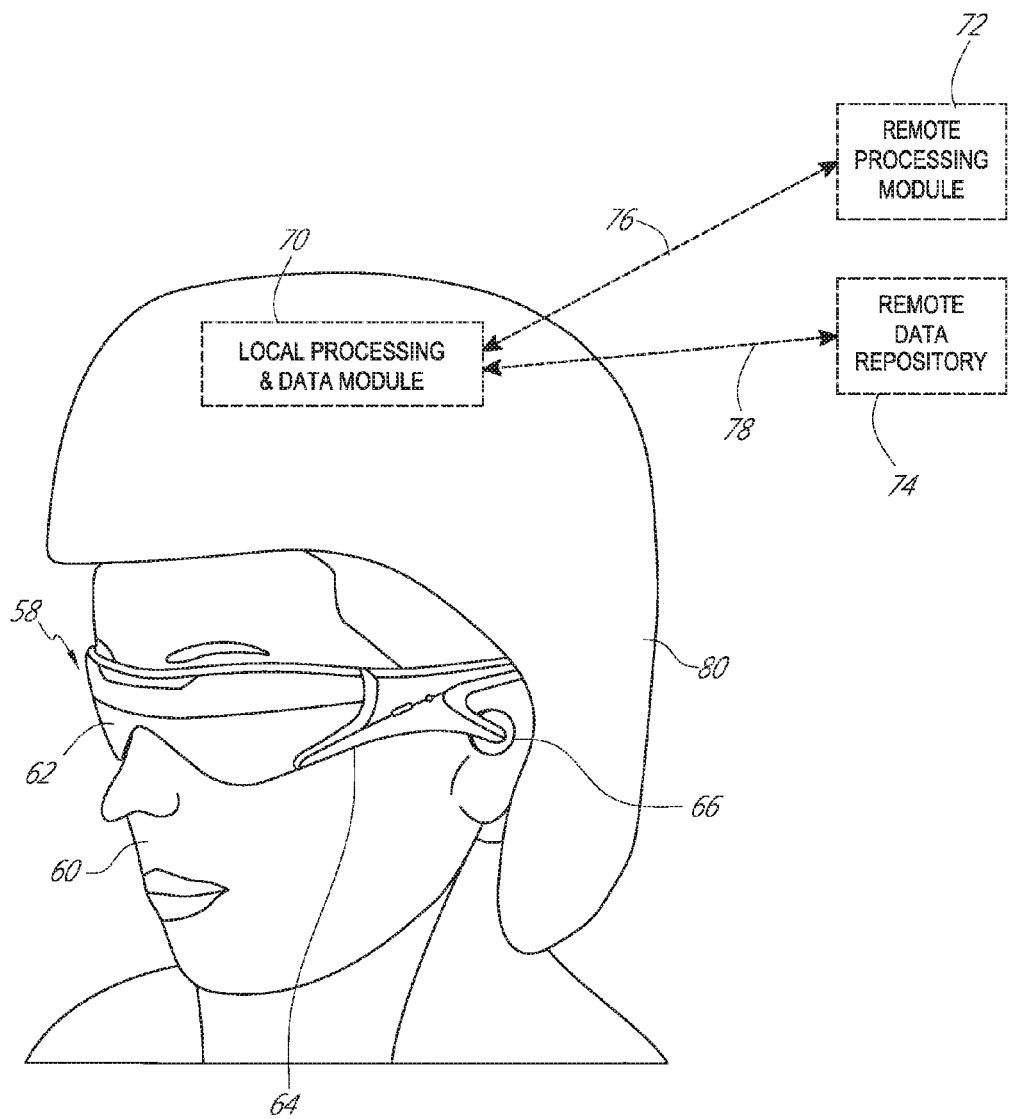
Figure 2C:
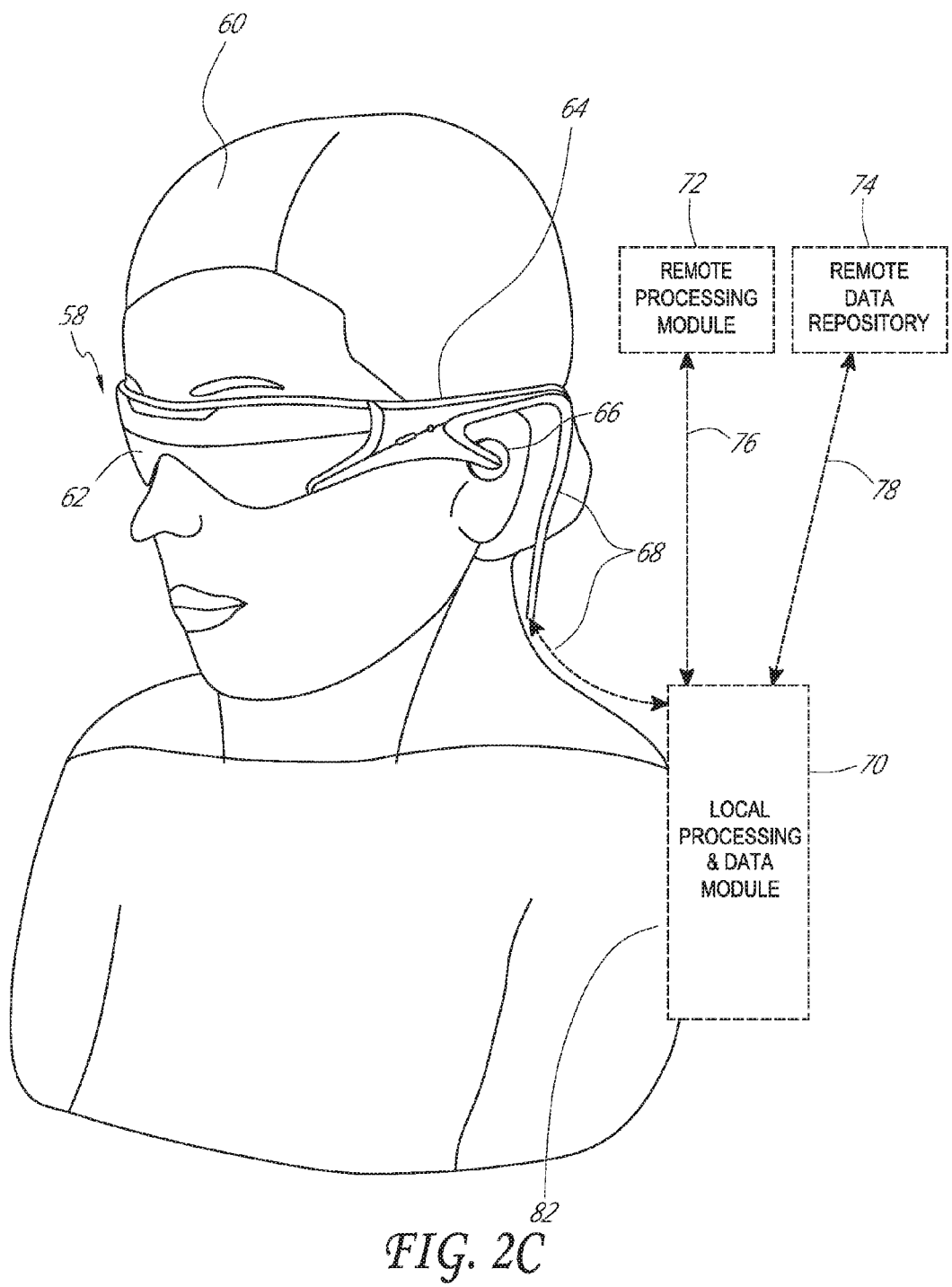
Figure 2D:
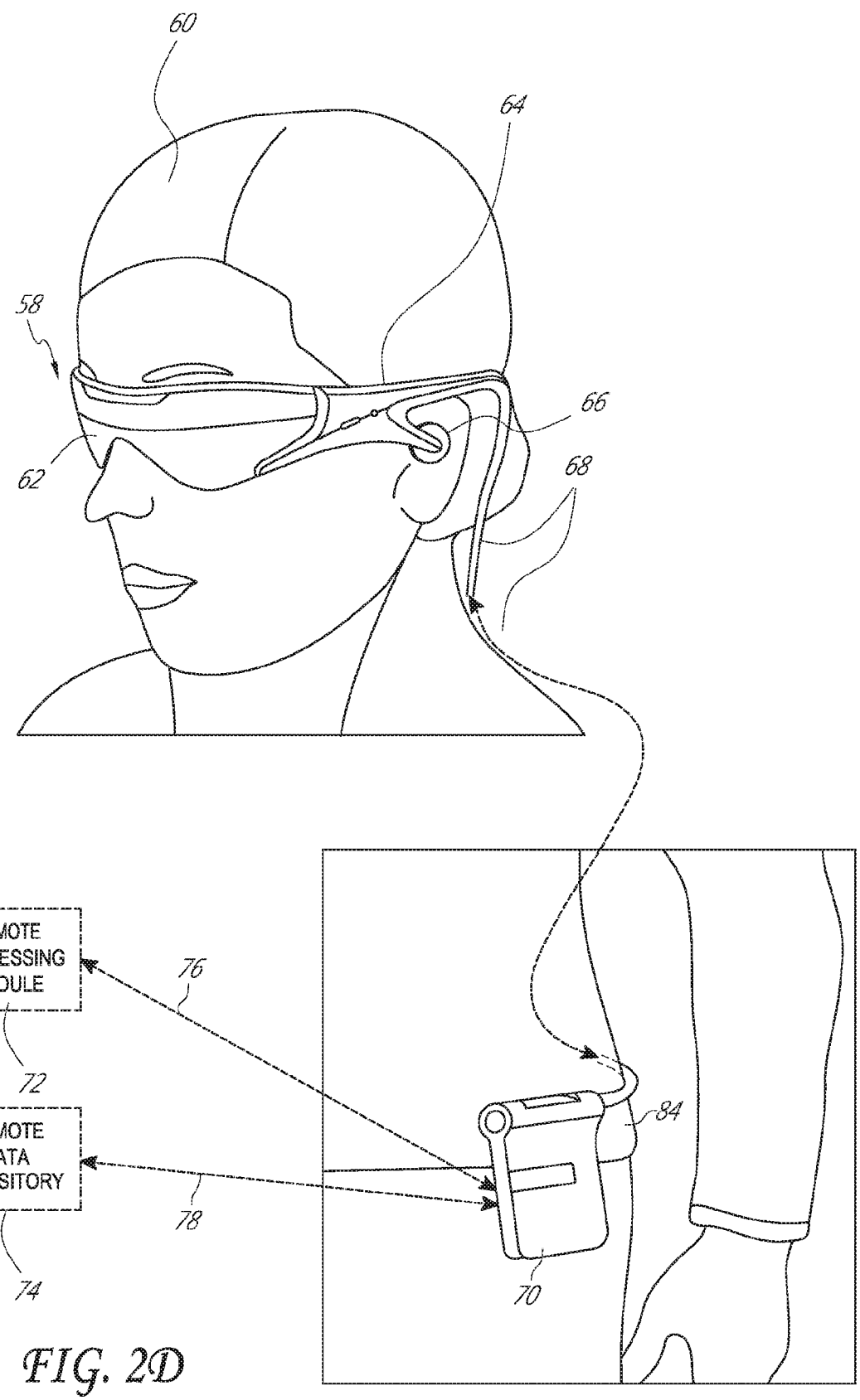

As shown in FIG. 2A, an AR system user (60) is depicted wearing head mounted component (58) featuring a frame (64) structure coupled to a display system (62) positioned in front of the eyes of the user. A speaker (66) is coupled to the frame (64) in the depicted configuration and positioned adjacent the ear canal of the user (in one embodiment, another speaker, not shown, is positioned adjacent the other ear canal of the user to provide for stereo/shapeable sound control). The display (62) is operatively coupled (68), such as by a wired lead or wireless connectivity, to a local processing and data module (70) which may be mounted in a variety of configurations, such as fixedly attached to the frame (64), fixedly attached to a helmet or hat (80) as shown in the embodiment of FIG. 2B, embedded in headphones, removably attached to the torso (82) of the user (60) in a backpack-style configuration as shown in the embodiment of FIG. 2C, or removably attached to the hip (84) of the user (60) in a belt-coupling style configuration as shown in the embodiment of FIG. 2D.

The local processing and data module (70) may comprise a power-efficient processor or controller, as well as digital memory, such as flash memory, both of which may be utilized to assist in the processing, caching, and storage of data a) captured from sensors which may be operatively coupled to the frame (64), such as image capture devices (such as cameras), microphones, inertial measurement units, accelerometers, compasses, GPS units, radio devices, and/or gyros; and/or b) acquired and/or processed using the remote processing module (72) and/or remote data repository (74), possibly for passage to the display (62) after such processing or retrieval. The local processing and data module (70) may be operatively coupled (76, 78), such as via a wired or wireless communication links, to the remote processing module (72) and remote data repository (74) such that these remote modules (72, 74) are operatively coupled to each other and available as resources to the local processing and data module (70).

In one embodiment, the remote processing module (72) may comprise one or more relatively powerful processors or controllers configured to analyze and process data and/or image information. In one embodiment, the remote data repository (74) may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 3:
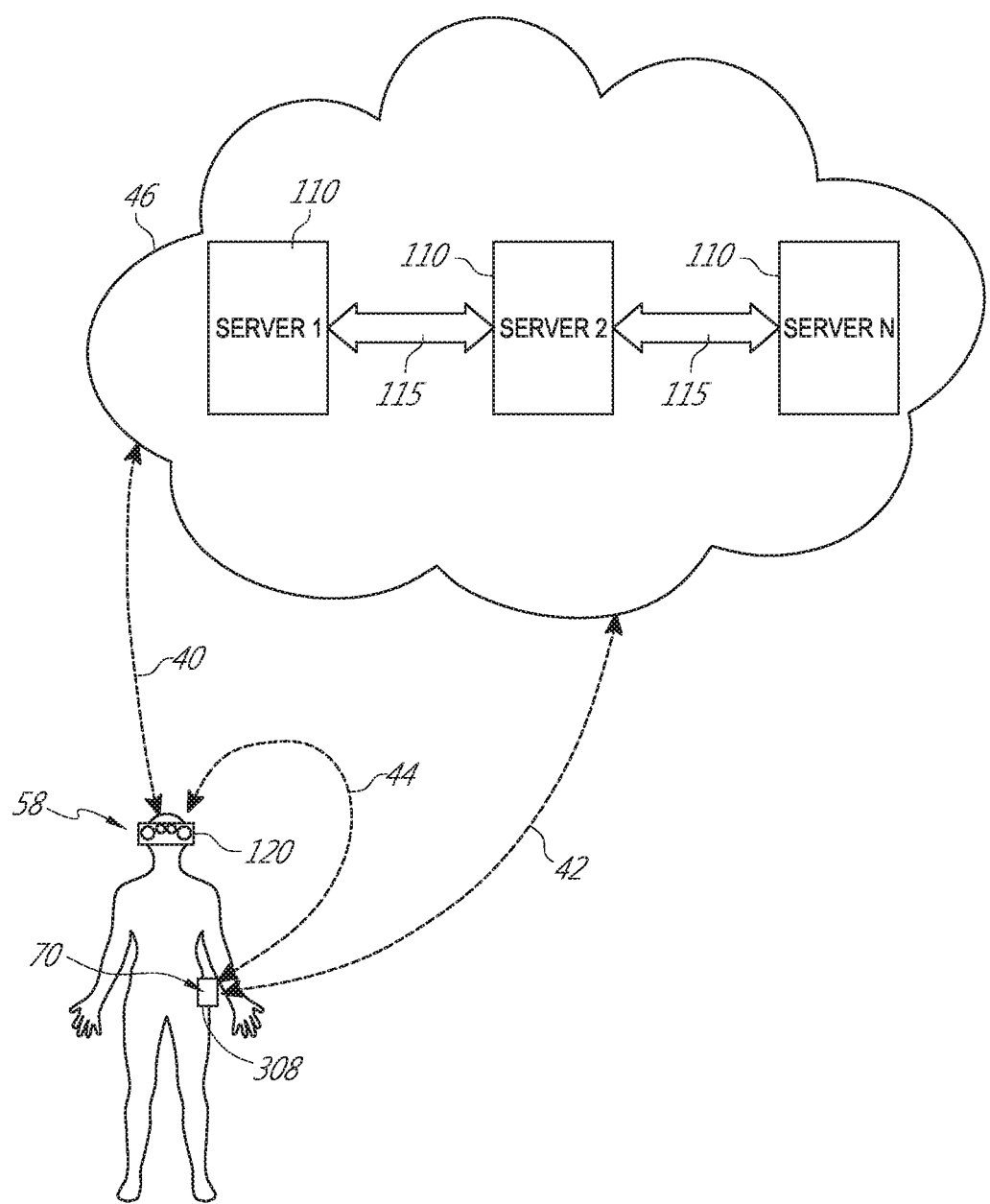
FIG. 3 schematically illustrates coordination between cloud computing assets and local processing assets.

Referring now to FIG. 3, a schematic illustrates coordination between the cloud computing assets (46) and local processing assets, which may, for example reside in head mounted componentry (58) coupled to the user's head (120) and a local processing and data module (70), coupled to the user's belt (308; therefore the component 70 may also be termed a "belt pack" 70), as shown in FIG. 3. In one embodiment, the cloud (46) assets, such as one or more server systems (110) are operatively coupled (115), such as via wired or wireless networking (wireless being preferred for mobility, wired being preferred for certain high-bandwidth or high-data-volume transfers that may be desired), directly to (40, 42) one or both of the local computing assets, such as processor and memory configurations, coupled to the user's head (120) and belt (308) as described above. These computing assets local to the user may be operatively coupled to each other as well, via wired and/or wireless connectivity configurations (44), such as the wired coupling (68) discussed below in reference to FIG. 8. In one embodiment, to maintain a low-inertia and small-size subsystem mounted to the user's head (120), primary transfer between the user and the cloud (46) may be via the link between the subsystem mounted at the belt (308) and the cloud, with the head mounted (120) subsystem primarily data-tethered to the belt-based (308) subsystem using wireless connectivity, such as ultra-wideband ("UWB") connectivity, as is currently employed, for example, in personal computing peripheral connectivity applications.

With efficient local and remote processing coordination, and an appropriate display device for a user, such as the user interface or user display system (62) shown in FIG. 2A, or variations thereof, aspects of one world pertinent to a user's current actual or virtual location may be transferred or "passed" to the user and updated in an efficient fashion. In other words, a map of the world may be continually updated at a storage location which may partially reside on the user's AR system and partially reside in the cloud resources. The map (also referred to as a "passable world model") may be a large database comprising raster imagery, 3-D and 2-D points, parametric information and other information about the real world. As more and more AR users continually capture information about their real environment (e.g., through cameras, sensors, IMUs, etc.), the map becomes more and more accurate and complete.

With a configuration as described above, wherein there is one world model that can reside on cloud computing resources and be distributed from there, such world can be "passable" to one or more users in a relatively low bandwidth form preferable to trying to pass around real-time video data or the like. The augmented experience of the person standing near the statue (e.g., as shown in FIG. 1) may be informed by the cloud-based world model, a subset of which may be passed down to them and their local display device to complete the view. A person sitting at a remote display device, which may be as simple as a personal computer sitting on a desk, can efficiently download that same section of information from the cloud and have it rendered on their display. Indeed, one person actually present in the park near the statue may take a remotely-located friend for a walk in that park, with the friend joining through virtual and augmented reality. The system will need to know where the street is, wherein the trees are, where the statue is—but with that information on the cloud, the joining friend can download from the cloud aspects of the scenario, and then start walking along as an augmented reality local relative to the person who is actually in the park.

Three-dimensional (3-D) points may be captured from the environment, and the pose (e.g., vector and/or origin position information relative to the world) of the cameras that capture those images or points may be determined, so that these points or images may be "tagged", or associated, with this pose information. Then points captured by a second camera may be utilized to determine the pose of the second camera. In other words, one can orient and/or localize a second camera based upon comparisons with tagged images from a first camera. Then this knowledge may be utilized to extract textures, make maps, and create a virtual copy of the real world (because then there are two cameras around that are registered).

So at the base level, in one embodiment a person-worn system can be utilized to capture both 3-D points and the 2-D images that produced the points, and these points and images may be sent out to a cloud storage and processing resource. They may also be cached locally with embedded pose information (e.g., cache the tagged images); so the cloud may have on the ready (e.g., in available cache) tagged 2-D images (e.g., tagged with a 3-D pose), along with 3-D points. If a user is observing something dynamic, he may also send additional information up to the cloud pertinent to the motion (for example, if looking at another person's face, the user can take a texture map of the face and push that up at an optimized frequency even though the surrounding world is otherwise basically static). More information on object recognizers and the passable world model may be found in U.S. Patent Pub. No. 2014/0306866, entitled "System and method for augmented and virtual reality", which is incorporated by reference in its entirety herein, along with the following additional disclosures, which related to augmented and virtual reality systems such as those developed by Magic Leap, Inc. of Plantation, Fla.: U.S. Patent Pub. No. 2015/0178939; U.S. Patent Pub. No. 2015/0205126; U.S. Patent Pub. No. 2014/0267420; U.S. Patent Pub. No. 2015/0302652; U.S. Patent Pub. No. 2013/0117377; and U.S. Patent Pub. No. 2013/0128230, each of which is hereby incorporated by reference herein in its entirety.

GPS and other localization information may be utilized as inputs to such processing. Highly accurate localization of the user's head, totems, hand gestures, haptic devices etc. may be advantageous in order to display appropriate virtual content to the user.

The head-mounted device (58) may include displays positionable in front of the eyes of the wearer of the device. The displays may comprise light field displays. The displays may be configured to present images to the wearer at a plurality of depth planes. The displays may comprise planar waveguides with diffraction elements. Examples of displays, head-mounted devices, and other AR components usable with any of the embodiments disclosed herein are described in U.S. Patent Publication No. 2015/0016777. U.S. Patent Publication No. 2015/0016777 is hereby incorporated by reference herein in its entirety.

Examples of Electromagnetic Localization

One approach to achieve high precision localization may involve the use of an electromagnetic (EM) field coupled with electromagnetic sensors that are strategically placed on the user's AR head set, belt pack, and/or other ancillary devices (e.g., totems, haptic devices, gaming instruments, etc.). Electromagnetic tracking systems typically comprise at least an electromagnetic field emitter and at least one electromagnetic field sensor. The electromagnetic field emitter generates an electromagnetic field having a known spatial (and/or temporal) distribution in the environment of wearer of the AR headset. The electromagnetic filed sensors measure the generated electromagnetic fields at the locations of the sensors. Based on these measurements and knowledge of the distribution of the generated electromagnetic field, a pose (e.g., a position and/or orientation) of a field sensor relative to the emitter can be determined. Accordingly, the pose of an object to which the sensor is attached can be determined.

Figure 4:
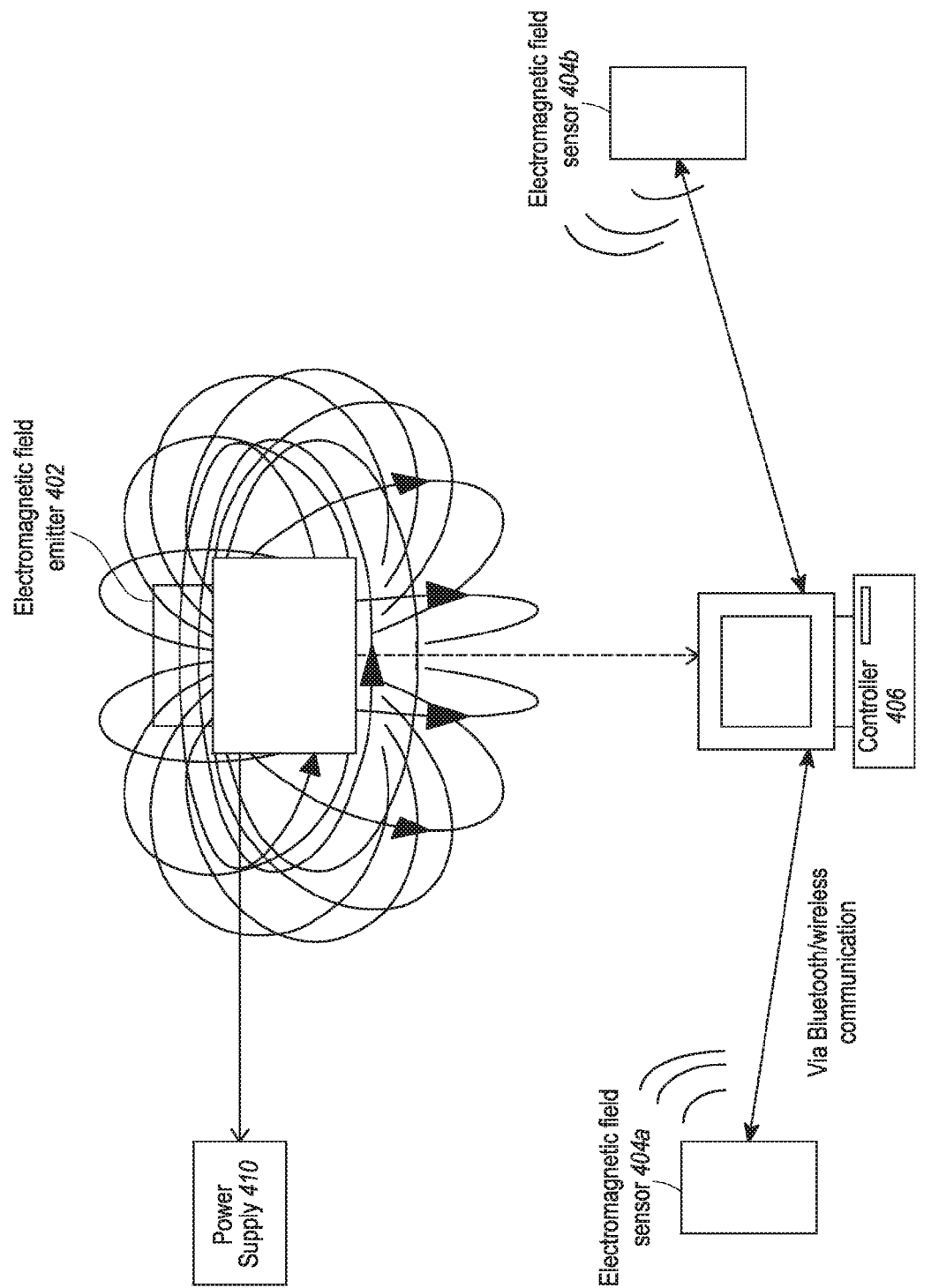
FIG. 4 schematically illustrates an example system diagram of an electromagnetic (EM) tracking system.

Referring now to FIG. 4, an example system diagram of an electromagnetic tracking system (e.g., such as those developed by organizations such as the Biosense division of Johnson & Johnson Corporation, Polhemus, Inc. of Colchester, Vt., manufactured by Sixense Entertainment, Inc. of Los Gatos, Calif., and other tracking companies) is illustrated. In one or more embodiments, the electromagnetic tracking system comprises an electromagnetic field emitter 402 which is configured to emit a known magnetic field. As shown in FIG. 4, the electromagnetic field emitter may be coupled to a power supply (e.g., electric current, batteries, etc.) to provide power to the emitter 402.

In one or more embodiments, the electromagnetic field emitter 402 comprises several coils (e.g., at least three coils positioned perpendicular to each other to produce field in the X, Y and Z directions) that generate magnetic fields. This magnetic field is used to establish a coordinate space (e.g., an X-Y-Z Cartesian coordinate space). This allows the system to map a position of the sensors (e.g., an (X, Y, Z) position) in relation to the known magnetic field, and helps determine a position and/or orientation of the sensors. In one or more embodiments, the electromagnetic sensors 404a, 404b, etc. may be attached to one or more real objects. The electromagnetic sensors 404 may comprise smaller coils in which current may be induced through the emitted electromagnetic field. Generally the "sensor" components (404) may comprise small coils or loops, such as a set of three differently-oriented (e.g., such as orthogonally oriented relative to each other) coils coupled together within a small structure such as a cube or other container, that are positioned/oriented to capture incoming magnetic flux from the magnetic field emitted by the emitter (402), and by comparing currents induced through these coils, and knowing the relative positioning and orientation of the coils relative to each other, relative position and orientation of a sensor relative to the emitter may be calculated.

Figure 6:
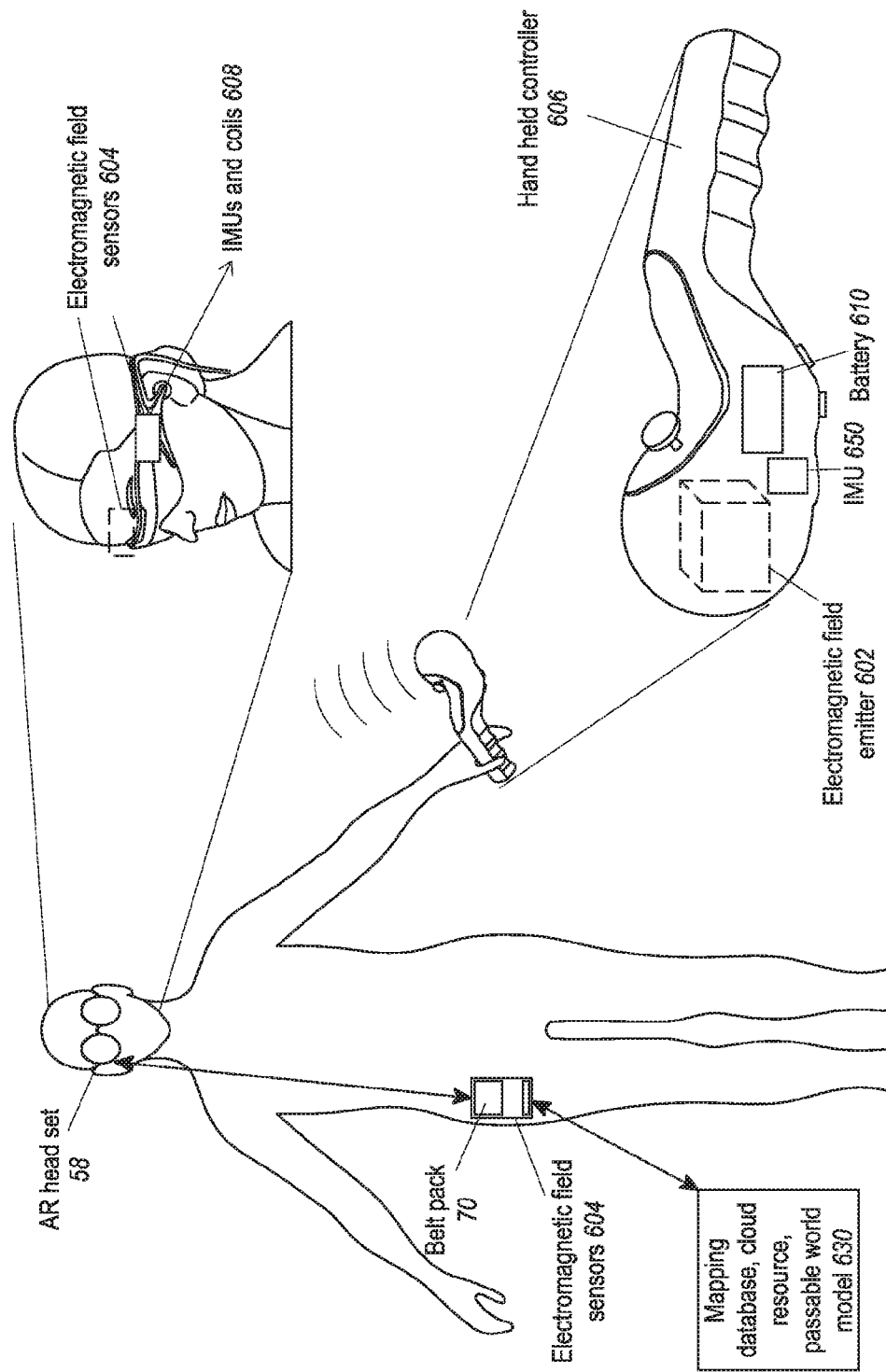
FIG. 6 schematically illustrates an example of an electromagnetic tracking system incorporated with an AR system.

One or more parameters pertaining to a behavior of the coils and inertial measurement unit ("IMU") components operatively coupled to the electromagnetic tracking sensors may be measured to detect a position and/or orientation of the sensor (and the object to which it is attached to) relative to a coordinate system to which the electromagnetic field emitter is coupled. In one or more embodiments, multiple sensors may be used in relation to the electromagnetic emitter to detect a position and orientation of each of the sensors within the coordinate space. The electromagnetic tracking system may provide positions in three directions (e.g., X, Y and Z directions), and further in two or three orientation angles. In one or more embodiments, measurements of the IMU may be compared to the measurements of the coil to determine a position and orientation of the sensors. In one or more embodiments, both electromagnetic (EM) data and IMU data, along with various other sources of data, such as cameras, depth sensors, and other sensors, may be combined to determine the position and orientation. This information may be transmitted (e.g., wireless communication, Bluetooth, etc.) to the controller 406. In one or more embodiments, pose (or position and orientation) may be reported at a relatively high refresh rate in conventional systems. Conventionally an electromagnetic field emitter is coupled to a relatively stable and large object, such as a table, operating table, wall, or ceiling, and one or more sensors are coupled to smaller objects, such as medical devices, handheld gaming components, or the like. Alternatively, as described below in reference to FIG. 6, various features of the electromagnetic tracking system may be employed to produce a configuration wherein changes or deltas in position and/or orientation between two objects that move in space relative to a more stable global coordinate system may be tracked; in other words, a configuration is shown in FIG. 6 wherein a variation of an electromagnetic tracking system may be utilized to track position and orientation delta between a head-mounted component and a hand-held component, while head pose relative to the global coordinate system (say of the room environment local to the user) is determined otherwise, such as by simultaneous localization and mapping ("SLAM") techniques using outward-capturing cameras which may be coupled to the head mounted component of the system.

The controller 406 may control the electromagnetic field generator 402, and may also capture data from the various electromagnetic sensors 404. It should be appreciated that the various components of the system may be coupled to each other through any electro-mechanical or wireless/Bluetooth means. The controller 406 may also comprise data regarding the known magnetic field, and the coordinate space in relation to the magnetic field. This information is then used to detect the position and orientation of the sensors in relation to the coordinate space corresponding to the known electromagnetic field.

One advantage of electromagnetic tracking systems is that they produce highly accurate tracking results with minimal latency and high resolution. Additionally, the electromagnetic tracking system does not necessarily rely on optical trackers, and sensors/objects not in the user's line-of-vision may be easily tracked.

It should be appreciated that the strength of the electromagnetic field v drops as a cubic function of distance r from a coil transmitter (e.g., electromagnetic field emitter 402). Thus, an algorithm may be used based on a distance away from the electromagnetic field emitter. The controller 406 may be configured with such algorithms to determine a position and orientation of the sensor/object at varying distances away from the electromagnetic field emitter. Given the rapid decline of the strength of the electromagnetic field as the sensor moves farther away from the electromagnetic emitter, best results, in terms of accuracy, efficiency and low latency, may be achieved at closer distances. In typical electromagnetic tracking systems, the electromagnetic field emitter is powered by electric current (e.g., plug-in power supply) and has sensors located within 20 ft radius away from the electromagnetic field emitter. A shorter radius between the sensors and field emitter may be more desirable in many applications, including AR applications.

Figure 5:
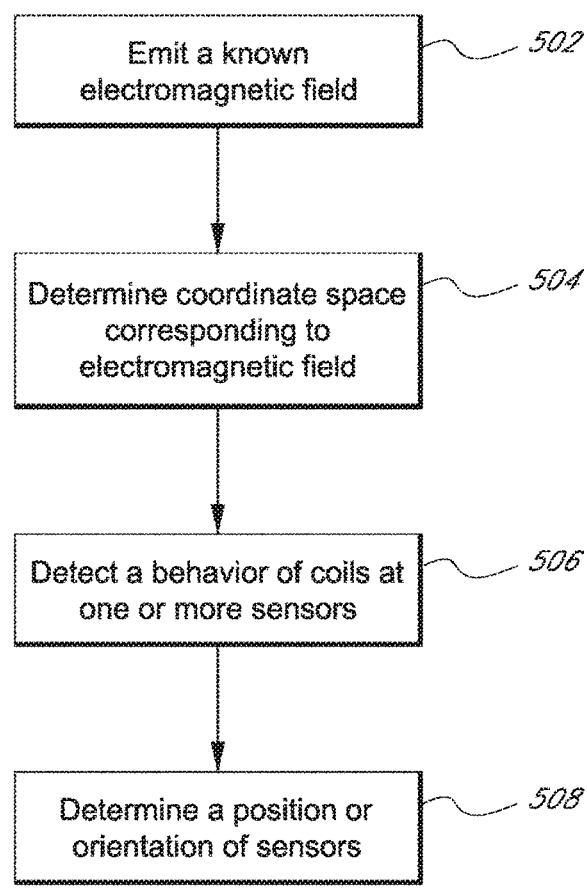
FIG. 5 is a flowchart describing example functioning of an embodiment of an electromagnetic tracking system.

Referring now to FIG. 5, an example flowchart describing a functioning of a typical electromagnetic tracking system is briefly described. At 502, a known electromagnetic field is emitted. In one or more embodiments, the magnetic field emitter may generate magnetic fields each coil may generate an electric field in one direction (e.g., X, Y or Z). The magnetic fields may be generated with an arbitrary waveform. In one or more embodiments, the magnetic field component along each of the axes may oscillate at a slightly different frequency from other magnetic field components along other directions. At 504, a coordinate space corresponding to the electromagnetic field may be determined. For example, the control 406 of FIG. 4 may automatically determine a coordinate space around the emitter based on the electromagnetic field. At 506, a behavior of the coils at the sensors (which may be attached to a known object) may be detected. For example, a current induced at the coils may be calculated. In other embodiments, a rotation of coils, or any other quantifiable behavior may be tracked and measured. At 508, this behavior may be used to detect a position or orientation of the sensor(s) and/or known object. For example, the controller 406 may consult a mapping table that correlates a behavior of the coils at the sensors to various positions or orientations. Based on these calculations, the position in the coordinate space along with the orientation of the sensors may be determined.

In the context of AR systems, one or more components of the electromagnetic tracking system may need to be modified to facilitate accurate tracking of mobile components. As described above, tracking the user's head pose and orientation may be desirable in many AR applications. Accurate determination of the user's head pose and orientation allows the AR system to display the right virtual content to the user. For example, the virtual scene may comprise a monster hiding behind a real building. Depending on the pose and orientation of the user's head in relation to the building, the view of the virtual monster may need to be modified such that a realistic AR experience is provided. Or, a position and/or orientation of a totem, haptic device or some other means of interacting with a virtual content may be important in enabling the AR user to interact with the AR system. For example, in many gaming applications, the AR system can detect a position and orientation of a real object in relation to virtual content. Or, when displaying a virtual interface, a position of a totem, user's hand, haptic device or any other real object configured for interaction with the AR system can be known in relation to the displayed virtual interface in order for the system to understand a command, etc. Conventional localization methods including optical tracking and other methods are typically plagued with high latency and low resolution problems, which makes rendering virtual content challenging in many augmented reality applications.

In one or more embodiments, the electromagnetic tracking system, discussed in relation to FIGS. 4 and 5 may be adapted to the AR system to detect position and orientation of one or more objects in relation to an emitted electromagnetic field. Typical electromagnetic systems tend to have a large and bulky electromagnetic emitters (e.g., 402 in FIG. 4), which is problematic for head-mounted AR devices. However, smaller electromagnetic emitters (e.g., in the millimeter range) may be used to emit a known electromagnetic field in the context of the AR system.

Referring now to FIG. 6, an electromagnetic tracking system may be incorporated with an AR system as shown, with an electromagnetic field emitter 602 incorporated as part of a hand-held controller 606. The controller 606 can be movable independently relative to the AR headset (or the belt pack 70). For example, the user can hold the controller 606 in his or her hand, or the controller could be mounted to the user's hand or arm (e.g., as a ring or bracelet or as part of a glove worn by the user). In one or more embodiments, the hand-held controller may be a totem to be used in a gaming scenario (e.g., a multi-degree-of-freedom controller) or to provide a rich user experience in an AR environment or to allow user interaction with an AR system. In other embodiments, the hand-held controller may be a haptic device. In yet other embodiments, the electromagnetic field emitter may simply be incorporated as part of the belt pack 70. The hand-held controller 606 may comprise a battery 610 or other power supply that powers that electromagnetic field emitter 602. It should be appreciated that the electromagnetic field emitter 602 may also comprise or be coupled to an IMU 650 component configured to assist in determining positioning and/or orientation of the electromagnetic field emitter 602 relative to other components. This may be especially advantageous in cases where both the field emitter 602 and the sensors (604) are mobile. Placing the electromagnetic field emitter 602 in the hand-held controller rather than the belt pack, as shown in the embodiment of FIG. 6, helps ensure that the electromagnetic field emitter is not competing for resources at the belt pack, but rather uses its own battery source at the hand-held controller 606. In yet other embodiments, the electromagnetic field emitter 602 can be disposed on the AR headset and the sensors 604 can be disposed on the controller 606 or belt pack 70.

In one or more embodiments, the electromagnetic sensors 604 may be placed on one or more locations on the user's headset, along with other sensing devices such as one or more IMUs or additional magnetic flux capturing coils 608. For example, as shown in FIG. 6, sensors (604, 608) may be placed on one or both sides of the head set (58). Since these sensors are engineered to be rather small (and hence may be less sensitive, in some cases), having multiple sensors may improve efficiency and precision. In one or more embodiments, one or more sensors may also be placed on the belt pack 70 or any other part of the user's body. The sensors (604, 608) may communicate wirelessly or through Bluetooth to a computing apparatus that determines a pose and orientation of the sensors (and the AR headset to which it is attached). In one or more embodiments, the computing apparatus may reside at the belt pack 70. In other embodiments, the computing apparatus may reside at the headset itself, or even the hand-held controller 606. The computing apparatus may in turn comprise a mapping database (e.g., passable world model, coordinate space, etc.) to detect pose, to determine the coordinates of real objects and virtual objects, and may even connect to cloud resources and the passable world model, in one or more embodiments.

As described above, conventional electromagnetic emitters may be too bulky for AR devices. Therefore the electromagnetic field emitter may be engineered to be compact, using smaller coils compared to traditional systems. However, given that the strength of the electromagnetic field decreases as a cubic function of the distance away from the field emitter, a shorter radius between the electromagnetic sensors 604 and the electromagnetic field emitter 602 (e.g., about 3 to 3.5 ft) may reduce power consumption when compared to conventional systems such as the one detailed in FIG. 4.

This aspect may either be utilized to prolong the life of the battery 610 that may power the controller 606 and the electromagnetic field emitter 602, in one or more embodiments. Or, in other embodiments, this aspect may be utilized to reduce the size of the coils generating the magnetic field at the electromagnetic field emitter 602. However, in order to get the same strength of magnetic field, the power may be need to be increased. This allows for a compact electromagnetic field emitter unit 602 that may fit compactly at the hand-held controller 606.

Several other changes may be made when using the electromagnetic tracking system for AR devices. Although this pose reporting rate is rather good, AR systems may require an even more efficient pose reporting rate. To this end, IMU-based pose tracking may (additionally or alternatively) be used in the sensors. Advantageously, the IMUs may remain as stable as possible in order to increase an efficiency of the pose detection process. The IMUs may be engineered such that they remain stable up to 50-100 milliseconds. It should be appreciated that some embodiments may utilize an outside pose estimator module (e.g., IMUs may drift over time) that may enable pose updates to be reported at a rate of 10 to 20 Hz. By keeping the IMUs stable at a reasonable rate, the rate of pose updates may be dramatically decreased to 10 to 20 Hz (as compared to higher frequencies in conventional systems).

If the electromagnetic tracking system can be run at, for example, a 10% duty cycle (e.g., only pinging for ground truth every 100 milliseconds), this would be another way to save power at the AR system. This would mean that the electromagnetic tracking system wakes up every 10 milliseconds out of every 100 milliseconds to generate a pose estimate. This directly translates to power consumption savings, which may, in turn, affect size, battery life and cost of the AR device.

In one or more embodiments, this reduction in duty cycle may be strategically utilized by providing two hand-held controllers (not shown) rather than just one. For example, the user may be playing a game that requires two totems, etc. Or, in a multi-user game, two users may have their own totems/hand-held controllers to play the game. When two controllers (e.g., symmetrical controllers for each hand) are used rather than one, the controllers may operate at offset duty cycles. The same concept may also be applied to controllers utilized by two different users playing a multiplayer game, for example.

Figure 7:
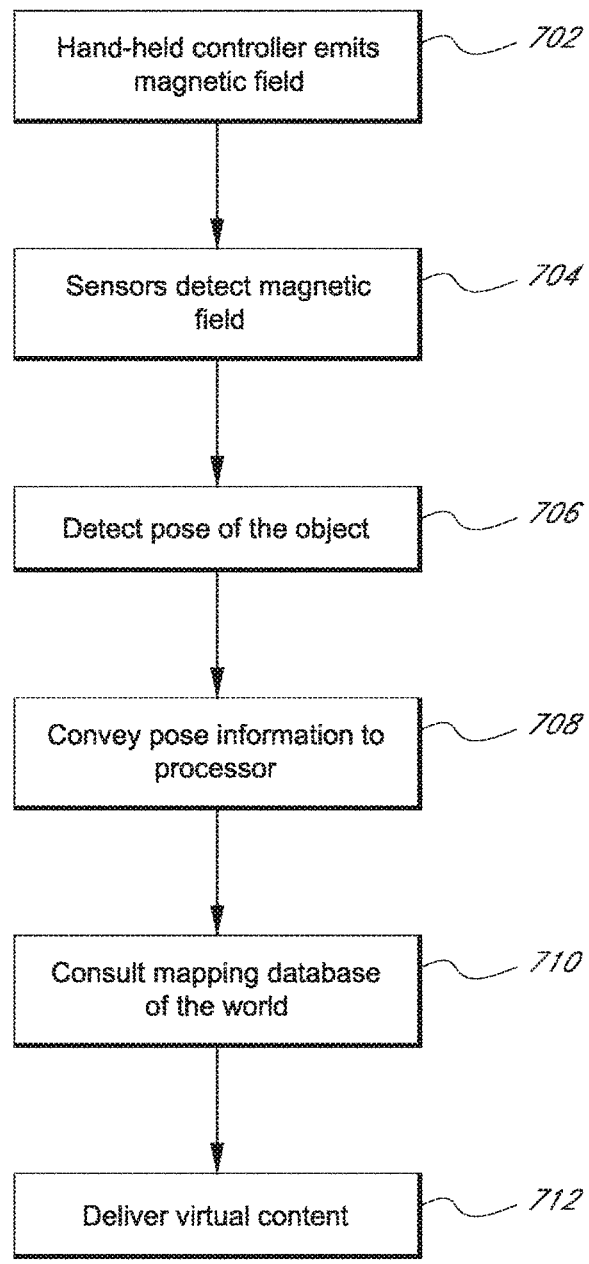
FIG. 7 is a flowchart describing functioning of an example of an electromagnetic tracking system in the context of an AR device.

Referring now to FIG. 7, an example flow chart describing the electromagnetic tracking system in the context of AR devices is described. At 702, a portable (e.g., hand-held) controller emits a magnetic field. At 704, the electromagnetic sensors (placed on headset, belt pack, etc.) detect the magnetic field. At 706, a pose (e.g., position or orientation) of the headset/belt is determined based on a behavior of the coils/IMUs at the sensors. At 708, the pose information is conveyed to the computing apparatus (e.g., at the belt pack or headset). At 710, optionally, a mapping database (e.g., passable world model) may be consulted to correlate the real world coordinates (e.g., determined for the pose of the headset/belt) with the virtual world coordinates. At 712, virtual content may be delivered to the user at the AR headset and displayed to the user (e.g., via the light field displays described herein). It should be appreciated that the flowchart described above is for illustrative purposes only, and should not be read as limiting.

Advantageously, using an electromagnetic tracking system similar to the one outlined in FIG. 6 enables pose tracking (e.g., head position and orientation, position and orientation of totems, and other controllers). This allows the AR system to project virtual content (based at least in part on the determined pose) with a higher degree of accuracy, and very low latency when compared to optical tracking techniques.

Referring to FIG. 8, a system configuration is illustrated wherein featuring many sensing components. A head mounted wearable component (58) is shown operatively coupled (68) to a local processing and data module (70), such as a belt pack, here using a physical multicore lead which also features a control and quick release module (86) as described below in reference to FIGS. 9A-9F. The local processing and data module (70) is operatively coupled (100) to a hand held component (606), here by a wireless connection such as low power Bluetooth; the hand held component (606) may also be operatively coupled (94) directly to the head mounted wearable component (58), such as by a wireless connection such as low power Bluetooth. Generally where IMU data is passed to coordinate pose detection of various components, a high-frequency connection is desirable, such as in the range of hundreds or thousands of cycles/second or higher; tens of cycles per second may be adequate for electromagnetic localization sensing, such as by the sensor (604) and transmitter (602) pairings. Also shown is a global coordinate system (10), representative of fixed objects in the real world around the user, such as a wall (8).

Cloud resources (46) also may be operatively coupled (42, 40, 88, 90) to the local processing and data module (70), to the head mounted wearable component (58), to resources which may be coupled to the wall (8) or other item fixed relative to the global coordinate system (10), respectively. The resources coupled to the wall (8) or having known positions and/or orientations relative to the global coordinate system (10) may include a wireless transceiver (114), an electromagnetic emitter (602) and/or receiver (604), a beacon or reflector (112) configured to emit or reflect a given type of radiation, such as an infrared LED beacon, a cellular network transceiver (110), a RADAR emitter or detector (108), a LIDAR emitter or detector (106), a GPS transceiver (118), a poster or marker having a known detectable pattern (122), and a camera (124).

The head mounted wearable component (58) features similar components, as illustrated, in addition to lighting emitters (130) configured to assist the camera (124) detectors, such as infrared emitters (130) for an infrared camera (124); also featured on the head mounted wearable component (58) are one or more strain gauges (116), which may be fixedly coupled to the frame or mechanical platform of the head mounted wearable component (58) and configured to determine deflection of such platform in between components such as electromagnetic receiver sensors (604) or display elements (62), wherein it may be valuable to understand if bending of the platform has occurred, such as at a thinned portion of the platform, such as the portion above the nose on the eyeglasses-like platform depicted in FIG. 8.

The head mounted wearable component (58) also features a processor (128) and one or more IMUs (102). Each of the components preferably are operatively coupled to the processor (128). The hand held component (606) and local processing and data module (70) are illustrated featuring similar components. As shown in FIG. 8, with so many sensing and connectivity means, such a system is likely to be heavy, power hungry, large, and relatively expensive. However, for illustrative purposes, such a system may be utilized to provide a very high level of connectivity, system component integration, and position/orientation tracking. For example, with such a configuration, the various main mobile components (58, 70, 606) may be localized in terms of position relative to the global coordinate system using WiFi, GPS, or Cellular signal triangulation; beacons, electromagnetic tracking (as described herein), RADAR, and LIDAR systems may provide yet further location and/or orientation information and feedback. Markers and cameras also may be utilized to provide further information regarding relative and absolute position and orientation. For example, the various camera components (124), such as those shown coupled to the head mounted wearable component (58), may be utilized to capture data which may be utilized in simultaneous localization and mapping protocols, or "SLAM", to determine where the component (58) is and how it is oriented relative to other components.

Figure 9A:
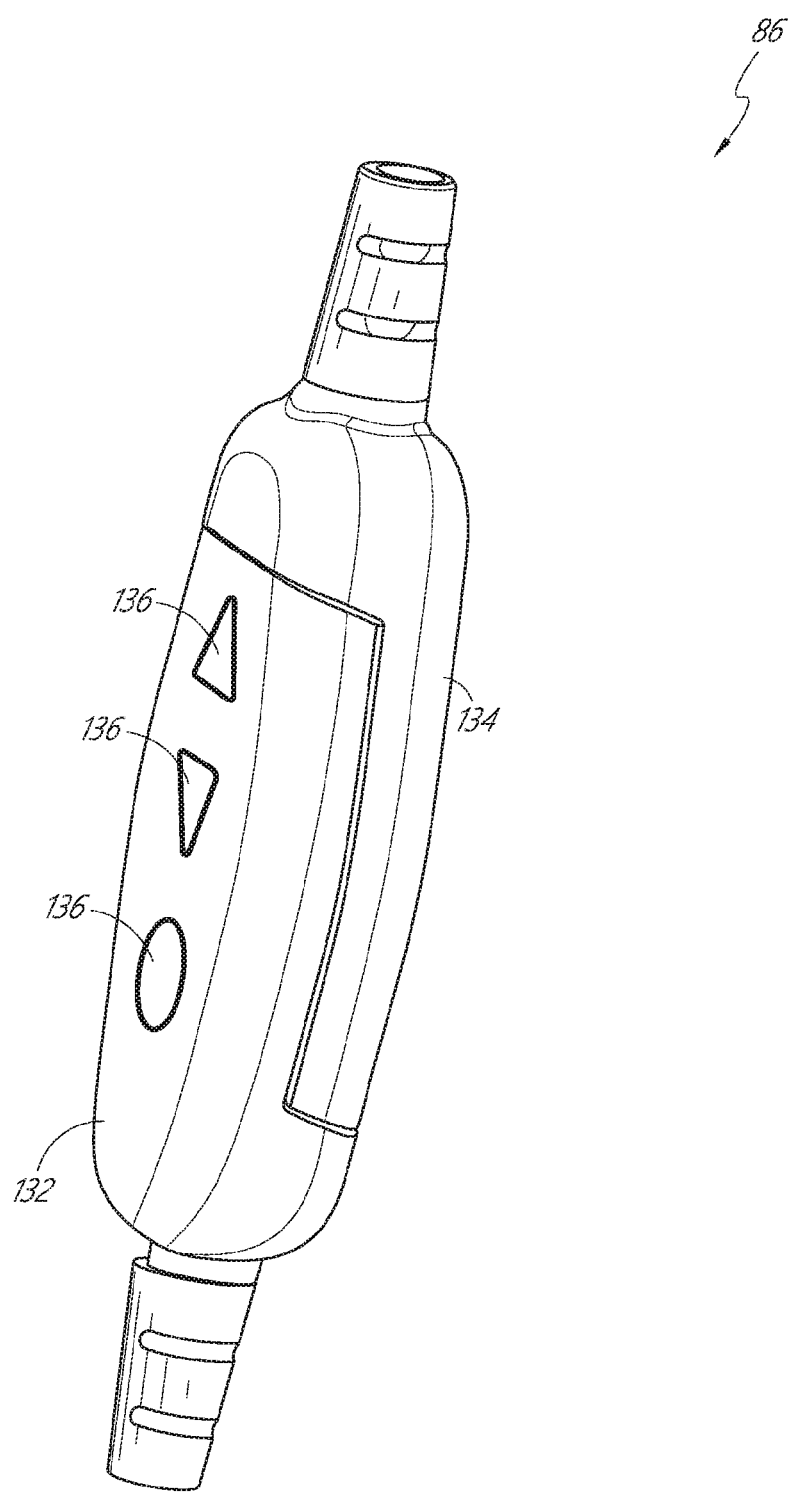
FIGS. 9A-9F schematically illustrate examples of a quick release module.

Referring to FIGS. 9A-9F, various aspects of the control and quick release module (86) are depicted. Referring to FIG. 9A, two outer housing components (132, 134) are coupled together using a magnetic coupling configuration which may be enhanced with mechanical latching. Buttons (136) for operation of the associated system may be included, for example, an on/off button (circular button) and up/down volume controls (triangular buttons). Opposing ends of the module 86 can be connected to electrical leads running between the local processing and data module (70) and the display (62) as shown in FIG. 8.

Figure 9B:
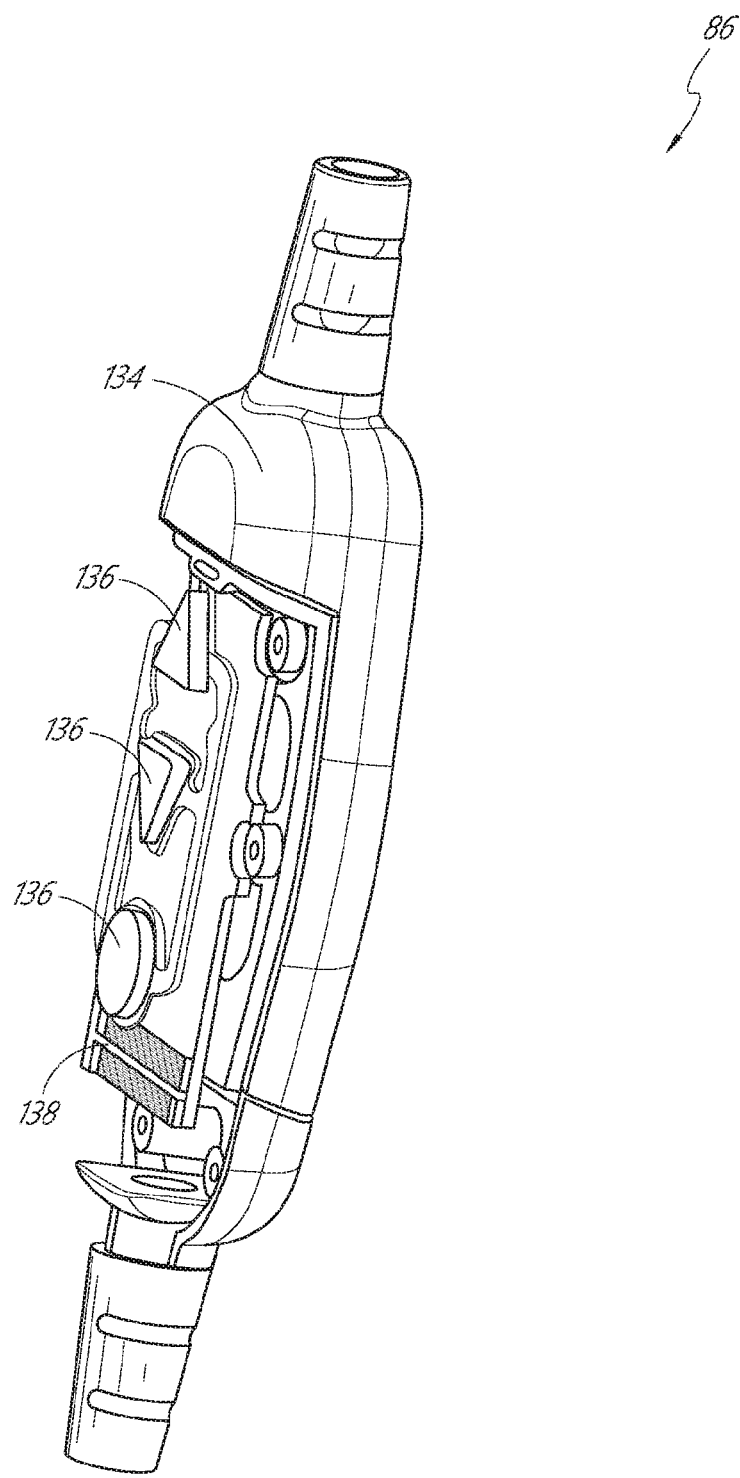
Figure 9C:
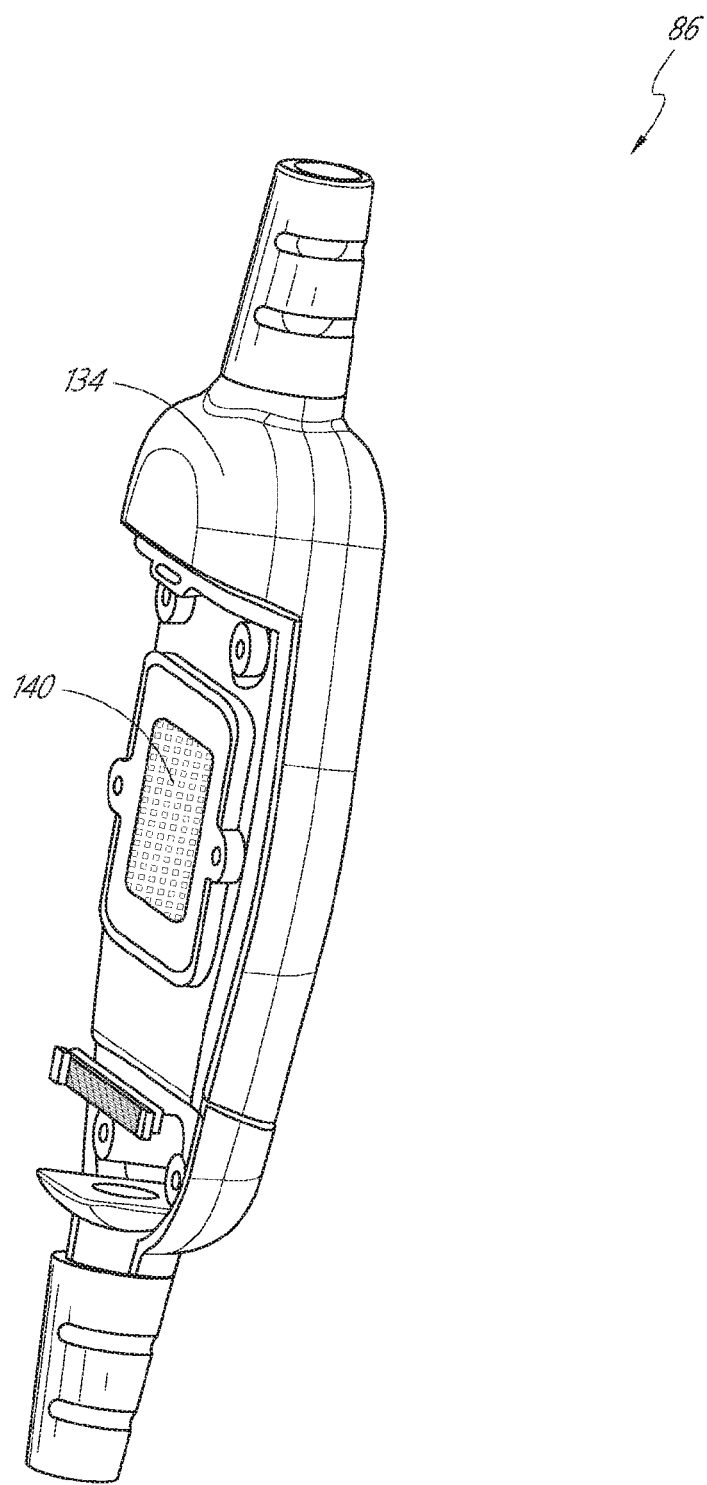
Figure 9D:
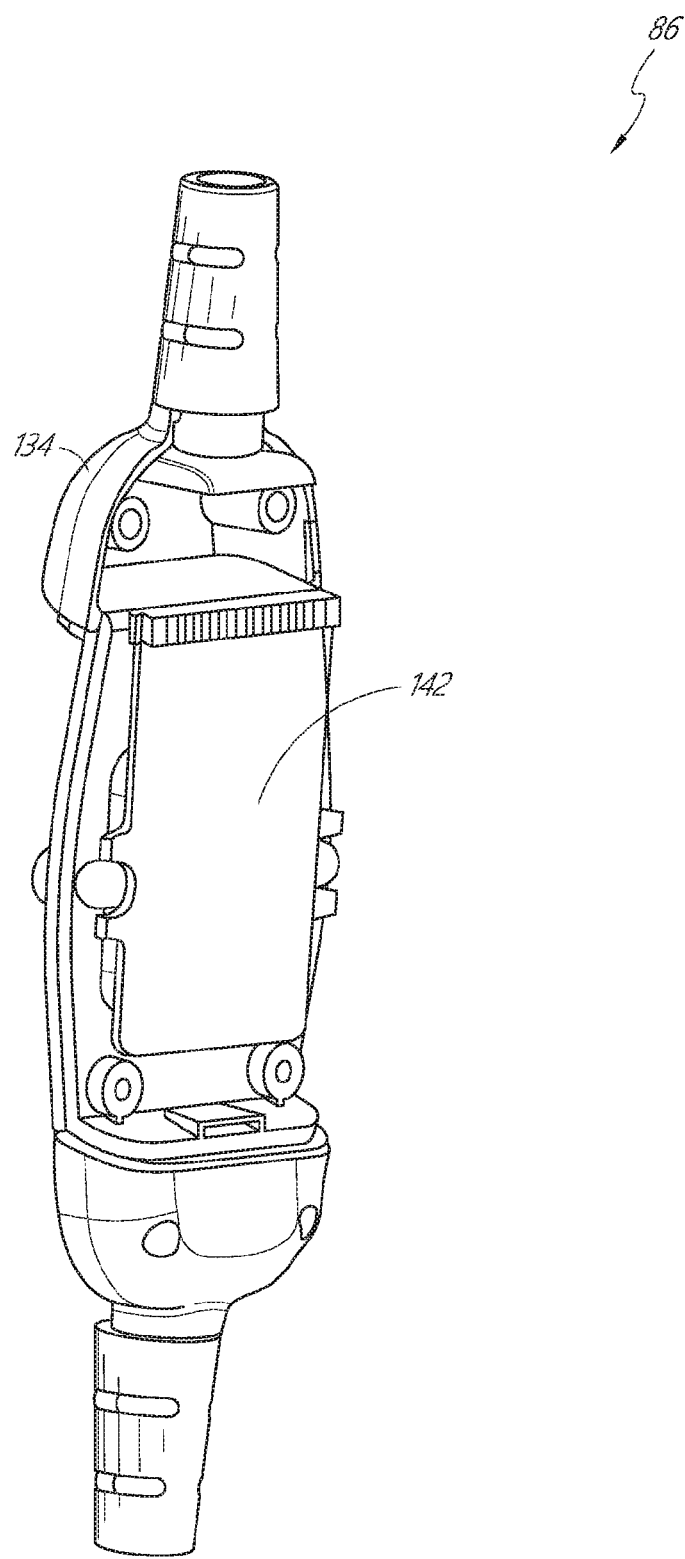
Figure 9E:
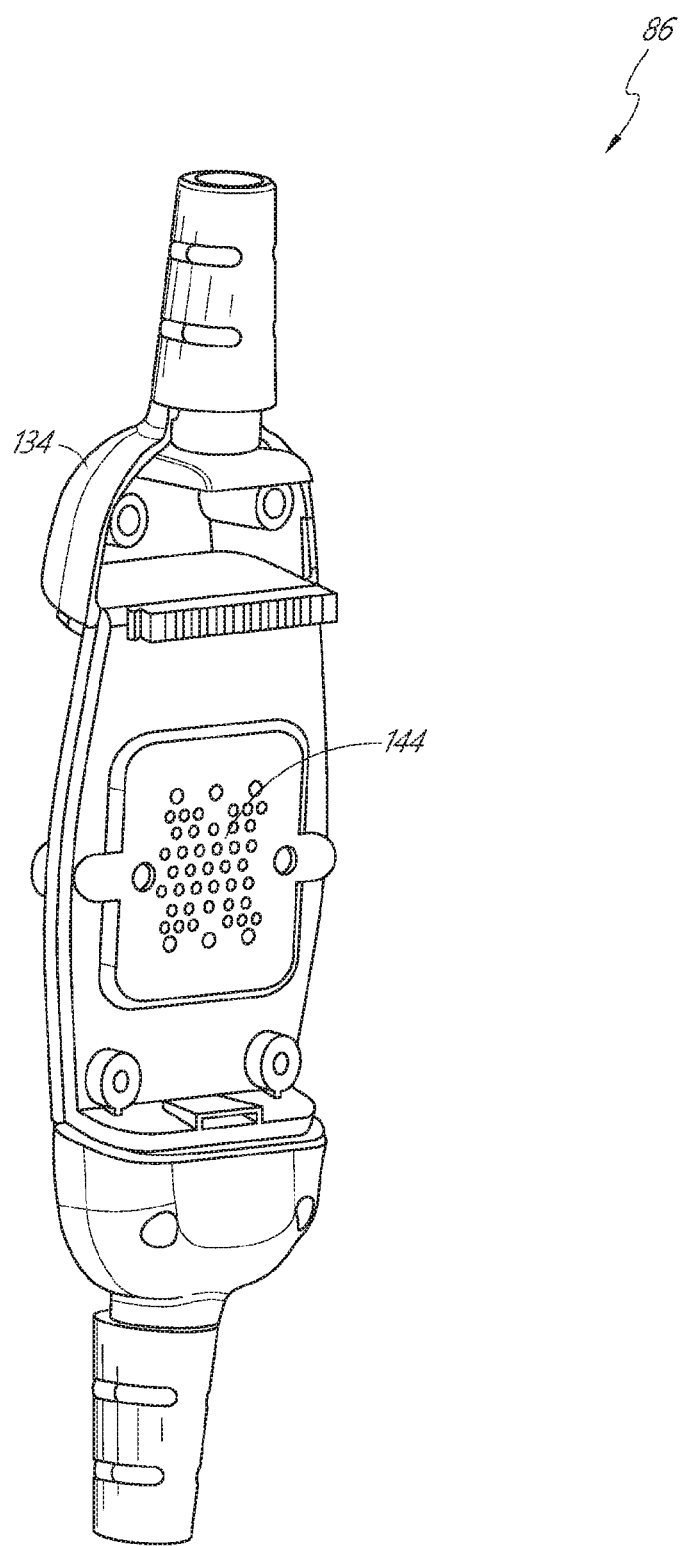

FIG. 9B illustrates a partial cutaway view with the outer housing (132) removed showing the buttons (136) and the underlying top printed circuit board (138). Referring to FIG. 9C, with the buttons (136) and underlying top printed circuit board (138) removed, a female contact pin array (140) is visible. Referring to FIG. 9D, with an opposite portion of housing (134) removed, the lower printed circuit board (142) is visible. With the lower printed circuit board (142) removed, as shown in FIG. 9E, a male contact pin array (144) is visible.

Figure 9F:
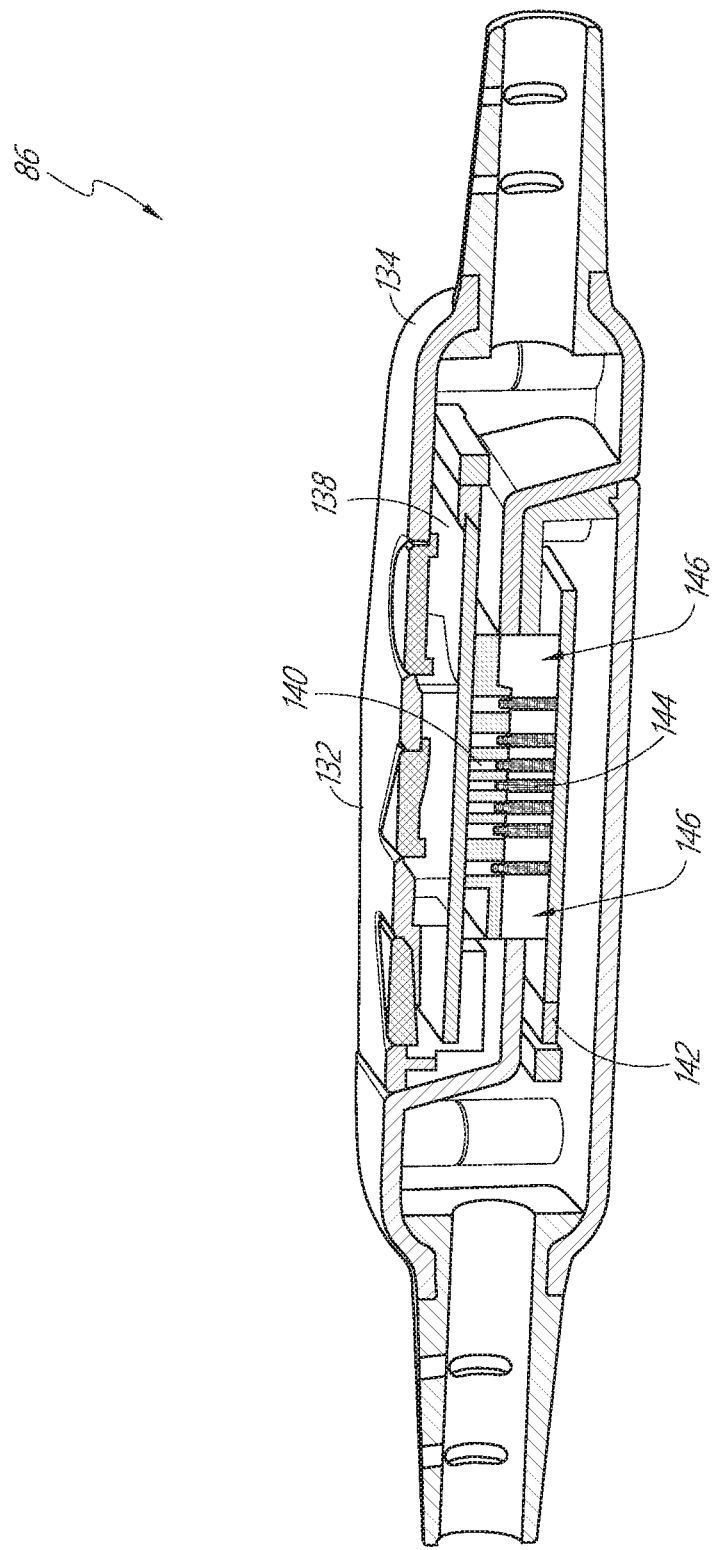

Referring to the cross-sectional view of FIG. 9F, at least one of the male pins or female pins are configured to be spring-loaded such that they may be depressed along each pin's longitudinal axis; the pins may be termed "pogo pins" and generally comprise a highly conductive material, such as copper or gold. The conductive material may be plated onto the pins (e.g., immersion or electroplating) and the width of the conductive material may be, e.g., at least 25 μm of gold in some cases. When assembled, the illustrated configuration mates 46 male pins with 46 corresponding female pins, and the entire assembly may be quick-release decoupled by manually pulling the two housings (132, 134) apart and overcoming a magnetic interface (146) load which may be developed using north and south magnets oriented around the perimeters of the pin arrays (140, 144). In one embodiment, an approximate 2 kg load from compressing the 46 pogo pins is countered with a closure maintenance force of about 4 kg provided by the magnetic interface (146). The pins in the array may be separated by about 1.3 mm, and the pins may be operatively coupled to conductive lines of various types, such as twisted pairs or other combinations to support interfaces such as USB 3.0, HDMI 2.0 (for digital video), and I2S (for digital audio), transition-minimized differential signaling (TMDS) for high speed serial data, general purpose input/output (GPIO), and mobile interface (e.g., MIPI) configurations, battery/power connections, and high current analog lines and grounds configured for up to about 4 amps and 5 volts in one embodiment.

In one embodiment, the magnetic interface (146) is generally rectangular and surrounds the pin arrays (140, 144) and is about 1 mm wide and 4.8 mm high. The inner diameter of the rectangular magnet is about 14.6 mm. The magnet surrounding the male pin array (144) may have a first polarity (e.g., north), and the magnet surrounding the female pin array (140) may have a second (opposite) polarity (e.g., south). In some cases, each magnet comprises a mixture of north and south polarities, with the opposing magnet having corresponding opposite polarities, to provide a magnetic attraction to assist holding the housings (132, 134) together.

The pogo pins in the arrays (140, 144) have heights in a range of 4.0 to 4.6 mm and diameters in a range of 0.6 to 0.8 mm. Different pins in the array can have different heights, diameters, and pitches. For example, in one implementation, the pin arrays (140, 144) have a length of about 42 to 50 mm, a width of about 7 to 10 mm, and a height of about 5 mm. The pitch of the pin array for USB 2.0 and other signals can be about 1.3 mm, and the pitch of the pin array for high speed signals can be about 2.0 to 2.5 mm.

Figure 10:
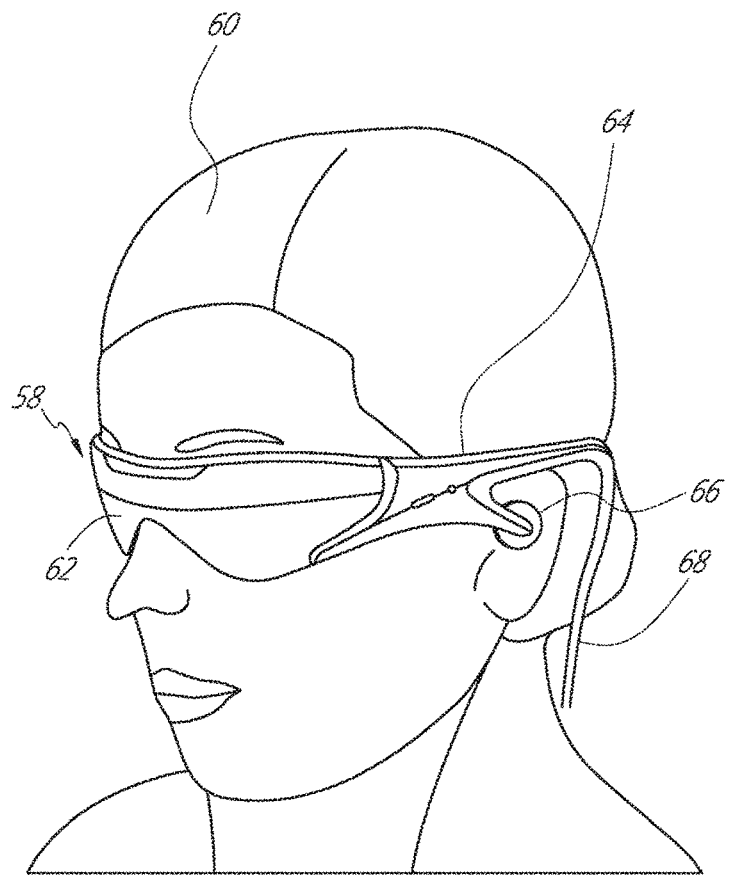
FIG. 10 schematically illustrates a head-mounted display system.

Referring to FIG. 10, it can be helpful to have a minimized component/feature set to be able to reduce or minimize the weight or bulk of the various components, and to arrive at a relatively slim head mounted component, for example, such as that (58) featured in FIG. 10. Thus various permutations and combinations of the various components shown in FIG. 8 may be utilized.

Example Electromagnetic Sensing Components in an AR System

Figure 11A:
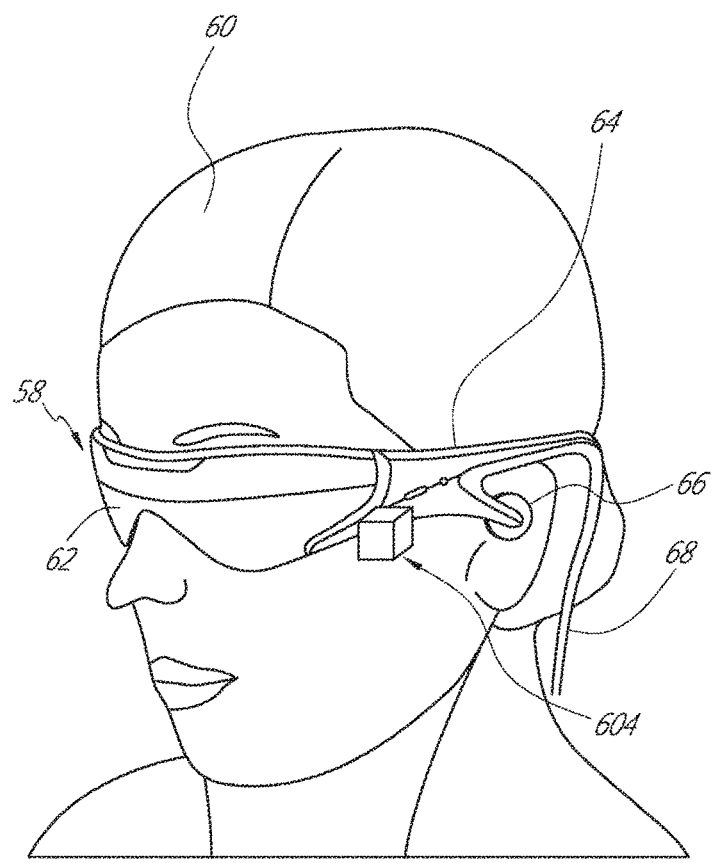
FIGS. 11A and 11B schematically illustrate examples of electromagnetic sensing coils coupled to a head-mounted display.
Figure 11B:
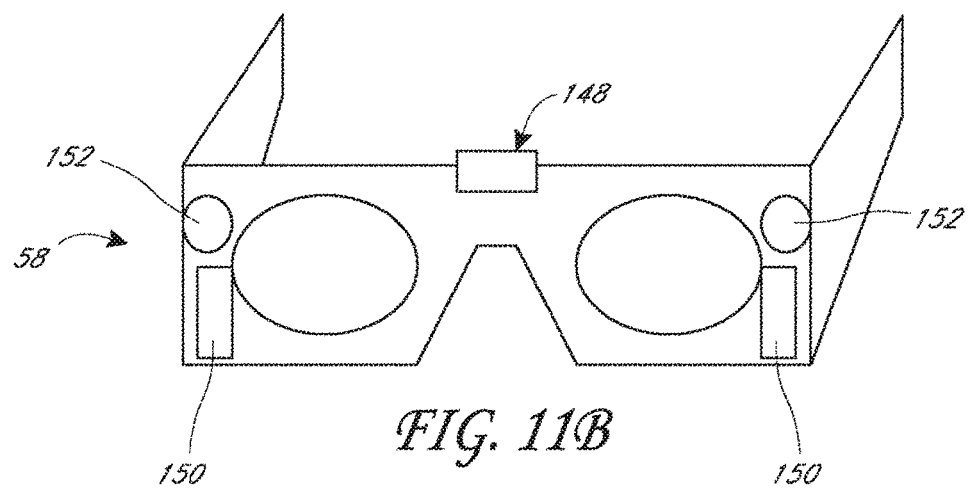

Referring to FIG. 11A, an electromagnetic sensing coil assembly (604, e.g., 3 individual coils coupled to a housing) is shown coupled to a head mounted component (58); such a configuration adds additional geometry to the overall assembly which may not be desirable. Referring to FIG. 11B, rather than housing the coils in a box or single housing 604 as in the configuration of FIG. 11A, the individual coils may be integrated into the various structures of the head mounted component (58), as shown in FIG. 11B. FIG. 11B shows examples of locations on the head-mounted display 58 for X-axis coils (148), Y-axis coils (150), and Z-axis coils (152). Thus, the sensing coils can be distributed spatially on or about the head-mounted display (58) to provide a desired spatial resolution or accuracy of the localization and/or orientation of the display (58) by the electromagnetic tracking system.

Figure 12E:
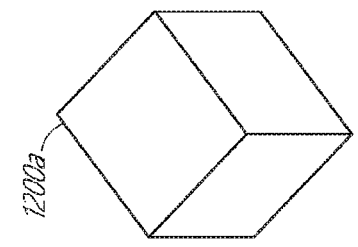
FIGS. 12A-12E schematically illustrate example configurations of a ferrite core that can be coupled to an electromagnetic sensor.
Figure 12D:
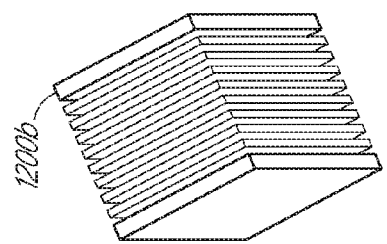
Figure 12C:
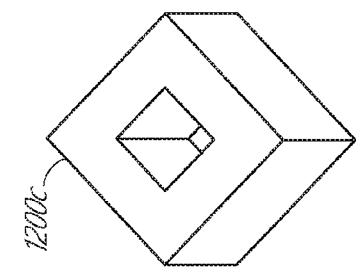
Figure 12B:
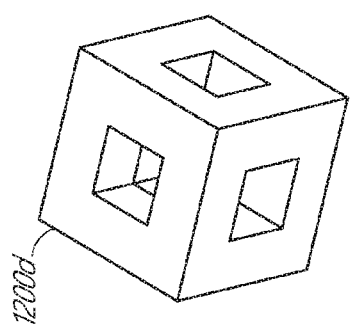
Figure 12A:
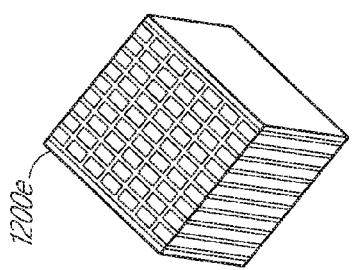

FIGS. 12A-12E illustrate various configurations for using a ferrite core 1200a-1200e coupled to an electromagnetic sensor to increase field sensitivity. FIG. 12A illustrates a solid ferrite core 1200a in a shape of a cube, FIG. 12B shows a ferrite core 1200b configured as a plurality of rectangular disks spaced apart from each other, FIG. 12C shows a ferrite core 1200c having a single axis air core, FIG. 12D shows a ferrite core 1200d having a three-axis air core, and FIG. 12E shows a ferrite core 1200e comprising a plurality of ferrite rods in a housing (which may be made from plastic). The embodiments 1200b-1200e of FIGS. 12B-12E are lighter in weight than the solid core embodiment 1200a of FIG. 12A and may be utilized to save mass. Although shown as a cube in FIGS. 12A-12E, the ferrite core can be shaped differently in other embodiments.

Frequency Division Multiplexing, Time Division Multiplexing, and Gain Control for EM Tracking Systems Conventional EM tracking solutions typically employ either a frequency division multiplexed (FDM) circuit design or a time division multiplexed (TDM) circuit design. However, an FDM design typically uses more current and a TDM design typically supports only a limited number of users. As described further below, a circuit design that merges both the FDM and TDM designs may achieve the benefits of both. Advantages of such a design can include savings on the area of the printed circuit board (PCB), material costs, number of parts used, and/or current drain as compared to conventional designs. The design can also allow for multiple users at improved or optimum performance.

FIG. 13A is a block diagram that schematically illustrates an example of an EM transmitter (TX) circuit 1302 that is frequency division multiplexed. The EM transmitter circuit can drive three tuned orthogonal coils in an EM tracking system. The time-varying EM field generated by the EM TX can be sensed by an EM receiver (e.g., described with reference to FIG. 13B). This circuit uses a master control unit (MCU) to control three different synthesizers at three different radio frequency (RF) frequencies (f1, f2, and f3) whose outputs are filtered (e.g., at bandpass filters (BPF) and optional ferrite beads (FB)) and amplified (e.g., via pre-amplifiers (PA)) and fed to respective X, Y, Z coils. The circuit also employs a current sensing control circuit (R-sense and Current Ctrl) that ensures that the current into each coil remains constant. This circuit also has an RF wireless communication interface (e.g., Bluetooth Low Energy (BLE)) connected to the MCU that communicates with an EM receiver unit described with reference to FIG. 13B.

FIG. 13B is a block diagram that schematically illustrates an example of an EM receiver (RX) circuit 1304 that is frequency division multiplexed. The EM receiver uses three orthogonal coils (X-coil operating at frequency f1, Y-coil operating at frequency f2, and Z-coil operating at frequency f3) to receive the time-varying EM signals generated by the EM TX circuit 1302 (see, e.g., FIG. 13A). The three signals are individually amplified (e.g., via pre-amplifiers (PA)) and filtered (e.g., by bandpass filters (BPF)) in parallel. Optionally, the filter output may be further amplified. The amplified output is then fed into an analog-to-digital (ADC) and the digital signals are processed by a digital signal processor (DSP). The DSP can control the gain of the pre-amplifiers to keep the ADC from saturating. This receiver design also has a radio frequency (RF) communication link connected to the DSP (or an MCU) that communicates with the EM transmitter (e.g., described with reference to FIG. 13B). The RF link can be configured to support any suitable wireless standard, including Bluetooth Low Energy (BLE).

The EM TX and RX circuits 1302, 1304 shown in FIGS. 13A and 13B (as well as the TX and RX circuits described below with reference to FIGS. 13C-13J) can be used for EM tracking. For example, the EM TX circuit 1302 can be used in the EM field emitter 402 and the EM RX circuit 1304 used in the EM field sensor 404 described with reference to FIG. 4. Additional embodiments of EM TX and RX circuits will be described that can provide advantages such as, e.g., reduced part count, reduced PCB area, lower material costs, and which may allow for multiple users at optimum performance.

Figure 13C:
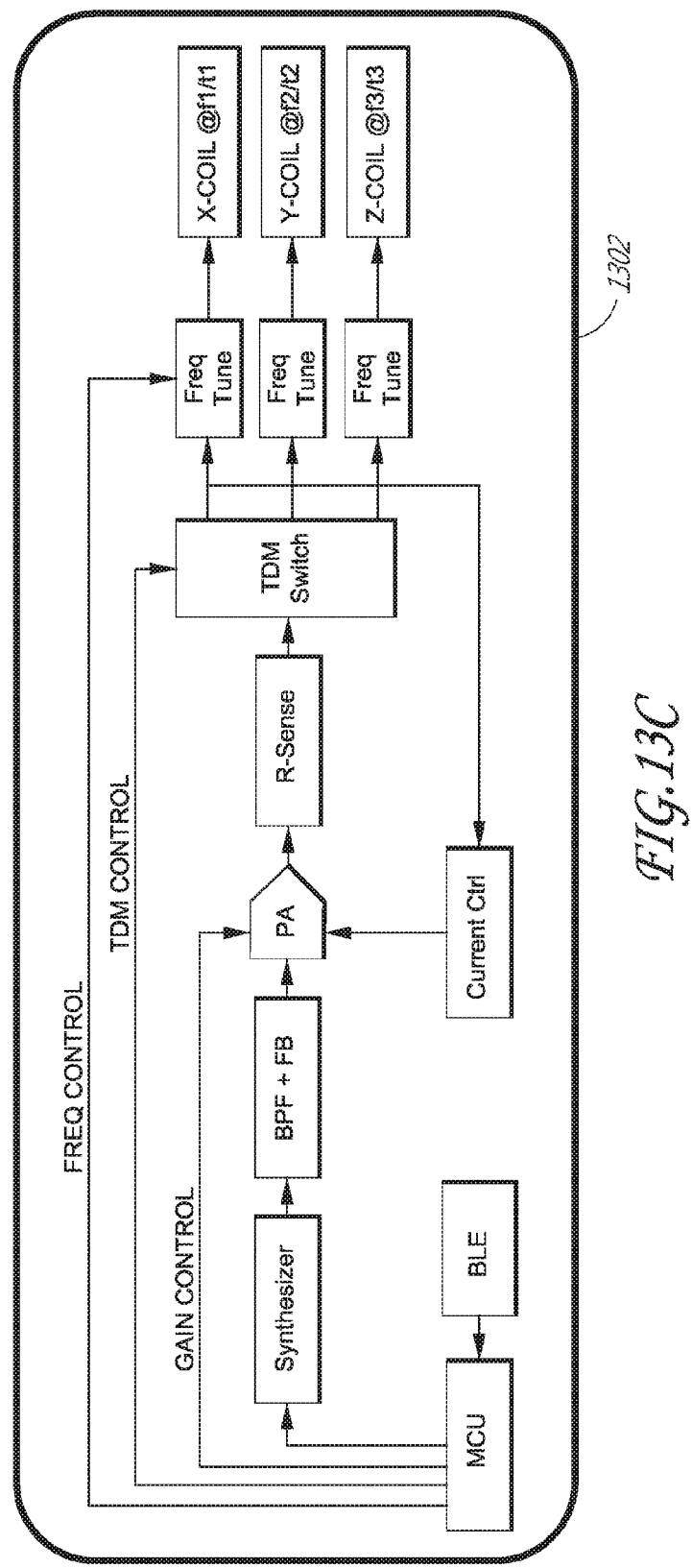
FIG. 13C is a block diagram that schematically illustrates an example of an EM transmitter circuit that is time division multiplexed (TDM).

FIG. 13C is a block diagram that schematically illustrates an example of an EM transmitter circuit 1302 that is time division multiplexed. In this embodiment, the FDM circuit of FIG. 13A has been changed to a time division multiplexed circuit. The TDM circuit uses only one path that is divided into the 3 orthogonal coils. The X, Y, and Z-coils operate, respectively, at frequencies f1, f2, and f3 to generate the time-varying EM fields that are received by an EM receiver circuit. The TDM circuity can operate these coils at respective times t1, t2, and t3 according to a TDM timing protocol (see, e.g., FIGS. 13F and 13G). Automatic Gain Control (AGC) can be included in the transmitter circuit (further described below with reference to FIGS. 13I and 13J). Each coil can be dynamically frequency tuned to a desired frequency assigned by the MCU.

Dynamic Frequency Tuning

Figure 13D:
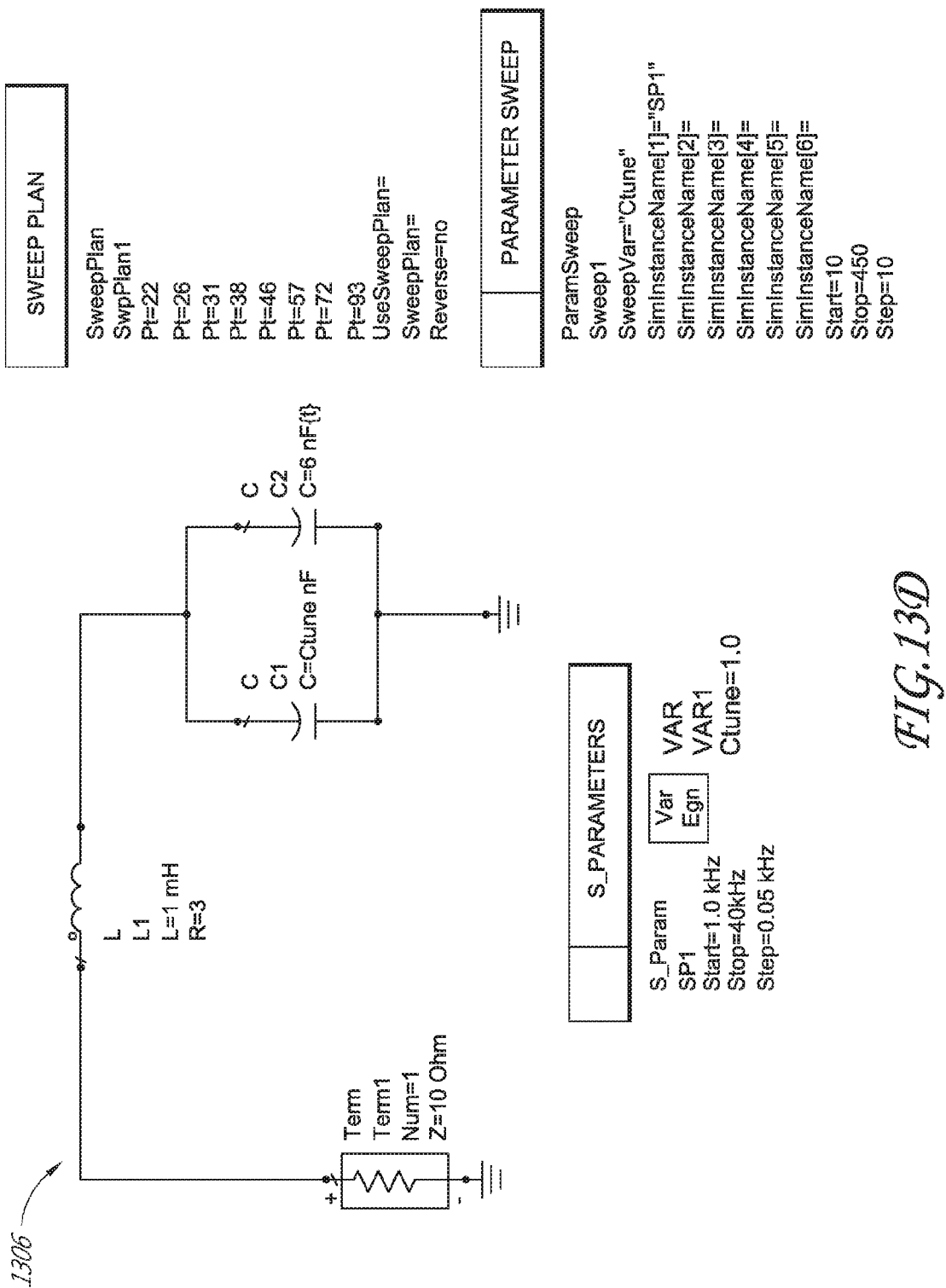
FIG. 13D is a block diagram that schematically illustrates an example of a dynamically tunable circuit for an EM transmitter.
Figure 13E:
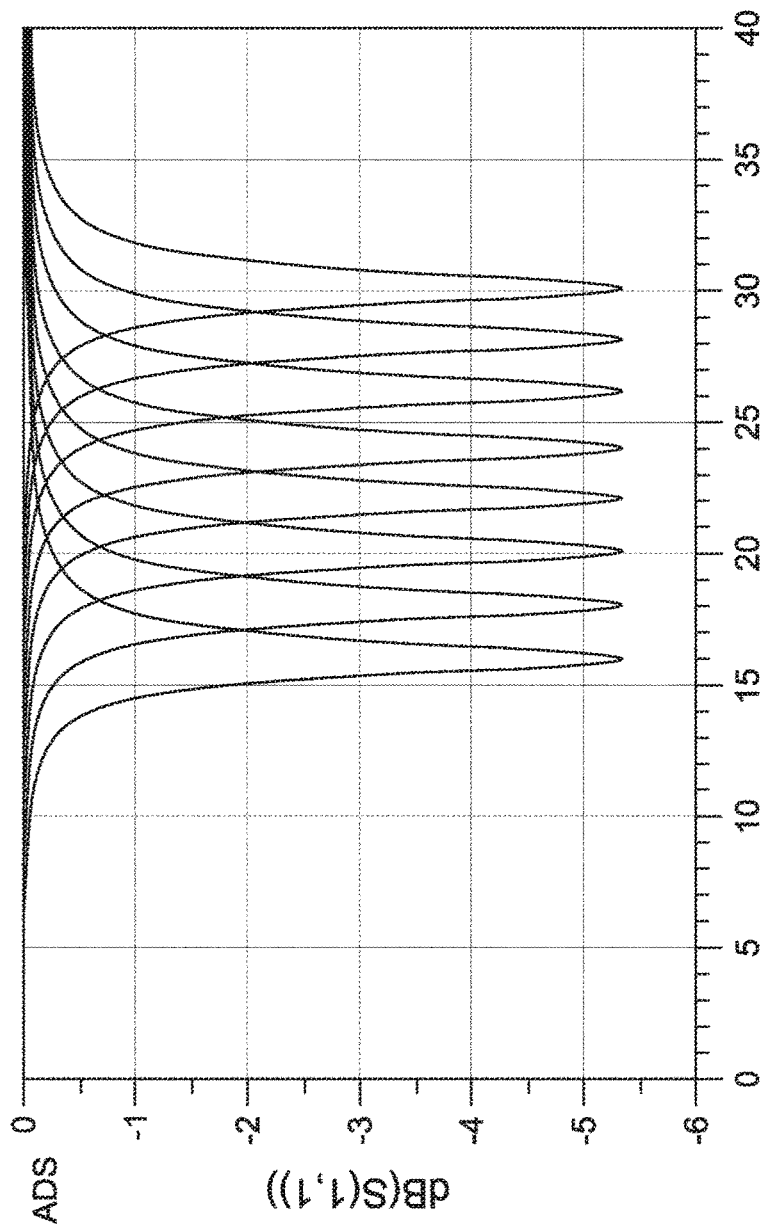
FIG. 13E is a graph showing examples of resonances that can be achieved by dynamically tuning the circuit shown in FIG. 13D.

Dynamic frequency tuning can be used to achieve resonance on each coil to obtain increased or maximum current flow in an EM TX circuit. Dynamic frequency tuning can be used to accommodate multiple users. FIG. 13D is a block diagram that schematically illustrates an example of a dynamically tunable circuit 1306. Other embodiments of dynamically tunable circuits 1306 are described with reference to FIGS. 17D-17G. In the circuit shown in FIG. 13D, a transmit coil is represented by an inductor L1. A static capacitor (C2) is in parallel with a tunable capacitor (C1). In this example, the frequency generated by the coil by tuning the capacitor C1 covers a frequency range from 16 kHz to 30 kHz. FIG. 13E is a graph showing examples of the resonances at various frequencies (from 16 kHz to 30 kHz) that can be achieved by dynamically tuning the circuit 1306 shown in FIG. 13D. In order to accommodate multiple users, the example dynamic frequency tuning circuit can employ one transmit (TX) frequency per user. Examples of the frequency assignments are shown in Table 1.

TABLE 1

Example Frequency Assignments

| | |
|---|---|
| Start Frequency | 16 kHz |
| Stop Frequency | 30 kHz |
| # of Users | 4 |
| # of Frequencies per coil | 1 |
| # of TX Frequencies per user | 2 |
| Frequency Range | 14 kHz |
| Channel Spacing | 2 kHz |
| Total Frequencies Required | 8 |

Time Division Multiplexing

In some embodiments, to achieve time division multiplexing on the transmitter, synchronization between the transmitter and receiver circuits may be utilized. Two possible scenarios for synchronization are discussed below.

A first scenario uses synchronization through the RF wireless interface (e.g., BLE) of both the receiver and the transmitter. The wireless RF link can be used to synchronize the clocks of both the transmitter and the receiver. After synchronization is achieved, time division multiplexing can be referenced to the on-board real-time clock (RTC).

A second scenario uses synchronization through an electromagnetic pulse. The time of flight of the EM pulse will be significantly shorter than tolerances typically used in the TDM circuit and may be ignored. A TX EM pulse is sent by the transmitter to the receiver, which calculates the time difference between the receiver clock and the transmitter clock. This time difference is communicated over the RF wireless link as a known offset or is used to adjust the reference on the wireless interface (e.g., BLE) clock.

Figure 13F:
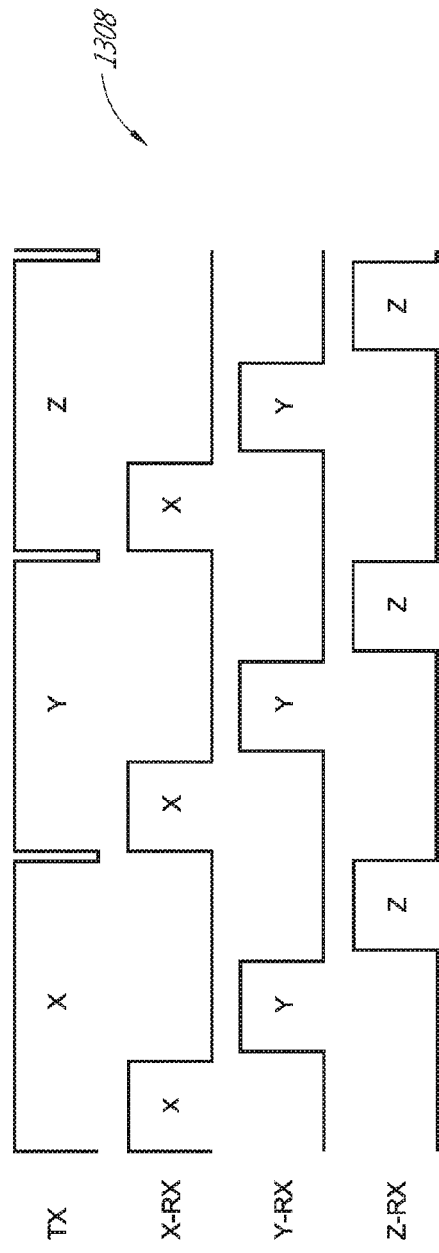
FIG. 13F illustrates an example of a timing diagram for a time division multiplexed EM transmitter and receiver.

In some embodiments, one or both of these synchronization scenarios can be implemented. After synchronization is completed, a time sequence for TDM for the transmitter and receiver can be established. FIG. 13F illustrates an example of a TDM timing diagram 1308. The TX on the X-coil will stay on for a first time period that allows the X, Y, and Z coils of the receiver to receive the magnetic flux generated by the X-coil. During the first time period, the TXs on the Y-coil and the Z-coil are substantially off (e.g., the coils are fully off or operating at a voltage much less (e.g., <10%, <5%, <1%, etc.) than their normal operating voltage). Following the X-coil transmission, the TX on the Y-coil will turn on (and the X-coil will turn substantially off, while the Z-coil remains substantially off), and the X, Y, and Z coils of the receiver will receive the magnetic flux generated by the TX Y-coil. Following the Y-coil transmission, the TX on the Z-coil will turn on (and the Y-coil will turn substantially off, while the X-coil remains substantially off), and the X, Y, and Z coils of the receiver will receive the magnetic flux generated by the TX Z-coil. This timing sequence is then repeated continuously while the EM transmitter is operating.

Figure 13G:
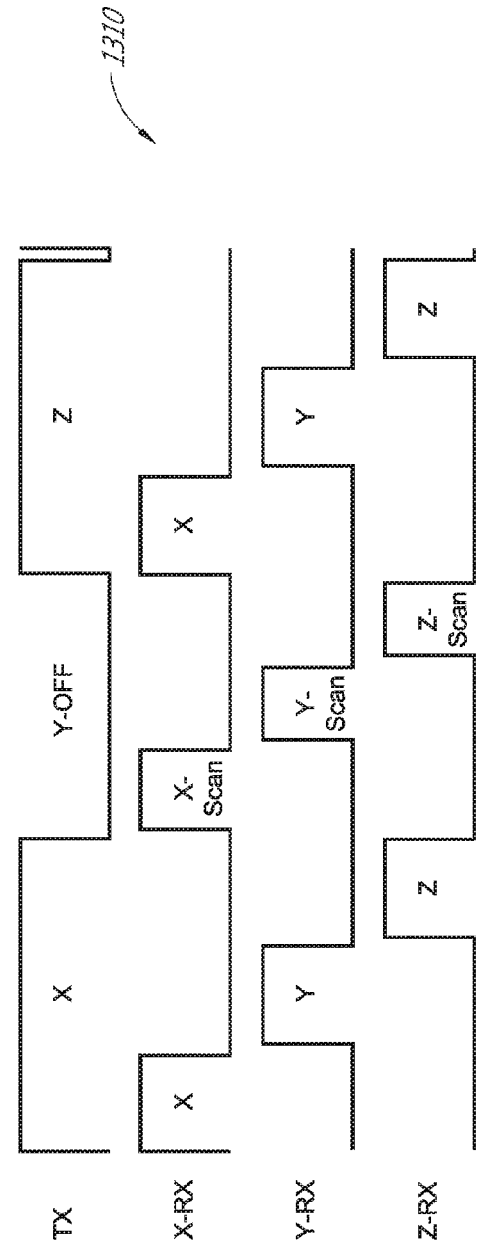
FIG. 13G illustrates an example of scan timing for a time division multiplexed EM transmitter and receiver.

The following describes a non-limiting, illustrative example of accommodating multiple users. For example, to accommodate up to four users with two transmitters each requires eight TX frequencies. It is generally advantageous if these frequencies are not duplicated. In such embodiments, a scan process can be implemented by the EM receiver to determine if a particular frequency is being used in close proximity. FIG. 13G illustrates an example of scan timing 1310. This scan can be done by the EM receiver 1304 at initialization as well as periodically during the user's session. The scan can be performed by intentionally turning off the TX in the transmitter 1302 and cycling through the RX (in the receiver 1304) to measure the existence of unintentional interference. If it is determined that there is energy at that frequency, then an alternate frequency can be selected. This scan can also be shortened by monitoring one or two (rather than all three) of the three orthogonal coils, because Position and Orientation (PnO) is not required in that slot.

Figure 13H:
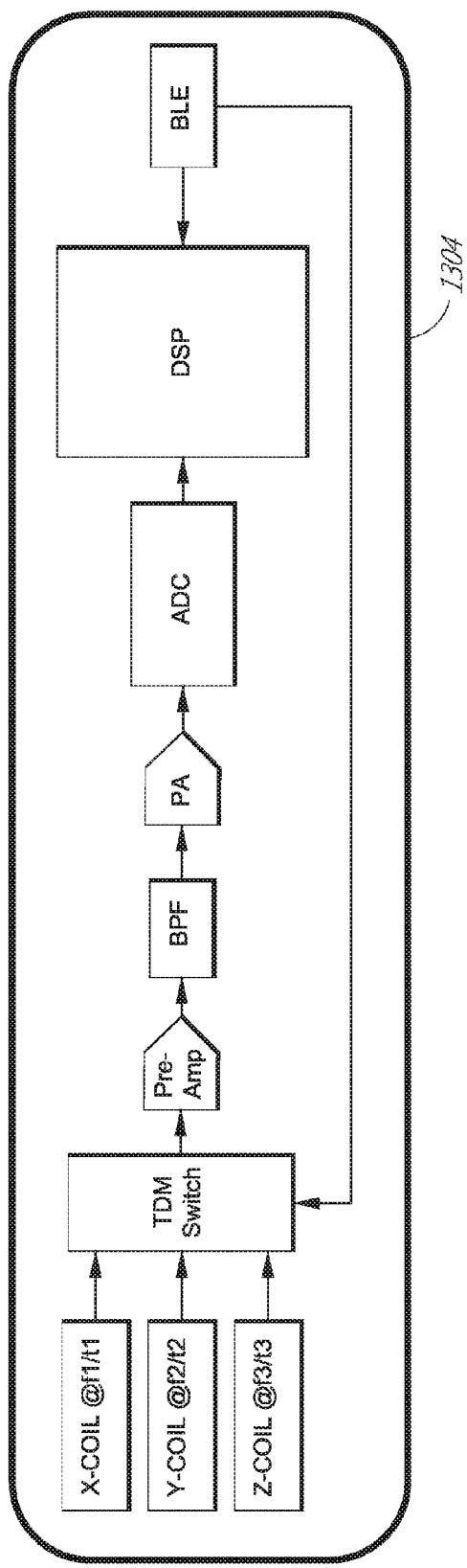
FIG. 13H is a block diagram that schematically illustrates an example of a TDM receiver in EM tracking system.

FIG. 13H is a block diagram that schematically illustrates another example of a receiver 1304 in an EM tracking system. As compared to the example FDM receiver illustrated in FIG. 13B, a TDM switch has replaced the individual paths from the three orthogonal coils. The TDM switch can be controlled by an RF wireless interface (e.g., BLE). The TDM switch can utilize the timing protocol 1308 illustrated in FIG. 13F.

In various embodiments, the time division multiplexed TX and/or RX circuits described with reference to FIGS.

13C-13H may provide one or more of the following advantages. (A) Current Drain and Battery Life. By time multiplexing the transmitter and the receiver, the amount of current used may be lowered. This reduction comes from the fact that the high current circuits, such as the transmitter, are no longer being utilized 100% of the time. The current drain of the system can be reduced to slightly over ⅓ as compared to the FDM circuits shown in FIGS. 13A and 13B. (B) Bill of Materials Cost. The number of components used to achieve the same result has been reduced (compared to the FDM circuits in FIGS. 13A and 13B) in the TDM embodiments described above. Multiplexing the signals through the same path reduces the part count and in this case the cost of the components should also be reduced to slightly over ⅓ compared to the FDM counterparts. (C) PCB Area. Another benefit of the part reduction can be the savings gained in PCB area. The part count has reduced by almost ⅔ and so the required space on the PCB is reduced.

Other possible advantages may be reduced mass of the TX and RX circuits. For example, the FDM TX and RX circuits shown in FIGS. 13A and 13B utilize separate filter and amplifier paths for each of the three orthogonal coils. In contrast, the TDM TX and RX circuits illustrated in FIGS. 13C and 13H share a filter and amplifier path.

In addition to removing sensor housings, and multiplexing to save on hardware overhead, signal-to-noise ratios may be increased by having more than one set of electromagnetic sensors, each set being relatively small relative to a single larger coil set. Also, the low-side frequency limits, which generally are needed to have multiple sensing coils in close proximity, may be improved to facilitate bandwidth requirement improvements. There generally is a tradeoff with TD multiplexing, in that multiplexing generally spreads out the reception of RF signals in time, which results in generally noisier signals; thus larger coil diameters may be used for multiplexed systems. For example, where a multiplexed system may utilize a 9 mm-side dimension cubic coil sensor box, a nonmultiplexed system may only utilize a 7 mm-side dimension cubic coil box for similar performance; thus there may be tradeoffs in minimizing geometry and mass and selecting between embodiments of FDM and TDM circuits.

Example Automatic Gain Control for an Electromagnetic Tracking System

With reference to FIGS. 13A and 13B, the FDM receiver (FIG. 13B) implements a closed-loop gain control while the FDM transmitter (FIG. 13A) does not implement gain control and is left to transmit at its maximum output power, regardless of the received level. The gain of the receiver can be set by the DSP. For example, the received voltages on the receiver coils are fed directly into the first stage, which has gain control. Large voltages can be determined in the DSP, and the DSP can automatically adjust the gain of the first stage. Placing the gain control in the receiver may utilize more power in the transmitter, even when it is not needed. Accordingly, it may be advantageous to employ automatic gain control (AGC, sometimes also referred to as adaptive gain control) on the transmitter side (rather than the receiver side), which may save space in the receiver system (that would otherwise be used for AGC), thereby allowing for a much smaller and more portable receiver.

Figure 13I:
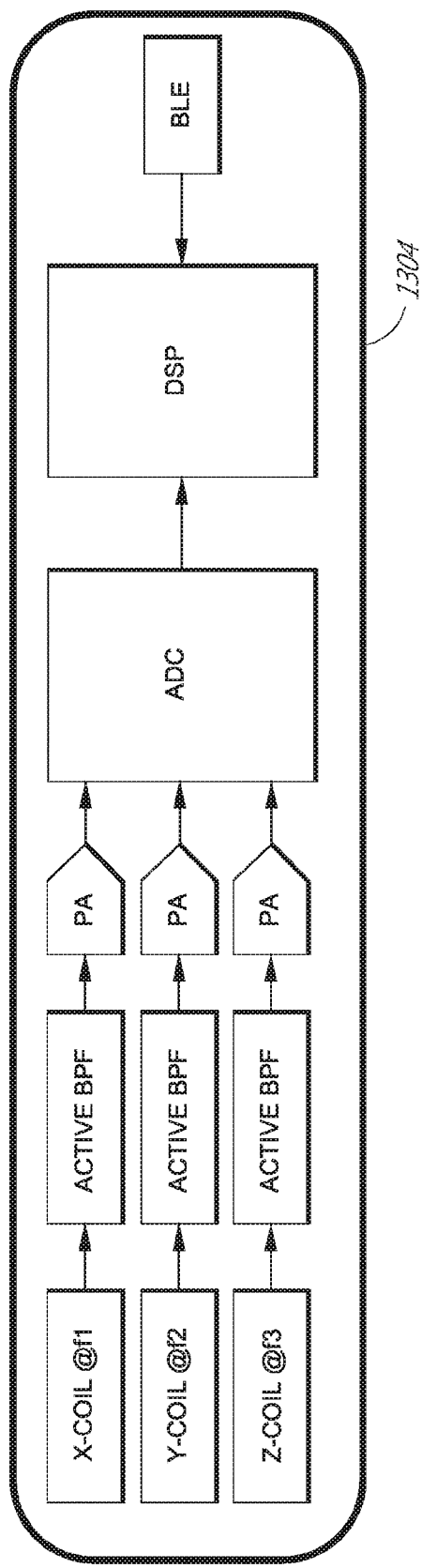
FIG. 13I is a block diagram that schematically illustrates an example of an EM receiver without automatic gain control (AGC).

FIG. 13I is a block diagram that schematically illustrates an example of an EM receiver 1304 that does not utilize automatic gain control (AGC). The first stage is no longer an AGC circuit (compare to FIG. 13B), and the receiver is designed to simply have a constant gain. The level of the received voltage on the coils is determined by the DSP, and the DSP provides that information to the wireless (e.g., BLE) link. This BLE link can provide that information to the transmitter (see FIG. 13J) to control the TX level.

Figure 13J:
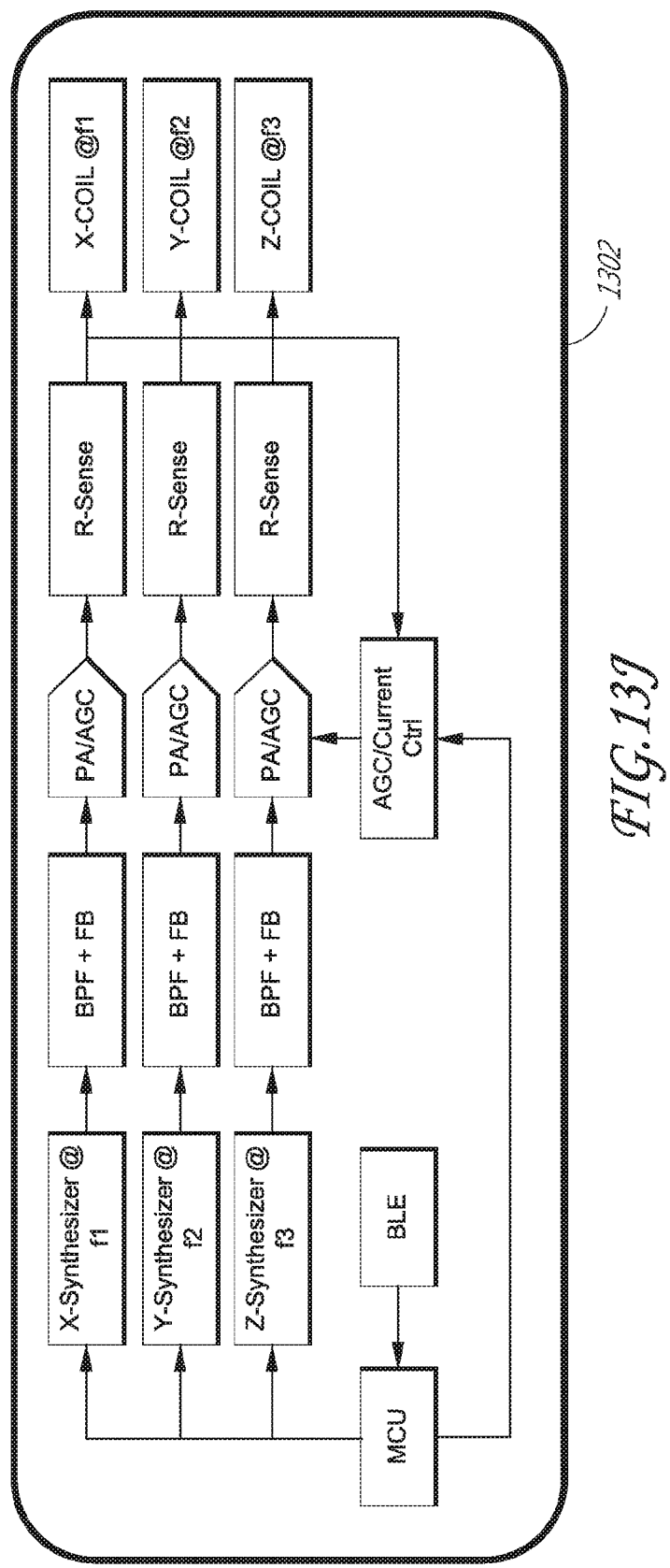
FIG. 13J is a block diagram that schematically illustrates an example of an EM transmitter that employs AGC.

FIG. 13J is a block diagram that schematically illustrates an example of an EM transmitter 1302 that employs AGC. The EM transmitter 1302 of FIG. 13J can communicate with the receiver 1304 of FIG. 13I. The wireless link (e.g., BLE) communicates the received voltage level (from the BLE link on the receiver) to the MCU. The amplification stage can have adjustable gain that is controlled by the MCU. This can allow for current savings on the transmitter when the received voltage required is small.

Accordingly, the RX and TX circuit examples in FIGS. 13I and 13J employ AGC in the EM transmitter 1302 instead of the EM receiver 1304. This change from the RX and TX circuit examples in FIGS. 13A and 13B can allow for a smaller RX design as well as a more power efficient design because the TX power will be allowed to be reduced when necessary.

Examples of EM Tracking of User Head Pose or Hand Pose

Figure 14:
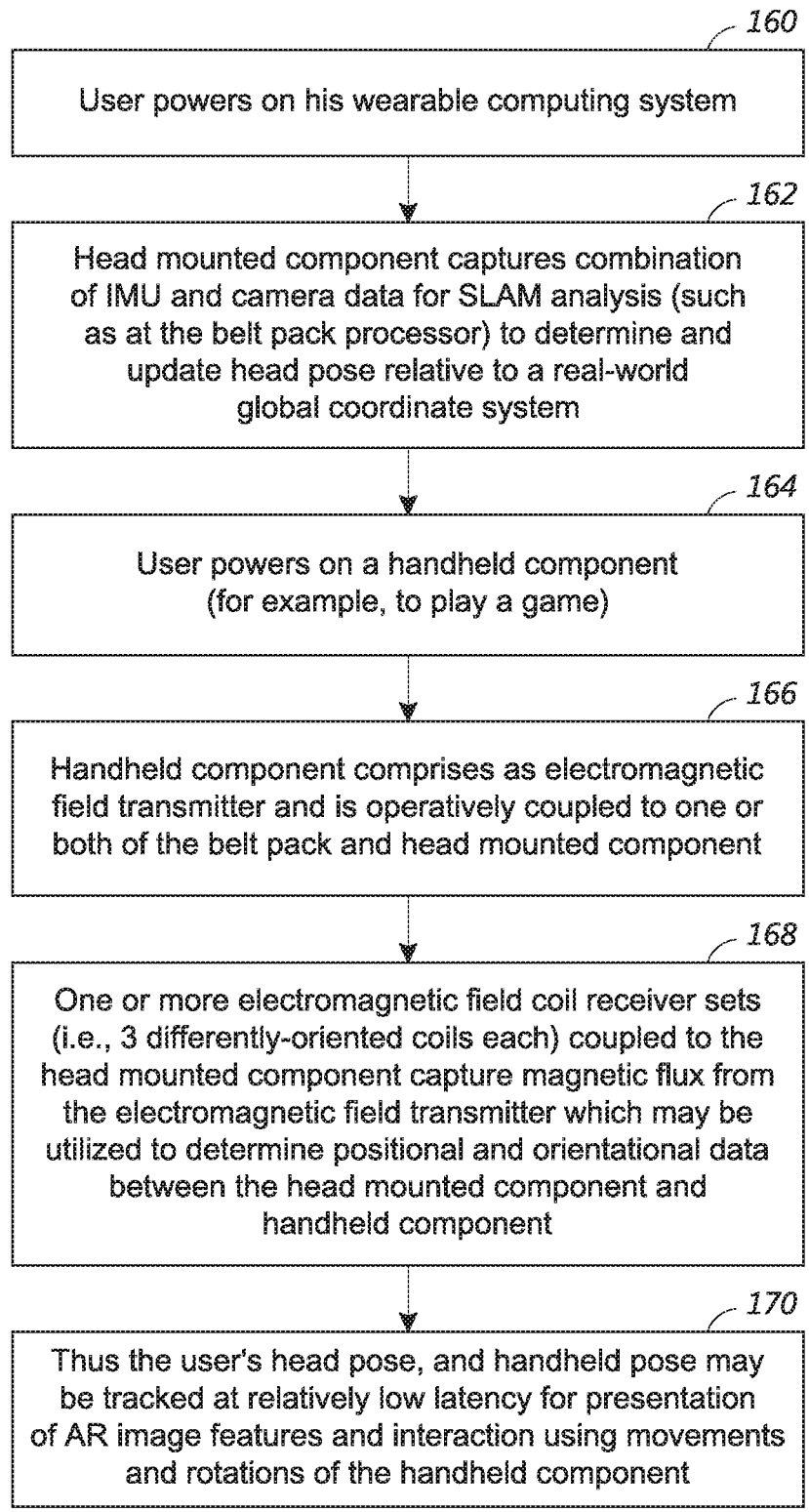
FIGS. 14 and 15 are flowcharts that illustrate examples of pose tracking with an electromagnetic tracking system in a head-mounted AR system.

Referring to FIG. 14, in one embodiment, after a user powers up his or her wearable computing system (160), a head mounted component assembly may capture a combination of IMU and camera data (the camera data being used, for example, for SLAM analysis, such as at the belt pack processor where there may be more raw processing horsepower present) to determine and update head pose (e.g., position or orientation) relative to a real world global coordinate system (162). The user may also activate a handheld component to, for example, play an augmented reality game (164), and the handheld component may comprise an electromagnetic transmitter operatively coupled to one or both of the belt pack and head mounted component (166). One or more electromagnetic field coil receiver sets (e.g., a set being 3 differently-oriented individual coils) coupled to the head mounted component to capture magnetic flux from the transmitter, which may be utilized to determine positional or orientational difference (or "delta"), between the head mounted component and handheld component (168). The combination of the head mounted component assisting in determining pose relative to the global coordinate system, and the hand held assisting in determining relative location and orientation of the handheld relative to the head mounted component, allows the system to generally determine where each component is relative to the global coordinate system, and thus the user's head pose, and handheld pose may be tracked, preferably at relatively low latency, for presentation of augmented reality image features and interaction using movements and rotations of the handheld component (170).

Figure 15:
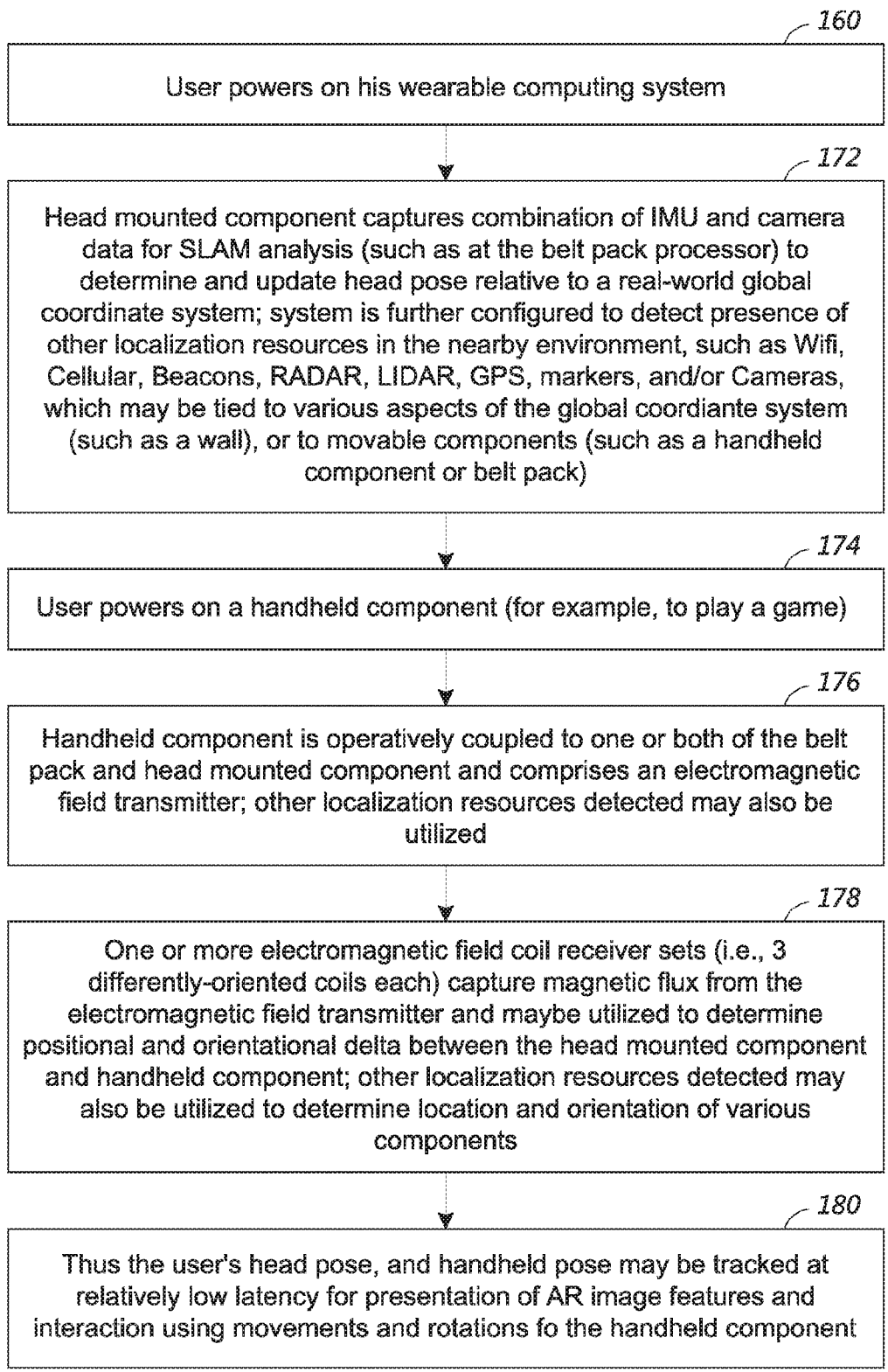

Referring to FIG. 15, an embodiment is illustrated that is somewhat similar to that of FIG. 14, with the exception that the system has many more sensing devices and configurations available to assist in determining pose of both the head mounted component (172) and a hand held component (176, 178), such that the user's head pose, and handheld pose may be tracked, preferably at relatively low latency, for presentation of augmented reality image features and interaction using movements and rotations of the handheld component (180).

Example Stereo and Time-of-Flight Depth Sensing

Referring to FIGS. 16A and 16B, various aspects of a configuration similar to that of FIG. 8 are shown. The configuration of FIG. 16A differs from that of FIG. 8 in that in addition to a LIDAR (106) type of depth sensor, the configuration of FIG. 16A features a generic depth camera or depth sensor (154) for illustrative purposes, which may, for example, be either a stereo triangulation style depth sensor (such as a passive stereo depth sensor, a texture projection stereo depth sensor, or a structured light stereo depth sensor) or a time or flight style depth sensor (such as a LIDAR depth sensor or a modulated emission depth sensor); further, the configuration of FIG. 16A has an additional forward facing "world" camera (124, which may be a grayscale camera, having a sensor capable of 720p range resolution) as well as a relatively high-resolution "picture camera" (156, which may be a full color camera, having a sensor capable of two megapixel or higher resolution, for example). FIG. 16B shows a partial orthogonal view of the configuration of FIG. 16A for illustrative purposes, as described further below in reference to FIG. 16B.

Referring back to FIG. 16A and the stereo vs. time-of-flight style depth sensors mentioned above, each of these depth sensor types may be employed with a wearable computing solution as disclosed herein, although each has various advantages and disadvantages. For example, many depth sensors have challenges with black surfaces and shiny or reflective surfaces. Passive stereo depth sensing is a relatively simplistic way of getting triangulation for calculating depth with a depth camera or sensor, but it may be challenged if a wide field of view ("FOV") is required, and may require relatively significant computing resource; further, such a sensor type may have challenges with edge detection, which may be important for the particular use case at hand. Passive stereo may have challenges with textureless walls, low light situations, and repeated patterns. Passive stereo depth sensors are available from manufacturers such as Intel and Aquifi. Stereo with texture projection (also known as "active stereo") is similar to passive stereo, but a texture projector broadcasts a projection pattern onto the environment, and the more texture that is broadcasted, the more accuracy is available in triangulating for depth calculation. Active stereo may also require relatively high compute resource, present challenges when wide FOV is required, and be somewhat suboptimal in detecting edges, but it does address some of the challenges of passive stereo in that it is effective with textureless walls, is good in low light, and generally does not have problems with repeating patterns. Active stereo depth sensors are available from manufacturers such as Intel and Aquifi.

Stereo with structured light, such as the systems developed by Primesense, Inc. and available under the tradename Kinect, as well as the systems available from Mantis Vision, Inc., generally utilize a single camera/projector pairing, and the projector is specialized in that it is configured to broadcast a pattern of dots that is known a priori. In essence, the system knows the pattern that is broadcasted, and it knows that the variable to be determined is depth. Such configurations may be relatively efficient on compute load, and may be challenged in wide FOV requirement scenarios as well as scenarios with ambient light and patterns broadcasted from other nearby devices, but can be quite effective and efficient in many scenarios. With modulated time of flight type depth sensors, such as those available from PMD Technologies, A.G. and SoftKinetic Inc., an emitter may be configured to send out a wave, such as a sine wave, of amplitude modulated light; a camera component, which may be positioned nearby or even overlapping in some configurations, receives a returning signal on each of the pixels of the camera component and depth mapping may be determined/calculated. Such configurations may be relatively compact in geometry, high in accuracy, and low in compute load, but may be challenged in terms of image resolution (such as at edges of objects), multi-path errors (such as wherein the sensor is aimed at a reflective or shiny corner and the detector ends up receiving more than one return path, such that there is some depth detection aliasing.

Direct time of flight sensors, which also may be referred to as the aforementioned LIDAR, are available from suppliers such as LuminAR and Advanced Scientific Concepts, Inc. With these time of flight configurations, generally a pulse of light (such as a picosecond, nanosecond, or femtosecond long pulse of light) is sent out to bathe the world oriented around it with this light ping; then each pixel on a camera sensor waits for that pulse to return, and knowing the speed of light, the distance at each pixel may be calculated. Such configurations may have many of the advantages of modulated time of flight sensor configurations (no baseline, relatively wide FOV, high accuracy, relatively low compute load, etc.) and also relatively high framerates, such as into the tens of thousands of Hertz. They may also be relatively expensive, have relatively low resolution, be sensitive to bright light, and susceptible to multi-path errors; they may also be relatively large and heavy.

Referring to FIG. 16B, a partial top view is shown for illustrative purposes featuring a user's eyes (12) as well as cameras (14, such as infrared cameras) with fields of view (28, 30) and light or radiation sources (16, such as infrared) directed toward the eyes (12) to facilitate eye tracking, observation, and/or image capture. The three outward-facing world-capturing cameras (124) are shown with their FOVs (18, 20, 22), as is the depth camera (154) and its FOV (24), and the picture camera (156) and its FOV (26). The depth information garnered from the depth camera (154) may be bolstered by using the overlapping FOVs and data from the other forward-facing cameras. For example, the system may end up with something like a sub-VGA image from the depth sensor (154), a 720p image from the world cameras (124), and occasionally a 2 megapixel color image from the picture camera (156). Such a configuration has four cameras sharing common FOV, two of them with heterogeneous visible spectrum images, one with color, and the third one with relatively low-resolution depth. The system may be configured to do a segmentation in the grayscale and color images, fuse those two and make a relatively high-resolution image from them, get some stereo correspondences, use the depth sensor to provide hypotheses about stereo depth, and use stereo correspondences to get a more refined depth map, which may be significantly better than what was available from the depth sensor only. Such processes may be run on local mobile processing hardware, or can run using cloud computing resources, perhaps along with the data from others in the area (such as two people sitting across a table from each other nearby), and end up with quite a refined mapping. In another embodiment, all of the above sensors may be combined into one integrated sensor to accomplish such functionality.

Example Dynamic Tuning of a Transmission Coil for EM Tracking

Figure 17A:
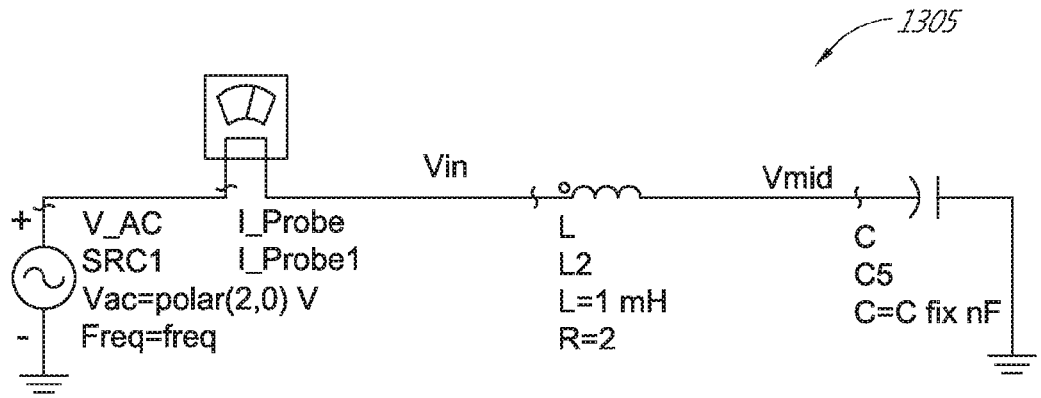
FIG. 17A schematically illustrates an example of a resonant circuit in a transmitter in an electromagnetic tracking system.
Figure 17B:
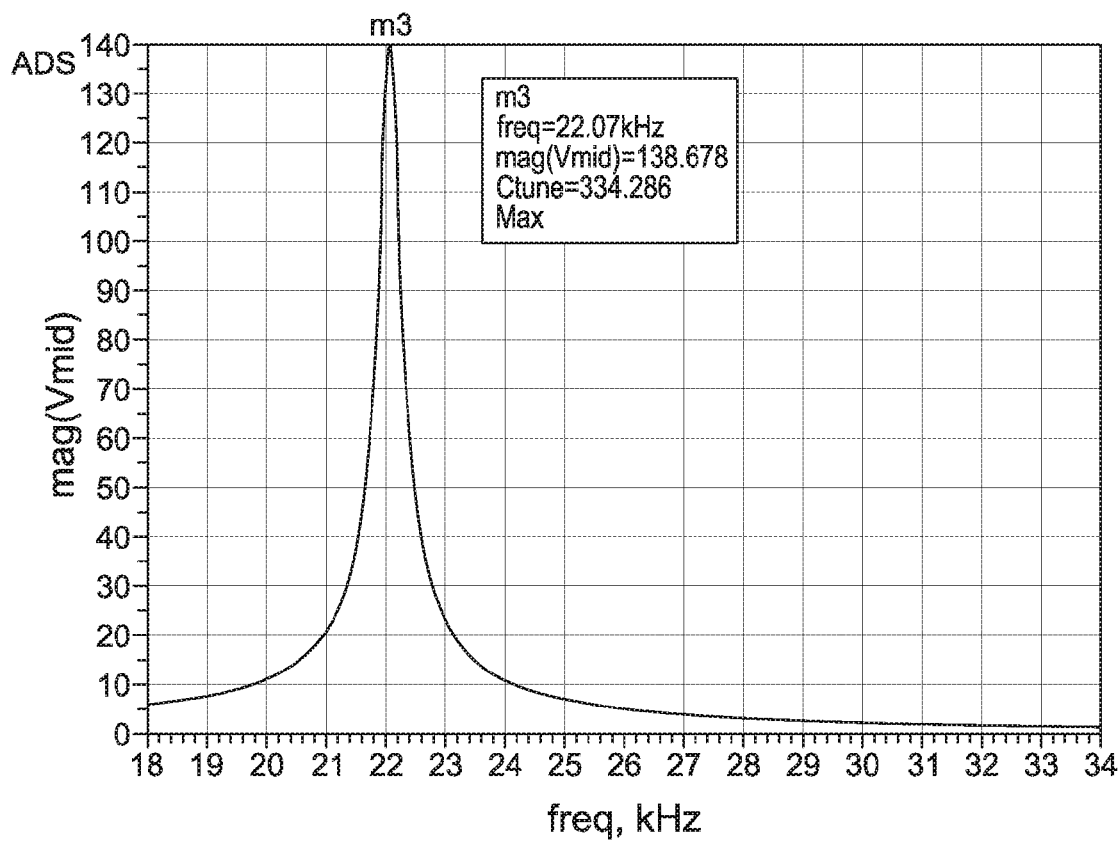
FIG. 17B is a graph that shows an example of a resonance at 22 kHz in the resonant circuit of FIG. 17A.
Figure 17C:
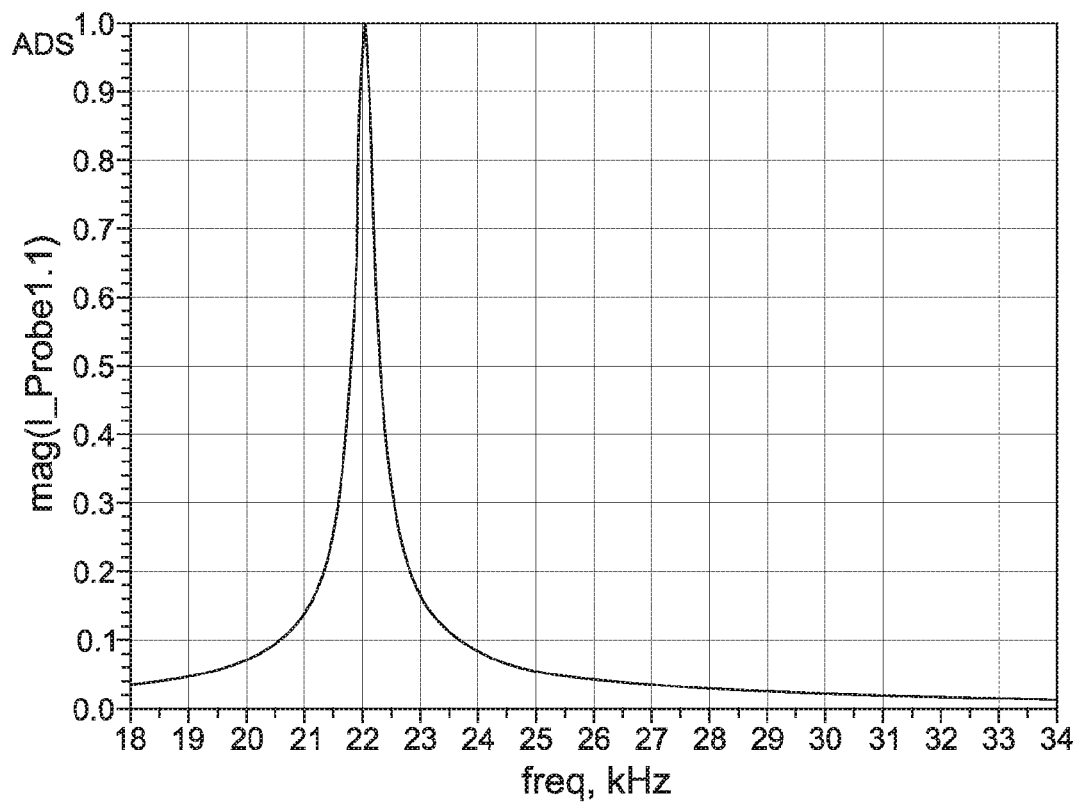
FIG. 17C is a graph that shows an example of current flowing through a resonant circuit.

Referring to FIGS. 17A-17G, aspects of a dynamic transmission coil tuning configuration are shown for electromagnetic tracking, to facilitate the transmission coil to operate optimally at multiple frequencies per orthogonal axis, which allows for multiple users to operate on the same system. Typically an electromagnetic tracking transmitter will be designed to operate at fixed frequencies per orthogonal axis. With such an approach, each transmission coil is tuned with a static series capacitance that creates resonance only at the frequency of operation. Such resonance allows for the maximum possible current flow through the coil which, in turn, maximizes the magnetic flux generated. FIG. 17A illustrates a typical resonant circuit 1305 used to create resonance at a fixed operation frequency. Inductor "L" represents a single axis transmission coil having an inductance of 1 mH, and with a capacitance set to 52 nF, resonance is created at 22 kHz, as shown in FIG. 17B. FIG. 17C shows the current through the circuit 1305 of FIG. 17A plotted versus frequency, and it may be seen that the current is maximum at the resonant frequency. If this system is expected to operate at any other frequency, the operating circuit will not be at the possible maximum current (which occurs at the resonant frequency of 22 kHz).

Figure 17D:
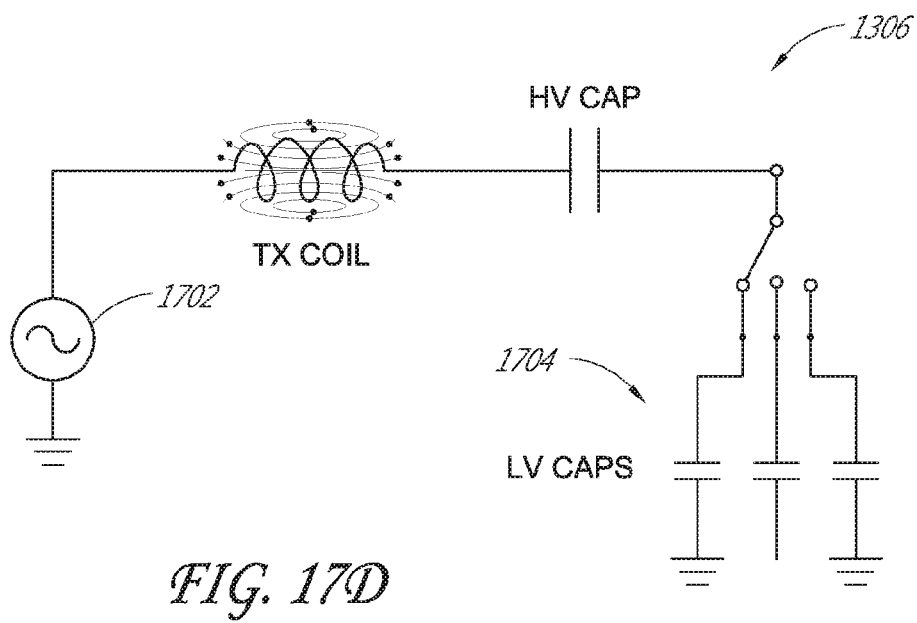
FIGS. 17D and 17E schematically illustrate examples of a dynamically tunable configuration for a resonant circuit in an EM field transmitter of an electromagnetic tracking system.
Figure 17E:
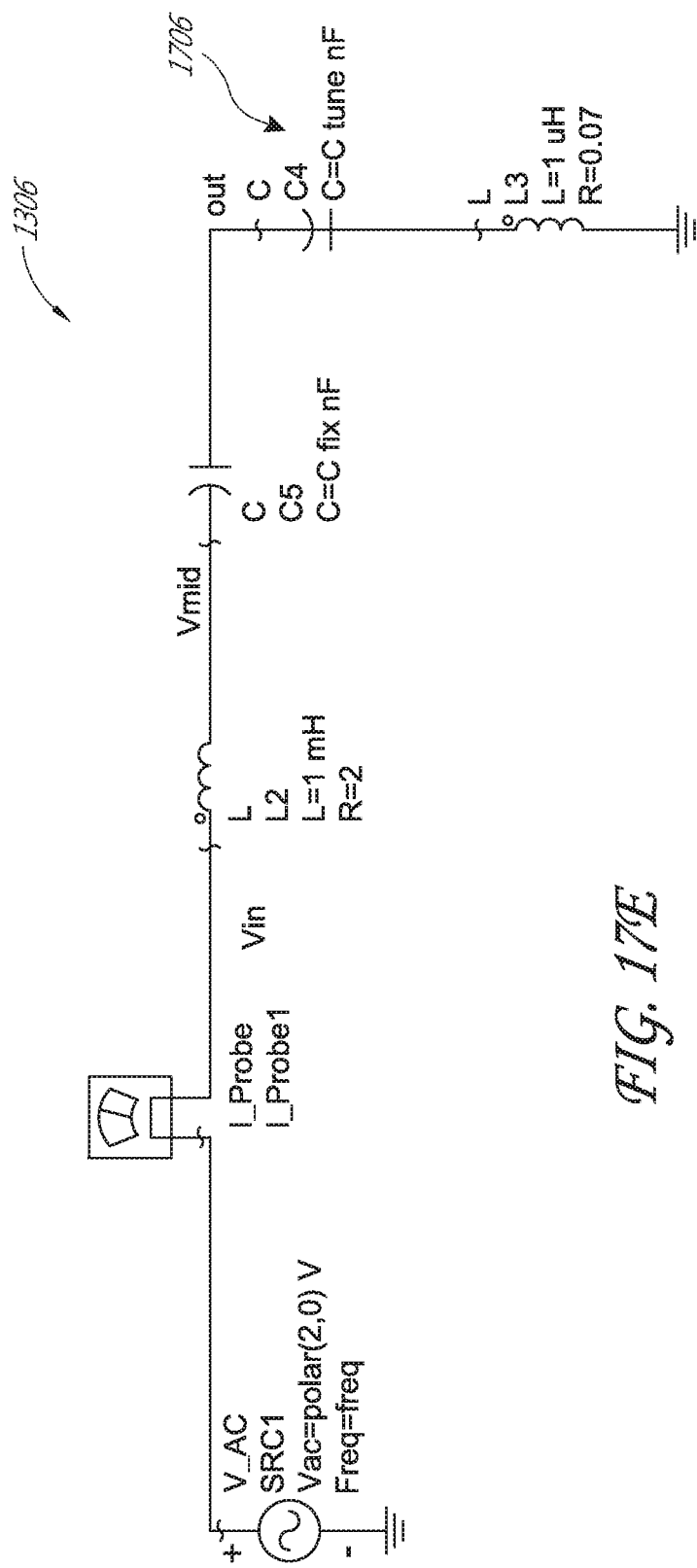

FIG. 17D illustrates an embodiment of a dynamically tunable configuration for the transmitter circuit 1306 of a transmitter 1302 of an electromagnetic tracking system. The example circuit 1306 shown in FIG. 17D may be used in embodiments of the EM field emitter 402, 602, 1302 described herein. The circuit in FIG. 17D includes an oscillating voltage source 1702, a transmit (TX) coil, a high voltage (HV) capacitor, and a plurality of low voltage (LV) capacitors in a capacitor bank 1704 that can be selected to provide the tuning for a desired resonance frequency. The dynamic frequency tuning may be set to achieve resonance on the coil (at desired, dynamically adjustable frequencies) to get maximum current flow. Another example of a dynamically tunable circuit 1306 is shown in FIG. 17E, where a tunable capacitor 1706 ("C4") may be tuned to produce resonance at different frequencies, as shown in the simulated data illustrated in FIG. 17F. Tuning the tunable capacitor can include switching among a plurality of different capacitors as schematically illustrated in the circuit shown in FIG. 17D. As shown in the embodiment of FIG. 17E, one of the orthogonal coils of an electromagnetic tracker is simulated as an inductor "L" and a static capacitor ("C5") is a fixed high voltage capacitor. This high voltage capacitor will see the higher voltages due to the resonance, and so its package size generally will be larger. Capacitor C4 will be the capacitor which is dynamically switched with different values, and can thus see a lower maximum voltage and generally be a smaller geometric package to save placement space. Inductor L3 can also be utilized to fine tune the resonant frequency.

Figure 17F:
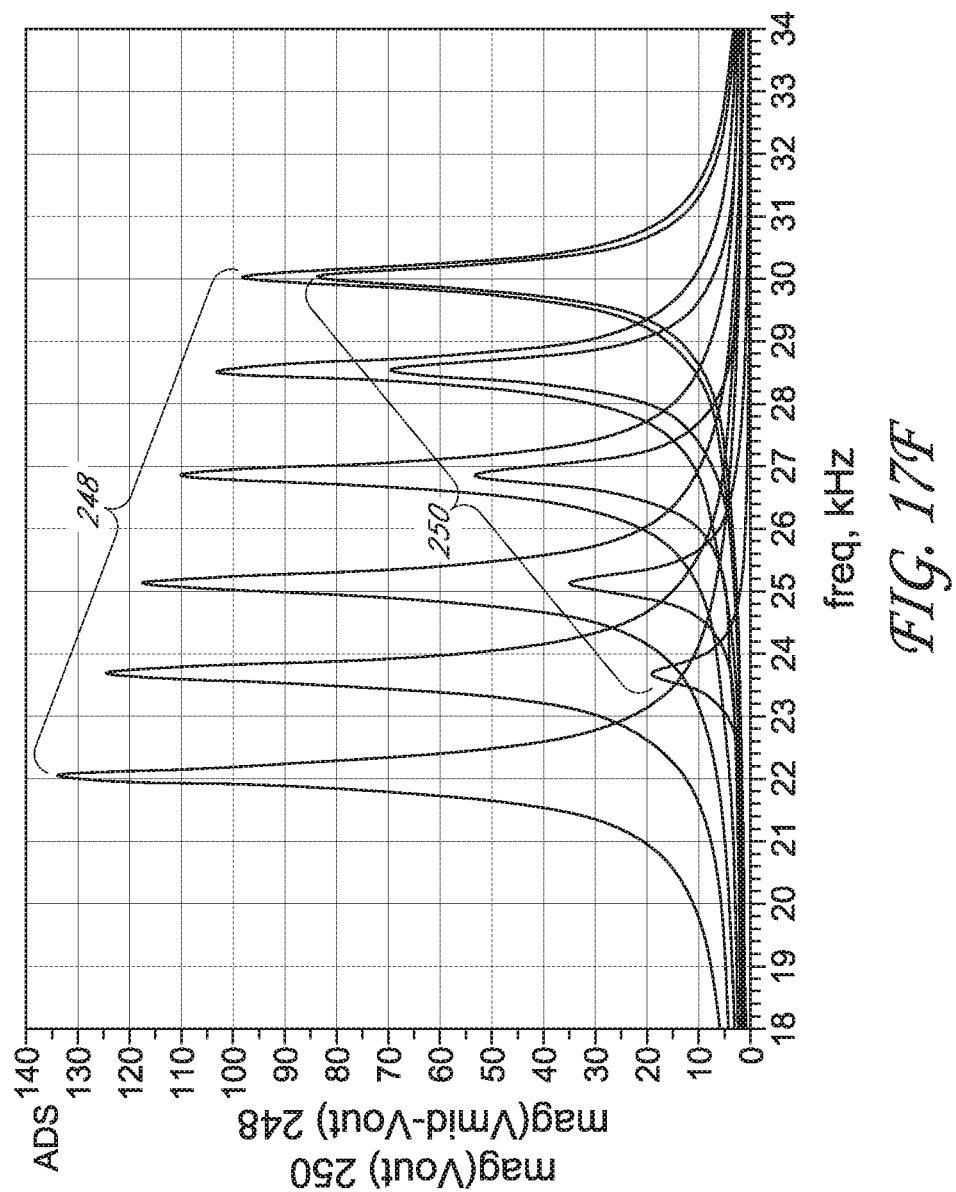
FIG. 17F is a graph that shows examples of dynamically tuned resonances by changing the value of the capacitance of capacitor C4 in the example circuit shown in FIG. 17E.
Figure 17G:
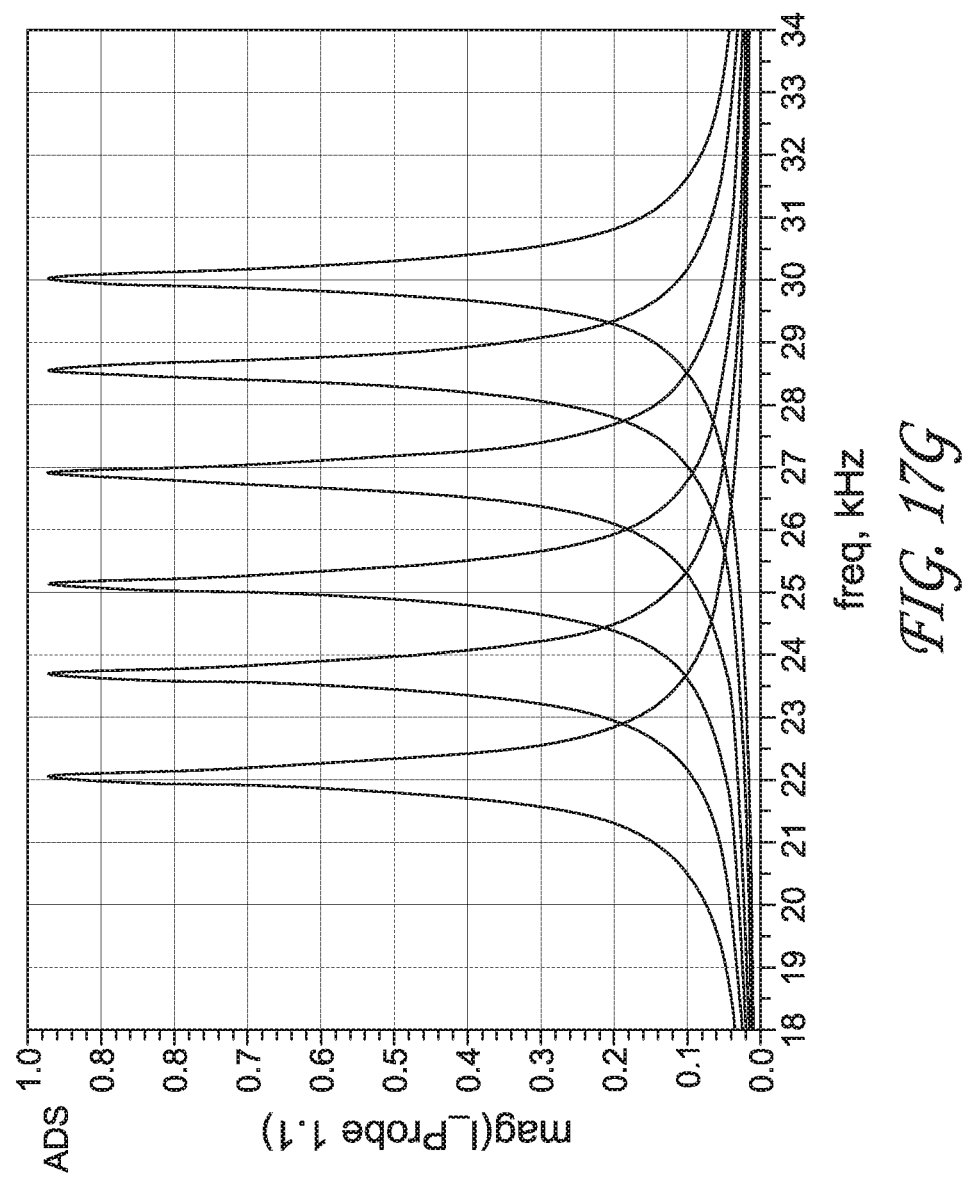
FIG. 17G is a graph that shows examples of the maximum current achieved at various resonant frequencies.

FIG. 17F illustrates examples of the resonances that may be achieved by the circuit 1306 of FIG. 17E. In FIG. 17F, the higher curves (248) show the voltage Vmid–Vout across the capacitor C5, and the lower curves (250) show the voltage Vout across the capacitor C4. As the capacitance of C4 is varied, the resonance frequency is changed (between about 22 kHz and 30 kHz in this example), and it is notable that the voltage across C5 (Vmid-Vout; curves 248) is higher than that across C4 (Vout; curves 250). This generally will allow for a smaller package part on C4 since multiples of this capacitor generally will be used in the system, e.g., one capacitor per resonant frequency of operation (see, e.g., the multiple LV capacitors in the capacitor bank 1704 shown in FIG. 17D). FIG. 17G is a plot of current versus frequency that illustrates that the maximum current achieved follows the resonance regardless of the voltage across the capacitors. Accordingly, embodiments of the dynamically tunable circuit can provide increased or maximum current in the transmitter coil across multiple frequencies allowing for improved or optimized performance for multiple users of a single EM tracking system.

Example Audio Noise Canceling for an EM Tracking System

Audio speakers (or any external magnet) can create a magnetic field that can unintentionally interfere with the magnetic field created by the EM field emitter of an EM tracking system. Such interference can degrade the accuracy or reliability of the location estimation provided by the EM tracking system.

As AR devices evolve, they become more complicated and integrate more technologies that have to coexist and perform independently. EM tracking systems rely on reception (by the EM sensor) of minute changes in a magnetic flux (generated by the EM field emitter) to determine a 3-D position of the EM sensor (and thereby the 3-D position of the object to which the sensor is attached or incorporated). Audio speakers that reside close to the EM tracking sensor coils can emit a magnetic flux that can interfere with the EM tracking system's ability to compute a true position.

Figure 18A:
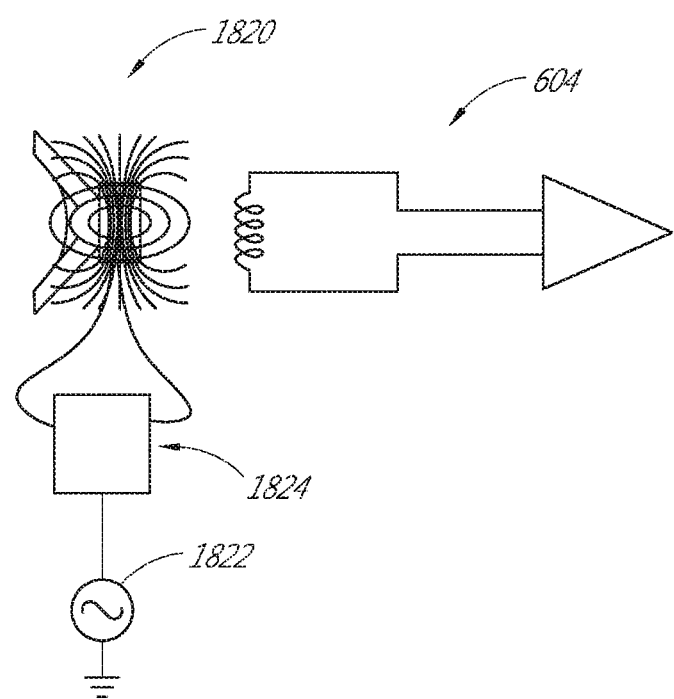
FIG. 18A is a block diagram that schematically shows an example of an electromagnetic field sensor adjacent an audio speaker.
Figure 18B:
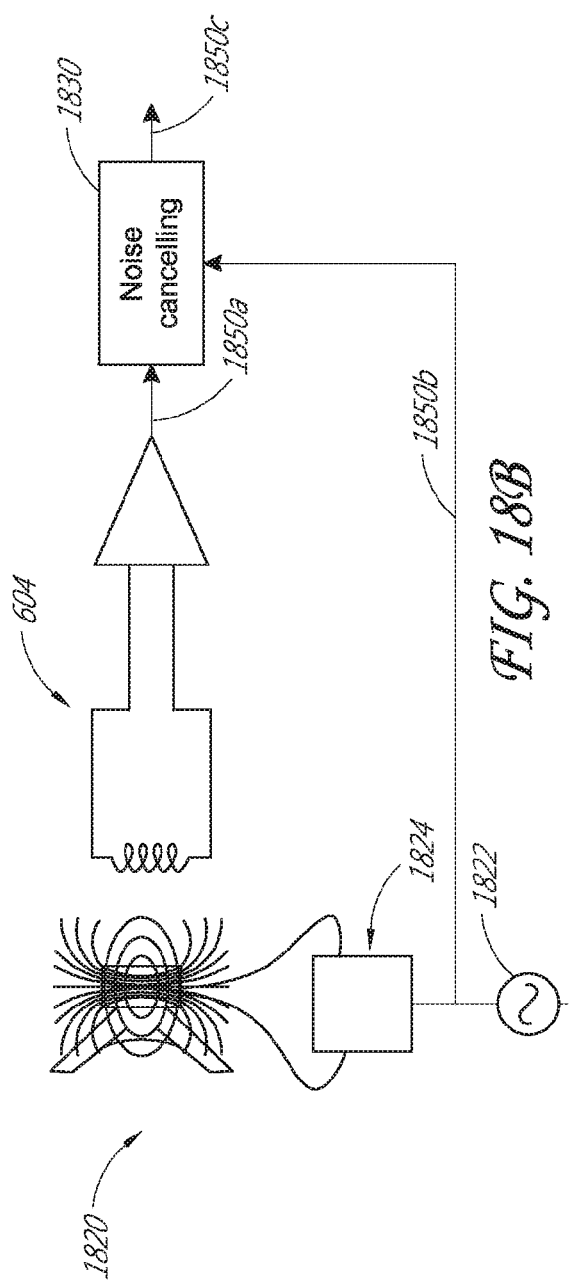
FIG. 18B is a block diagram that schematically shows an example of an electromagnetic field sensor with a noise canceling system that receives input from both the sensor and the external audio speaker.
Figure 18C:
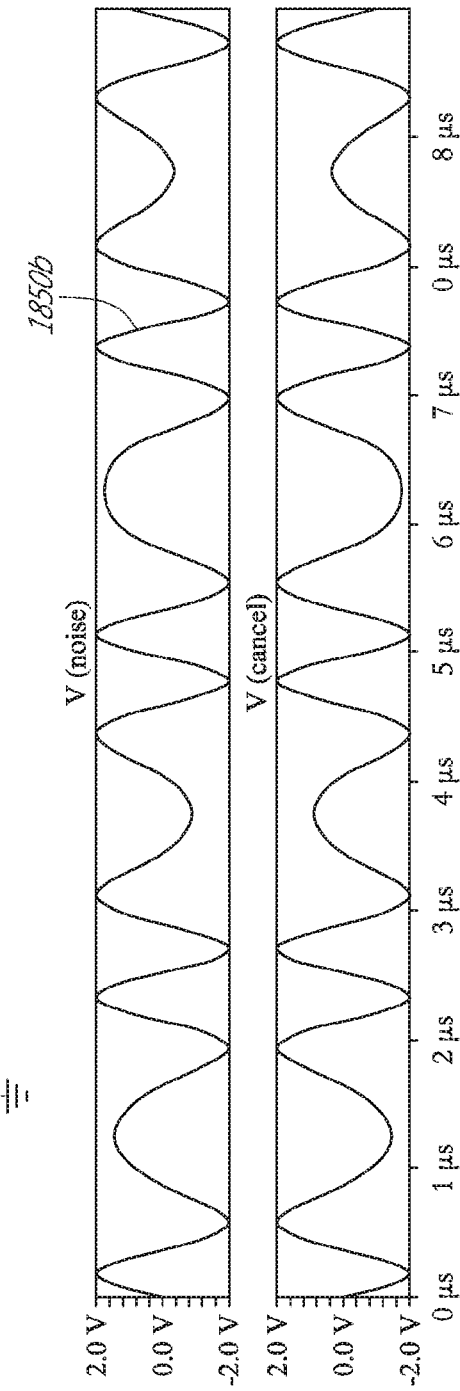
FIG. 18C is a graph that shows an example of how a signal can be inverted and added to cancel the magnetic interference caused by an audio speaker.

Referring to FIGS. 18A-18C, an electromagnetic tracking system may be bounded to work below about 30 kHz, which is slightly higher than the audible range for human hearing. FIG. 18A shows a configuration where an audio speaker 1820 is in close proximity to an EM sensor 604. The audio speaker 1820 is driven by a time-varying voltage source 1822 and an amplifier 1824. The magnetic field of the speaker 1820 can cause unintentional magnetic interference to the EM tracking system, because the speaker generates noise in the magnetic field sensed by the coils of the EM sensor 604. In some implementations, the distance between the audio speaker 1820 and the EM sensor 604 can be increased to reduce the received interference. But because the magnetic flux from the speaker decays by the cube of the distance from the sensor ($1/r^3$), there will be a point where large distances provide very little decay in the interference. An audio speaker (e.g., speaker 66 shown in FIGS. 2A-2D) will commonly be used in AR devices to provide an audio experience to the wearer of the AR device; therefore, it may be common that an audio speaker is relatively near to an EM sensor also disposed on the AR device (see, e.g., the EM sensor 604 disposed near the speaker 66 in the example wearable display device 58 shown in FIG. 11A). The magnetic field from the audio speaker can interfere with the EM field sensed by the EM sensor of the EM tracking system.

Referring to FIG. 18A, there may be some audio systems which create noise in the usable frequencies for such electromagnetic tracking systems. Further, audio speakers typically have magnetic fields and one or more coils, which also may interfere with electromagnetic tracking systems. Referring to FIG. 18B, a block diagram is shown for an example of a noise cancelling system 1830 for an electromagnetic tracking system. Since the unintentional EM interference is a known entity (because the signal supplied by the voltage source 1822 to the audio speaker 1820 is known or can be measured), this knowledge can be used to cancel the EM interference from the audio speaker 1820 and improve performance of the EM tracking system. In other words, the audio signal generated by the system may be utilized to eliminate the magnetic interference from the speaker that is received by the coil of the EM sensor 604. As schematically shown in FIG. 18B, the noise cancelling circuit 1830 may be configured to accept the corrupted signals 1850a from the EM sensor 604 as well as the signal 1850b from the audio system. The noise cancelling system can combine the signals 1850a, 1850b to cancel out the interference received from the audio speaker 1820 and to provide an uncorrupted sensor signal 1850c.

FIG. 18C is a plot showing an illustrative, non-limiting example of how the audio signal 1850b can be inverted and added to the corrupted sensor signal 1850a cancel the interference and to provide the substantially uncorrupted sensor signal 1850c. The top plot, V(noise), is the noise signal 1850b added to the EM tracking system by the audio speaker 1820. The bottom plot, V(cancel), is the inverted audio signal (e.g., −V(noise)), when these are added together the effect is no noise degradation from the audio. In other words, the noise canceling system receives a corrupted signal 1850*a* that is the sum of the true EM sensor signal, V(sensor) representing the signal from the EM transmitter coils, and the noise signal: V(sensor)+V(noise). By adding the inverted audio signal, −V(noise), to the corrupted signal 1850*a*, the uncorrupted signal, V(sensor) 1850*c*, is recovered. The uncorrupted signal 1850*c* reflects the response of the sensor 604 as if the audio speaker 604 were not present and therefore reflects the EM transmitter fields at the position of the sensor 604. Equivalently, the noise signal 1850*b* can be subtracted from the corrupted signal 1850*a* to recover the uncorrupted signal, V(sensor) 1850*c*. The noise cancellation can result in canceling substantially all (e.g., >80%, >90%, >95%, or more) of the noise signal (e.g., from the audio speaker). This noise cancellation technique is not limited to cancellation of just audio speaker noise but can be applied to other sources of noise interference to the EM sensor signal if a measurement (or estimate) of the noise signal can be determined (so that it can then be removed from the EM sensor signal as described above).

Figure 18D:
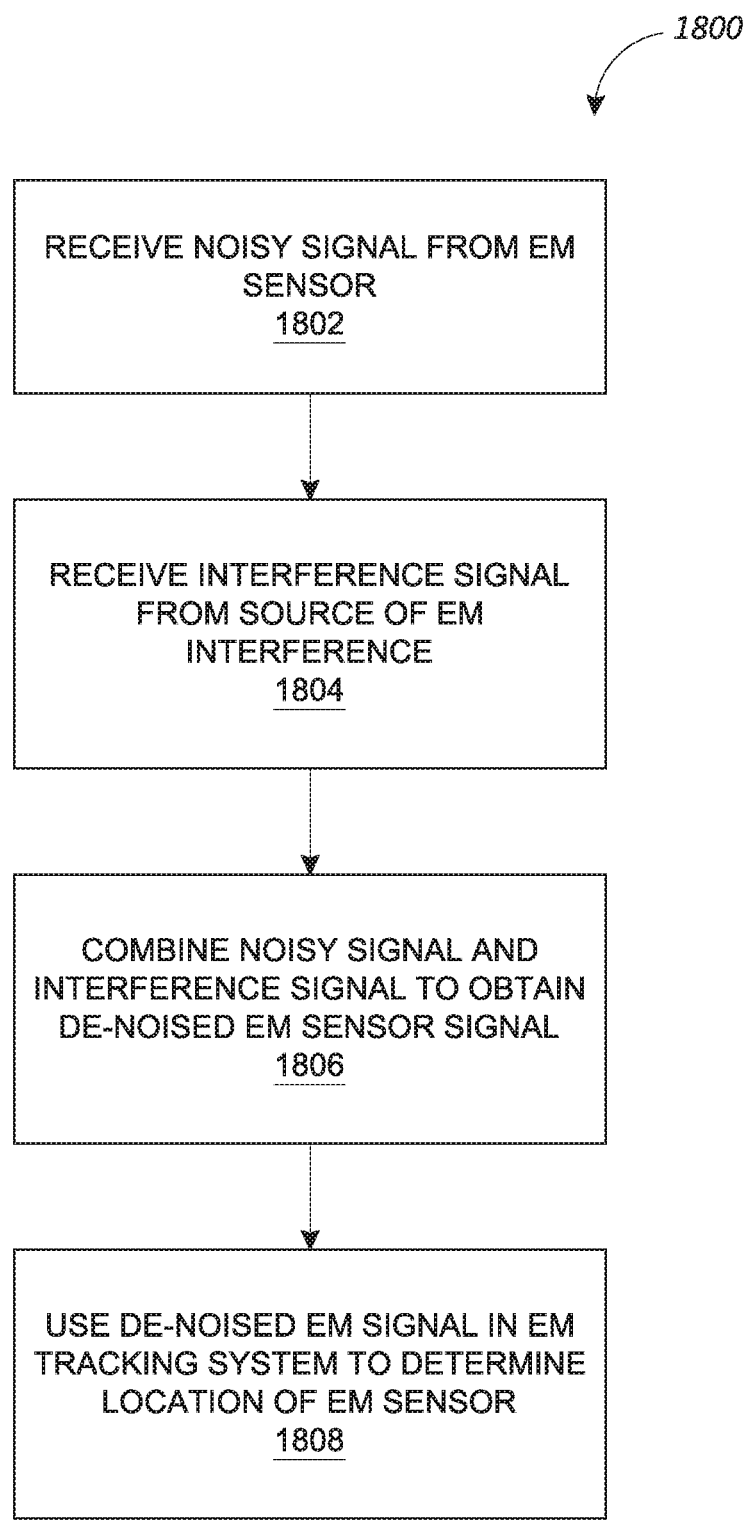
FIG. 18D is a flowchart that shows an example method for canceling interference received by an EM sensor in an EM tracking system.

FIG. 18D is a flowchart that shows an example method 1800 for canceling interference received by an EM sensor in an EM tracking system. The method 1800 can be performed by a hardware processor in the AR device such as, e.g., the local processing and data module 70, or by a hardware processor in the EM tracking system. At block 1802, the method receives a noisy signal from an electromagnetic sensor. As described above, the noisy signal can be caused by interference from a nearby audio speaker that generates electromagnetic interference. At block 1804, the method receives a signal from the source of the EM interference. For example, the signal can be the signal 1850*b* used to drive the audio speaker (see, e.g., FIG. 18B). At block 1806, the noisy signal and the interference signal are combined to obtain a de-noised EM signal. For example, the interference signal can be inverted and added to the noisy signal or the interference signal can be subtracted from the noisy signal. At block 1808, the de-noised signal can be used to determine the location of the EM sensor. The location obtained using the de-noised signal (as compared to using the noisy signal) is more accurate and reliable.

Accordingly, the foregoing provides a method to remove the unintentional noise created by an audio speaker in proximity to an EM tracker sensor. This method employs a noise cancelling method that uses the known information about the audio to remove it from the EM tracking signal. This system may be used when sufficient physical separation of the audio speaker and the EM sensor coil cannot be achieved (so that the interference is sufficiently low). Although in the foregoing, the interference noise has been described as generated by an audio speaker, this is for illustration and is not a limitation. Embodiments of the foregoing can be applied to any interference signal that can be measured, and then subtracted from the corrupted sensor signal.

Example Calibration of Vision Systems

Figure 19:
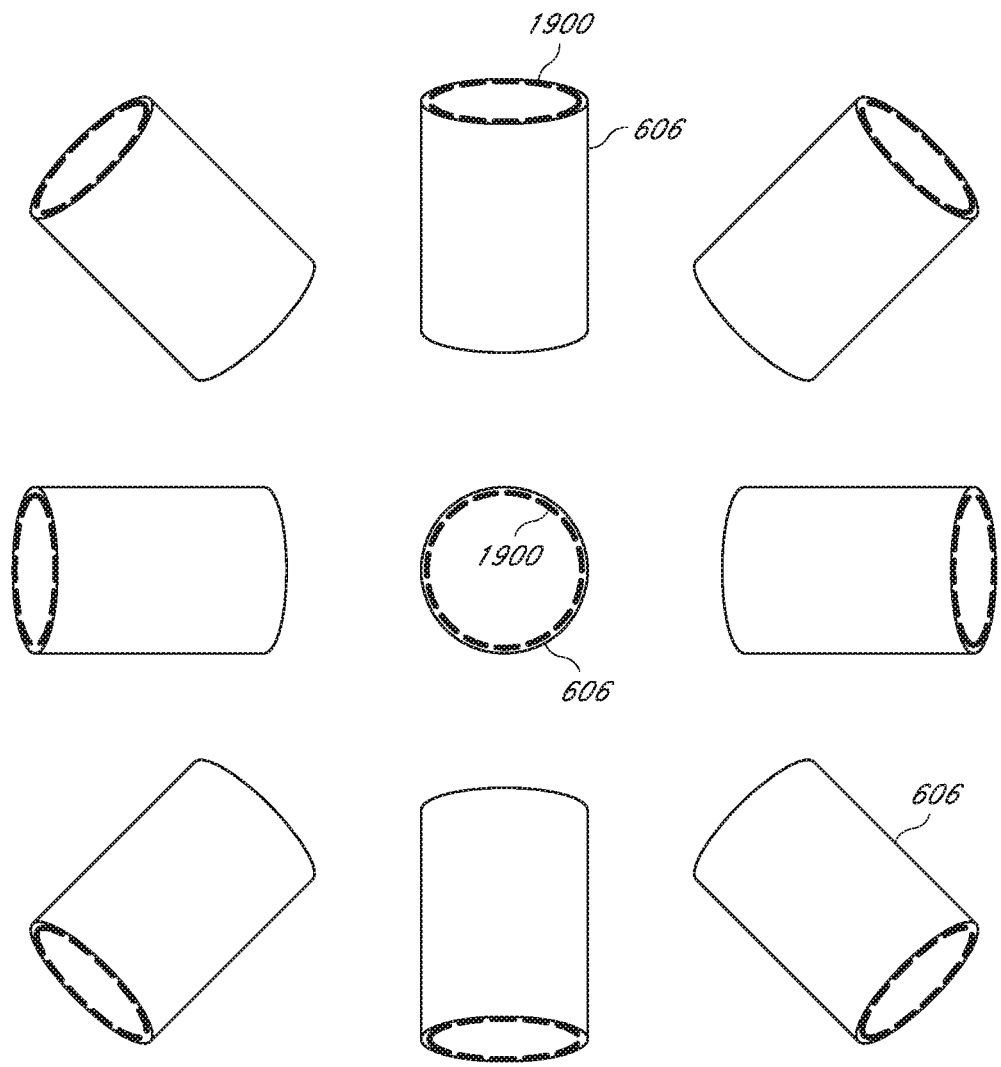
FIG. 19 schematically shows use of a pattern of lights to assist in calibration of the vision system.

Referring to FIG. 19, in one embodiment a known pattern 1900 (such as a circular pattern) of lights or other emitters may be utilized to assist in calibration of vision systems. For example, the circular pattern may be utilized as a fiducial; as a camera or other capture device with known orientation captures the shape of the pattern while the object coupled to the pattern is reoriented, the orientation of the object, such as a hand held totem device 606, may be determined; such orientation may be compared with that which comes from an associated IMU on the object (e.g., the totem) for error determination and use in calibration. With further reference to FIG. 19, the pattern of lights 1900 may be produced by light emitters (e.g., a plurality of LEDs) on a hand-held totem 606 (schematically represented as a cylinder in FIG. 19). As shown in FIG. 19, when the totem is viewed head-on by a camera on the AR headset 58, the pattern of lights 1900 appears circular. When the totem 606 is tilted in other orientations, the pattern 1900 appears elliptical. The pattern of lights 1900 can be identified using computer vision techniques and the orientation of the totem 606 can be determined.

In various implementations, the augmented reality device can include a computer vision system configured to implement one or more computer vision techniques to identify the pattern of lights (or perform other computer vision procedures used or described herein). Non-limiting examples of computer vision techniques include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Example Circuits for Subsystems of Wearable Display Devices

Figure 20A:
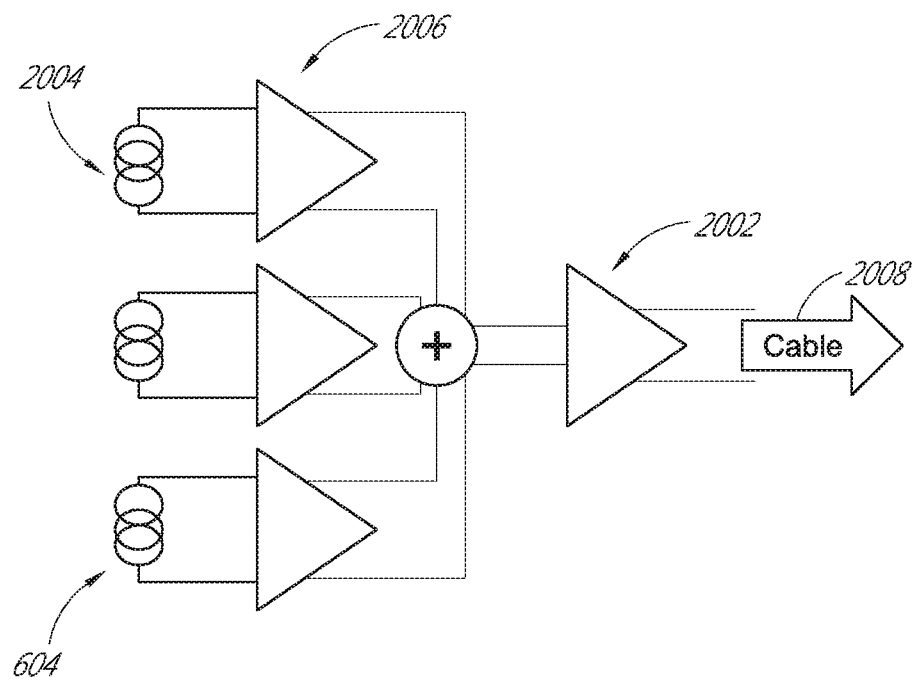
FIGS. 20A-20C are block diagrams of example circuits usable with subsystems or components of a wearable display device.
Figure 20B:
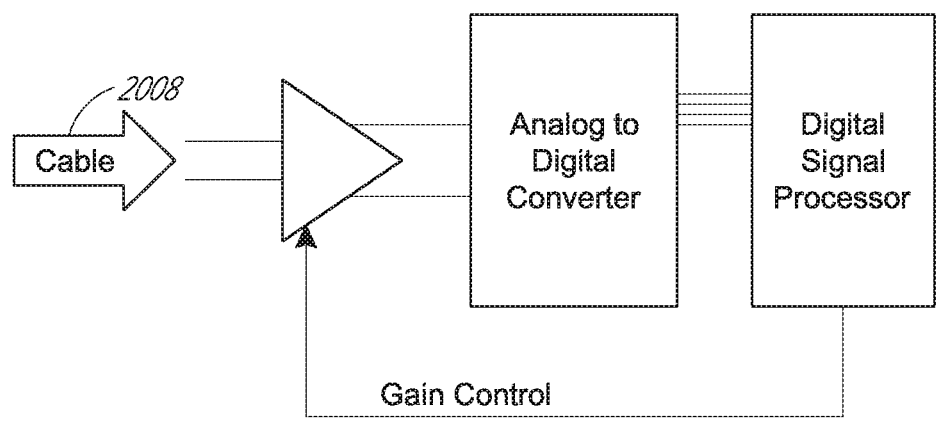
Figure 20C:
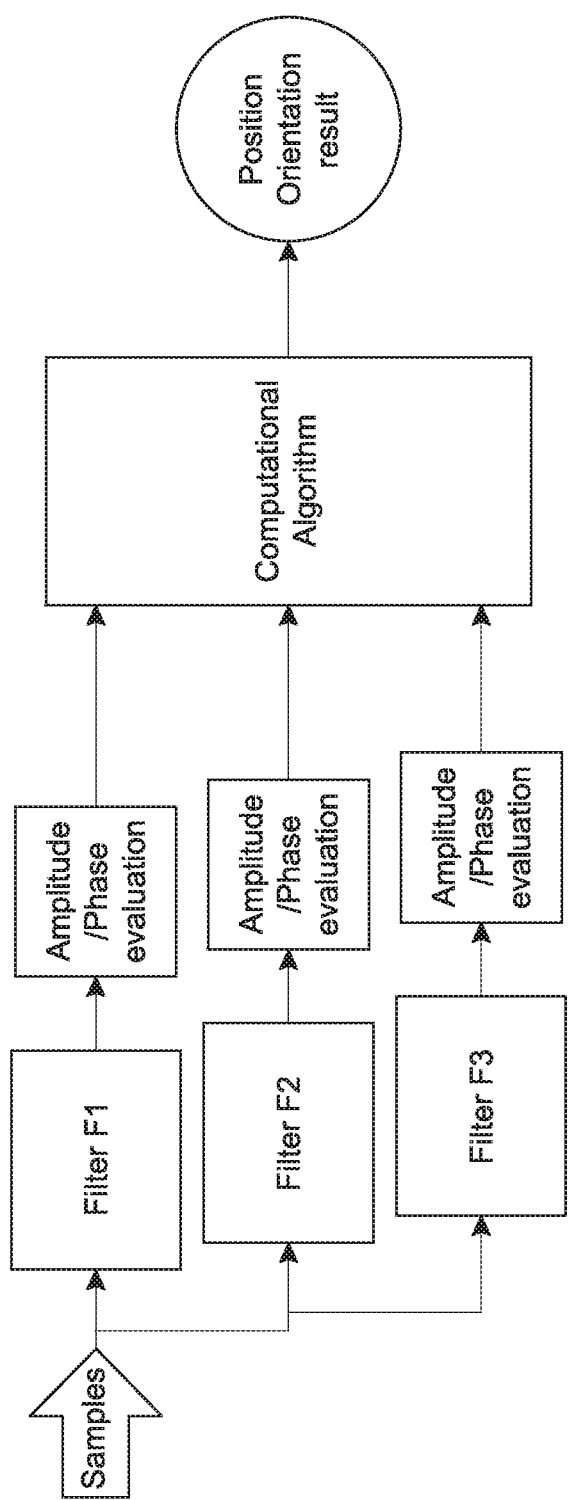

Referring to FIGS. 20A-20C, a configuration is shown with a summing amplifier 2002 to simplify circuitry between two subsystems or components of a wearable computing configuration such as a head mounted component and a belt-pack component. With a conventional configuration, each of the coils 2004 (on the left of FIG. 20A) of an electromagnetic tracking sensor 604 is associated with an amplifier 2006, and three distinct amplified signals can be sent through a summing amplifier 2002 and the cabling to the other component (e.g., processing circuitry as shown in FIG. 20B). In the illustrated embodiment, the three distinct amplified signals may be directed to the summing amplifier 2002, which produces one amplified signal that is directed down an advantageously simplified cable 2008, and each signal may be at a different frequency. The summing amplifier 2002 may be configured to amplify all three signals received by the amplifier; then (as illustrated in FIG. 20B) the receiving digital signal processor, after analog-to-digital conversion, separates the signals at the other end. Gain control may be used. FIG. 20C illustrates a filter for each frequency (F1, F2, and F3)—so the signals may be separated back out at such stage. The three signals may be analyzed by a computational algorithm (e.g., to determine sensor pose) and the position or orientation result can be used by the AR system (e.g., to properly display virtual content to the user based on the user's instantaneous head pose).

Example EM Tracking System Updating

Figure 21:
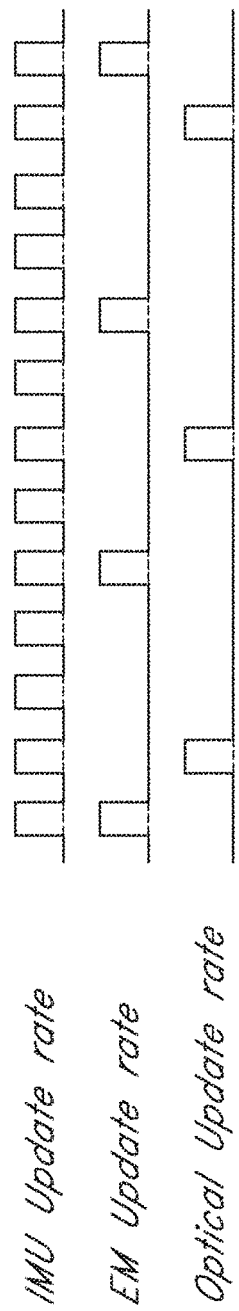
FIG. 21 is a graph that shows an example of fusing output from an IMU, an electromagnetic tracking sensor, and an optical sensor.

Referring to FIG. 21, electromagnetic ("EM") tracking updating can be relatively "expensive" in terms of power for a portable system, and may not be capable of very high frequency updating. In a "sensor fusion" configuration, more frequently updated localization information from another sensor such as an IMU may be combined, along with data from another sensor, such as an optical sensor (e.g., a camera or a depth camera), which may or may not be at a relatively high frequency; the net of fusing all of these inputs places a lower demand upon the EM system and provides for quicker updating.

Figure 22A:
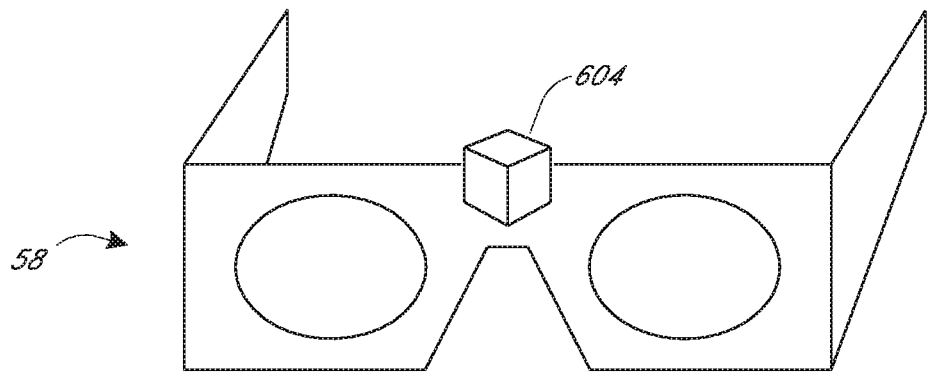
FIGS. 22A-22C schematically illustrate additional examples of electromagnetic sensing coils coupled to a head-mounted display.
Figure 22B:
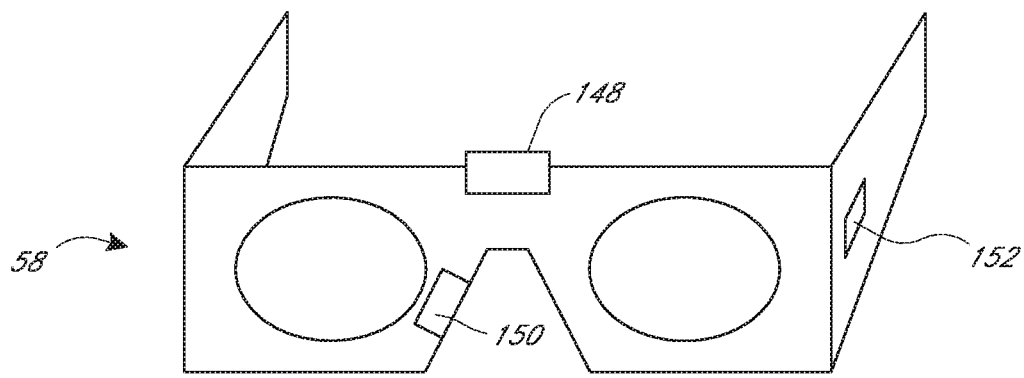
Figure 22C:
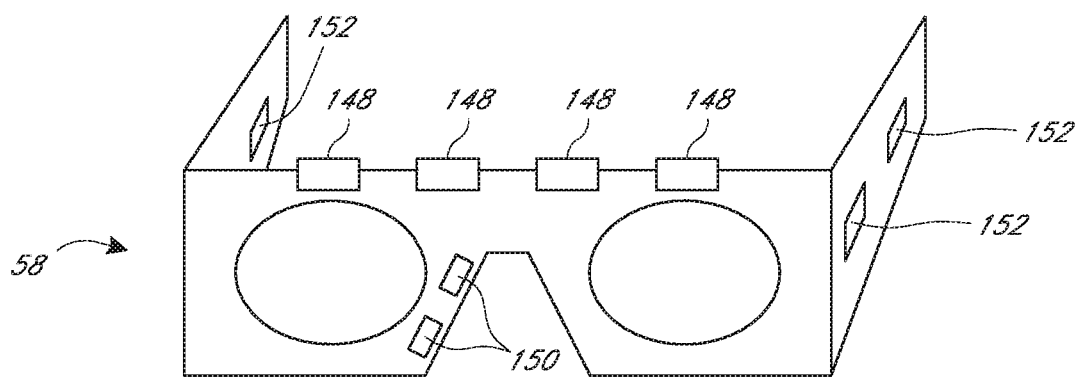

Referring back to FIG. 11B, a distributed sensor coil configuration was shown for the AR device 58. Referring to FIG. 22A, an AR device 58 with a single electromagnetic sensor device (604), such as a housing containing three orthogonal sensing coils, one for each direction of X, Y, Z, may be coupled to the wearable component (58) for 6 degree of freedom tracking, as described above. Also as noted above, such a device may be dis-integrated, with the three sub-portions (e.g., coils) attached at different locations of the wearable component (58), as shown in FIGS. 22B and 22C. Referring to FIG. 22C, to provide further design alternatives, each individual sensor coil may be replaced with a group of similarly oriented coils, such that the overall magnetic flux for any given orthogonal direction is captured by the group (148, 150, 152) rather than by a single coil for each orthogonal direction. In other words, rather than one coil for each orthogonal direction, a group of smaller coils may be utilized and their signals aggregated to form the signal for that orthogonal direction. In another embodiment wherein a particular system component, such as a head mounted component (58) features two or more electromagnetic coil sensor sets, the system may be configured to selectively utilize the sensor and emitter pairing that are closest to each other (e.g., within 1 cm, 2 cm, 3 cm, 4 cm, 5 cm, or 10 cm) to improve or optimize the performance of the system.

Examples of Recalibrating a Wearable Display System

Figure 23A:
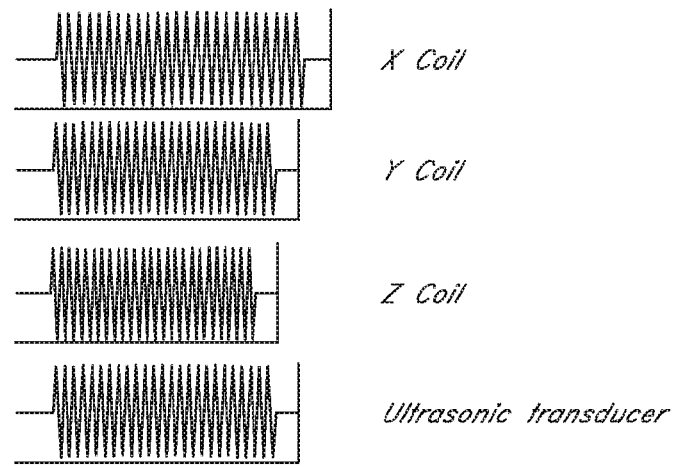
FIGS. 23A-23C schematically illustrate an example of recalibrating a head-mounted display using electromagnetic signals and an acoustic signal.
Figure 23B:
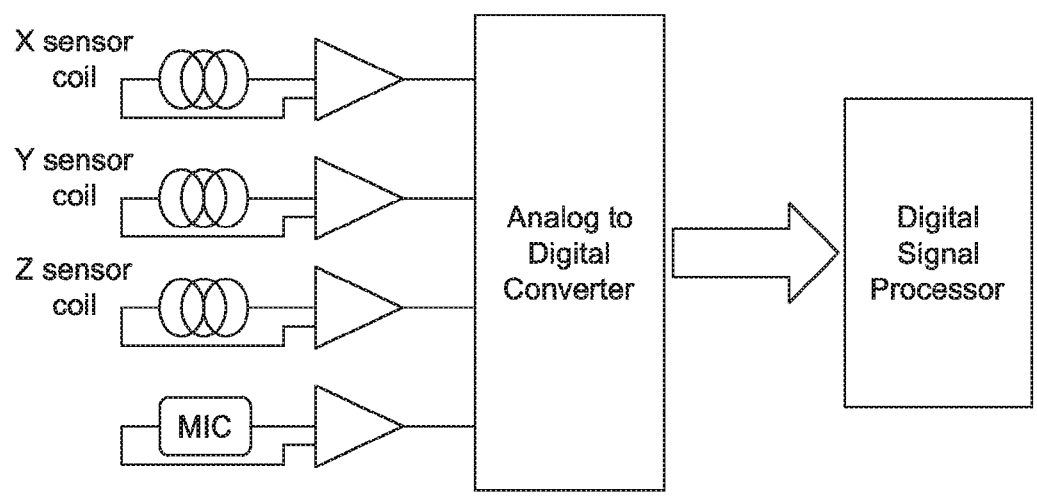
Figure 23C:
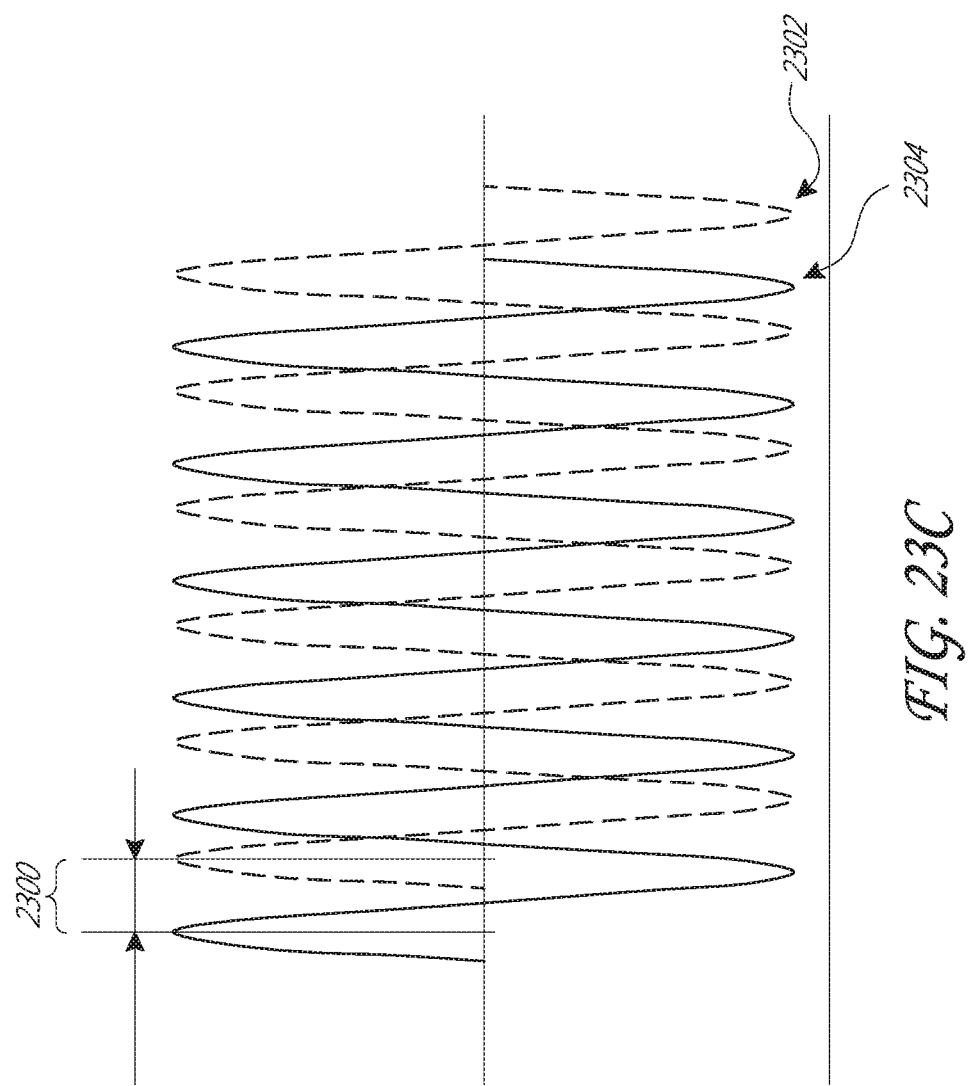

Referring to FIGS. 23A-23C, it may be useful to recalibrate a wearable computing system such as those discussed herein, and in one embodiment, acoustic (e.g., ultrasonic) signals generated at the transmitter, along with an acoustic sensor (e.g., microphone) at the receiver and acoustic time of flight calculation, may be utilized to determine sound propagation delay between the transmitter and receiver and thereby distance between the transmitter and receiver (since the speed of sound is known). FIG. 23A shows that in one embodiment, three coils on the transmitter are energized with a burst of sinewaves, and at the same time an ultrasonic transducer may be energized with a burst of sinewaves, preferably of the same frequency as one of the coils. FIG. 23B illustrates that an EM receiver may be configured to receive the three EM waves using X, Y, Z sensor coils, and the acoustic, ultrasonic wave using a microphone (MIC). Total distance may be calculated from the amplitude of the three EM signals. Time of flight (sound propagation delay time 2300) may be calculated by comparing the timing of the acoustic (microphone) response 2302 with the response of the EM coils 2304 (see, e.g., FIG. 23C). This may be used to also calculate distance. Comparing the electromagnetically calculated distance with the acoustic delay time 2300 can be used to calibrate the EM TX or RX circuits (e.g., by correction factors).

Figure 24A:
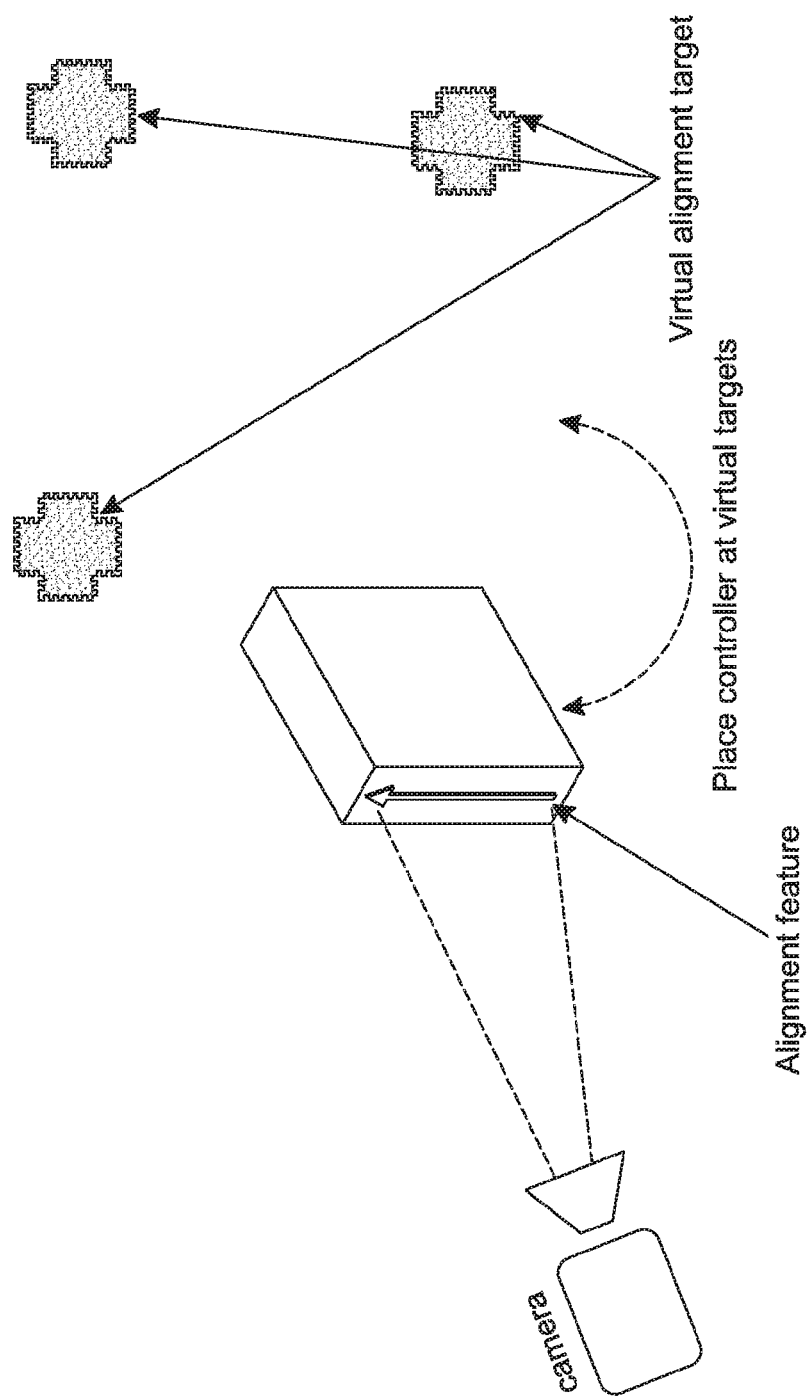
FIGS. 24A-24D schematically illustrate additional examples of recalibrating a head-mounted display using a camera or a depth sensor.

Referring to FIG. 24A, in another embodiment, in an augmented reality system featuring a camera, the distance may be calculated by measuring the size in pixels of a known-size alignment feature (depicted as an arrow in FIG. 24A) on another device such as a handheld controller (e.g., the controller 606).

Figure 24B:
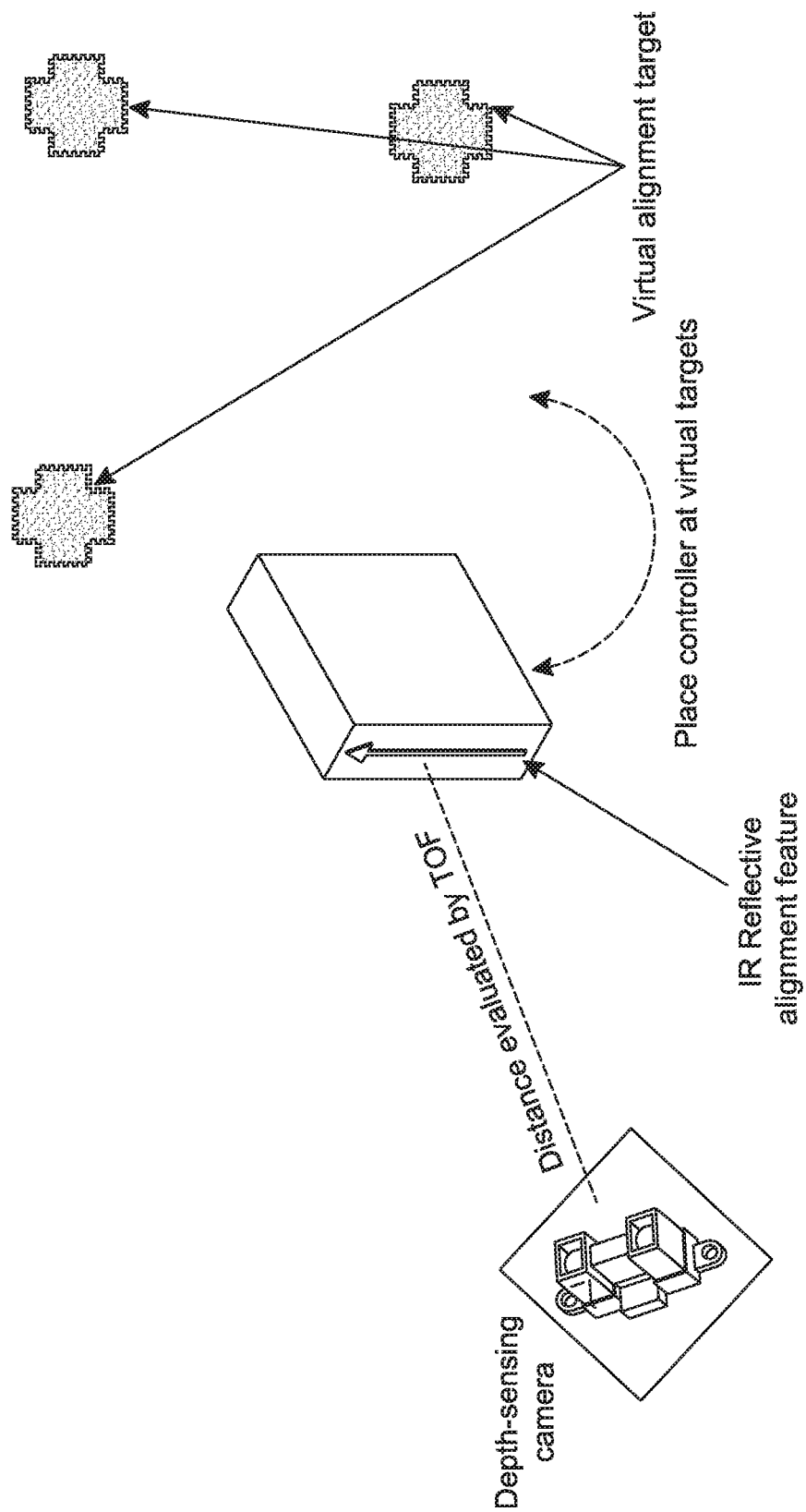

Referring to FIG. 24B, in another embodiment, in an augmented reality system featuring a depth sensor, such as an infrared ("IR") depth sensor, the distance may be calculated by such depth sensor and reported directly to the controller.

Figure 24C:
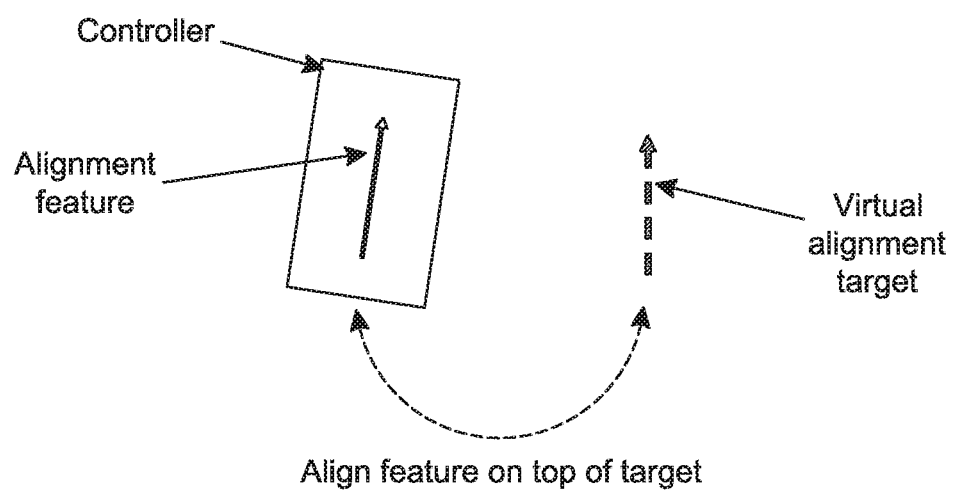
Figure 24D:
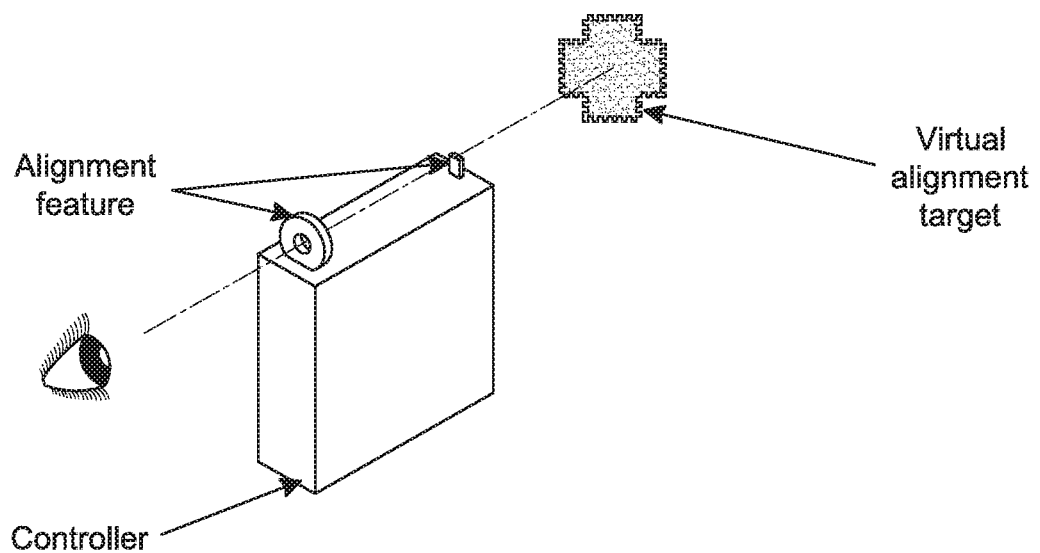

Referring to FIGS. 24C and 24D, once the total distance is known, either the camera or the depth sensor can be used to determine position in space. The augmented reality system may be configured to project one or more virtual alignment targets to the user. The user may align the controller to the targets, and the system can calculate position from both the EM response, and from the direction of the virtual targets plus the previously calculated distance. Roll angle calibration may be done by aligning a known feature on the controller with a virtual target projected to the user; yaw and pitch angle may be calibrated by presenting a virtual target to the user and having the user align two features on the controller with the target (much like sighting a rifle).

Figure 25A:
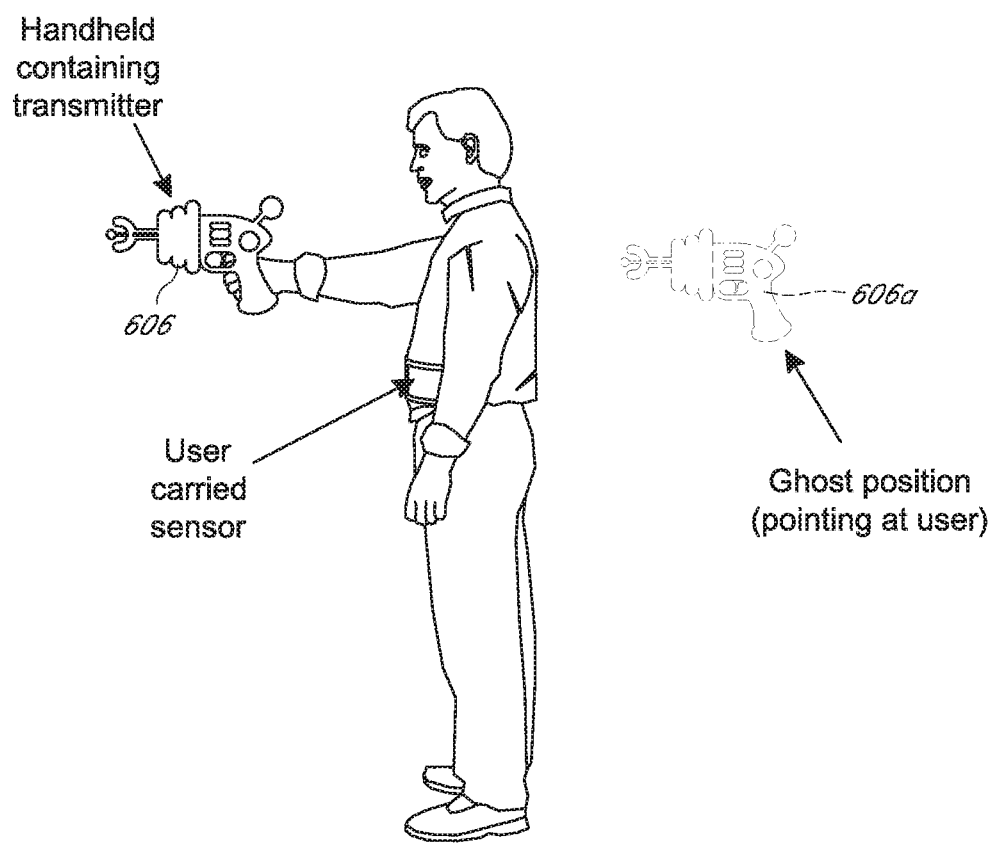
FIGS. 25A and 25B schematically illustrate techniques for resolving position ambiguity that may be associated with an electromagnetic tracking system.
Figure 25B:
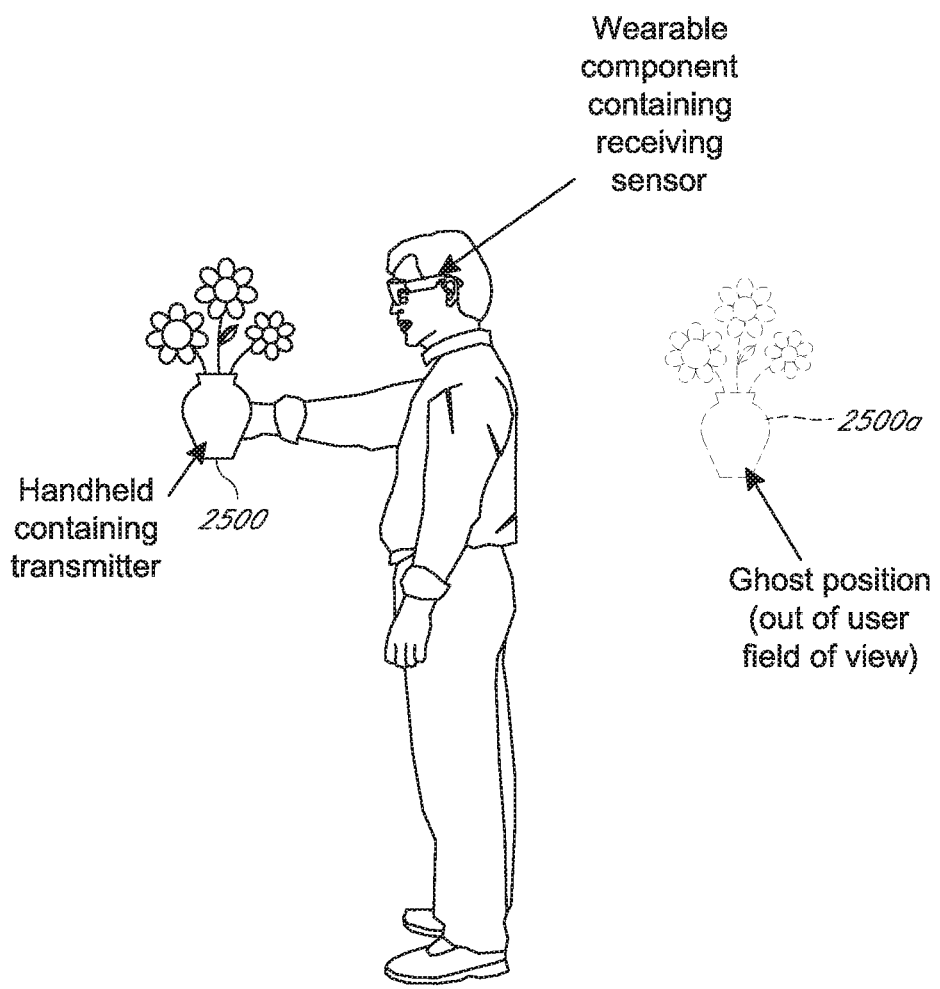

Referring to FIGS. 25A and 25B, there may be an inherent ambiguity associated with EM tracking systems: a receiver would generate a similar response in two diagonally opposed locations around the transmitter. For example, FIG. 25A shows a handheld device 606 and a ghost device 606a that generates a similar response. Such a challenge is particularly relevant in systems wherein both the transmitter and receiver may be mobile relative to each other.

In one embodiment, the system may use an IMU sensor to determine if the user is on the plus or the negative side of a reference (e.g., symmetry) axis. In an embodiment such as those described above which feature world cameras and a depth camera, the system can use that information to detect whether a handheld component (e.g., handheld 2500 in FIG. 25B) is in the positive side or negative side of the reference axis; if the handheld 2500 is outside of the field of view of the camera and/or depth sensor, the system may be configured to decide (or the user may decide) that the handheld component 2500 is in the 180-degree zone directly in back of the user, for example, at the ghost position 2500a as shown in FIG. 25B.

Referring back to the embodiments above wherein outward-oriented camera devices (124, 154, 156) are coupled to a system component such as a head mounted component (58), the position and orientation of the head coupled to such head mounted component (58) may be determined using information gathered from these camera devices, using techniques such as simultaneous localization and mapping, or "SLAM" techniques (also known as parallel tracking and mapping, or "PTAM" techniques). Understanding the position and orientation of the head of the user, also known as the user's "head pose", in real or near-real time (e.g., preferably with low latency of determination and updating) is valuable in determining where the user is within the actual environment around him or her, and how to place and present virtual content relative to the user and the environment pertinent to the augmented or mixed reality experience of the user. A typical SLAM or PTAM configuration involves extracting features from incoming image information and using this to triangulate 3-D mapping points, and then tracking against those 3-D mapping points. SLAM techniques have been utilized in many implementations, such as in self-driving cars, where computing, power, and sensing resources may be relatively plentiful when compared with those which might be available on board a wearable computing device, such as a head mounted component (58).

Figure 26:
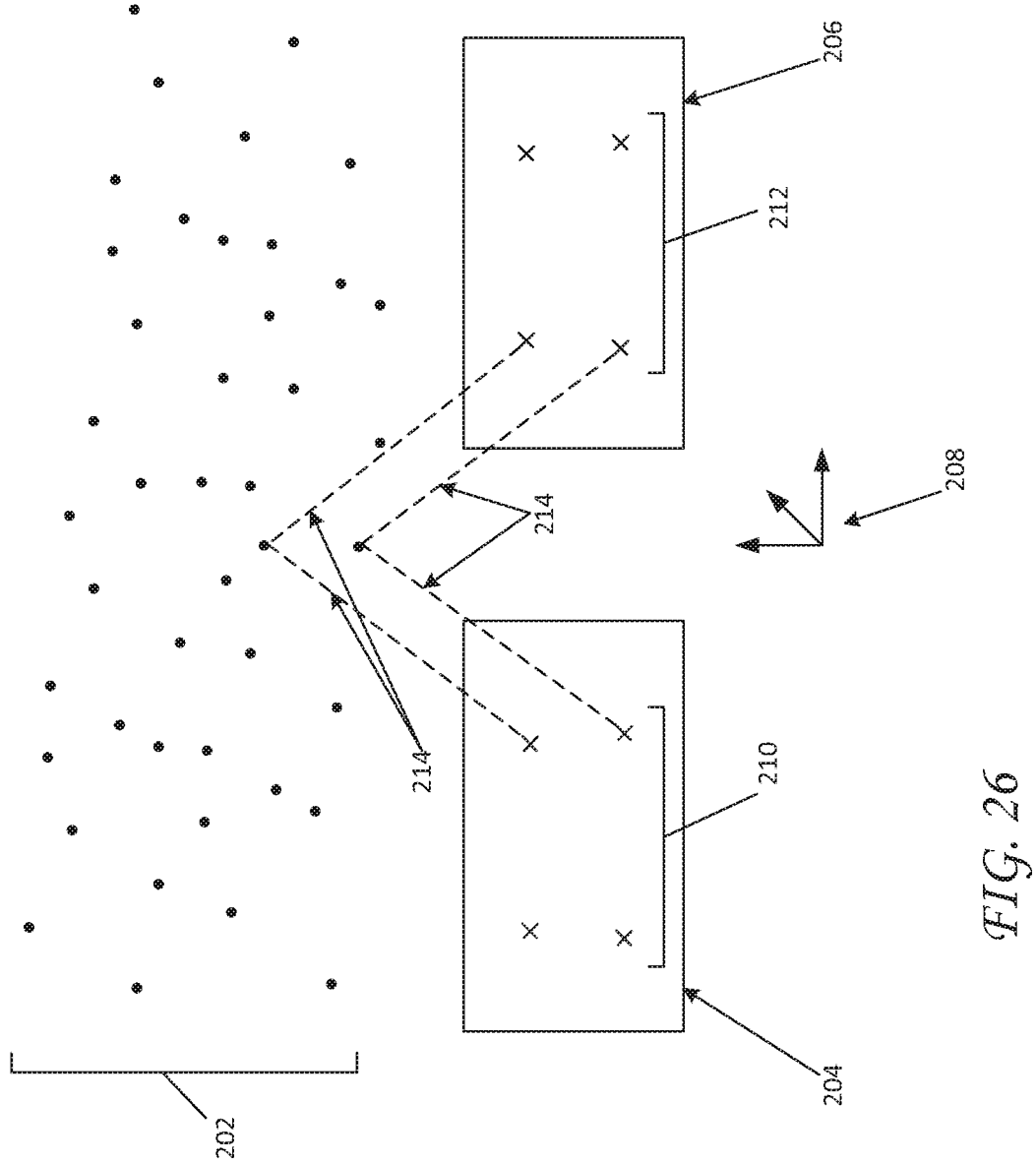
FIG. 26 schematically illustrates an example of feature extraction and generation of sparse 3-D map points.

Examples of Pose Calculation and Location Mapping Via Extraction of Camera Features Referring to FIG. 26, in one embodiment, a wearable computing device, such as a head mounted component (58), may comprise two outward-facing cameras producing two camera images (left—204, right—206). In one embodiment, a relatively lightweight, portable, and power efficient embedded processor, such as those sold by Movidius®, Intel®, Qualcomm®, or Ceva®, may comprise part of the head mounted component (58) and be operatively coupled to the camera devices. The embedded processor may be configured to first extract features (210, 212) from the camera images (204, 206). If the calibration between the two cameras is known, then the system can triangulate (214) 3-D mapping points of those features, resulting in a set of sparse 3-D map points (202). This may be stored as the "map", and these first frames may be utilized to establish the "world" coordinate system origin (208). As subsequent image information comes into the embedded processor from the cameras, the system may be configured to project the 3-D map points into the new image information, and compare with locations of 2-D features that have been detected in the image information. Thus the system may be configured to attempt to establish a 2-D to 3-D correspondence, and using a group of such correspondences, such as about six of them, the pose of the user's head (which is, of course, coupled to the head mounted device 58) may be estimated. A greater number of correspondences, such as more than six, generally means a better job of estimating the pose. Of course this analysis relies upon having some sense of where the user's head was (e.g., in terms of position and orientation) before the current images being examined. As long as the system is able to track without too much latency, the system may use the pose estimate from the most immediately previous time to estimate where the head is for the most current data. Thus is the last frame was the origin, the system may be configured to estimate that the user's head is not far from that in terms of position and/or orientation, and may search around that to find correspondences for the current time interval. Such is a basis of one embodiment of a tracking configuration.

After moving sufficiently away from the original set of map points (202), one or both camera images (204, 206) may start to lose the map points in the newly incoming images (for example, if the user's head is rotating right in space, the original map points may start to disappear to the left and may only appear in the left image, and then not at all with more rotation). Once the user has rotated too far away from the original set of map points, the system may be configured to create new map points, such as by using a process similar to that described above (detect features, create new map points)—this is an example of how the system may be configured to keep populating the map. In one embodiment, this process may be repeated again every 10 to 20 frames, depending upon how much the user is translating and/or rotating his head relative to his environment, and thereby translating and/or rotating the associated cameras. Frames associated with newly created mapping points may be deemed "key frames", and the system may be configured to delay the feature detection process with key frames, or alternatively, feature detection may be conducted upon each frame to try to establish matches, and then when the system is ready to create a new key frame, the system already has that associated feature detection completed. Thus, in one embodiment, the basic paradigm is to start off creating a map, and then track, track, track until the system needs to create another map or additional portion thereof.

Figure 27:
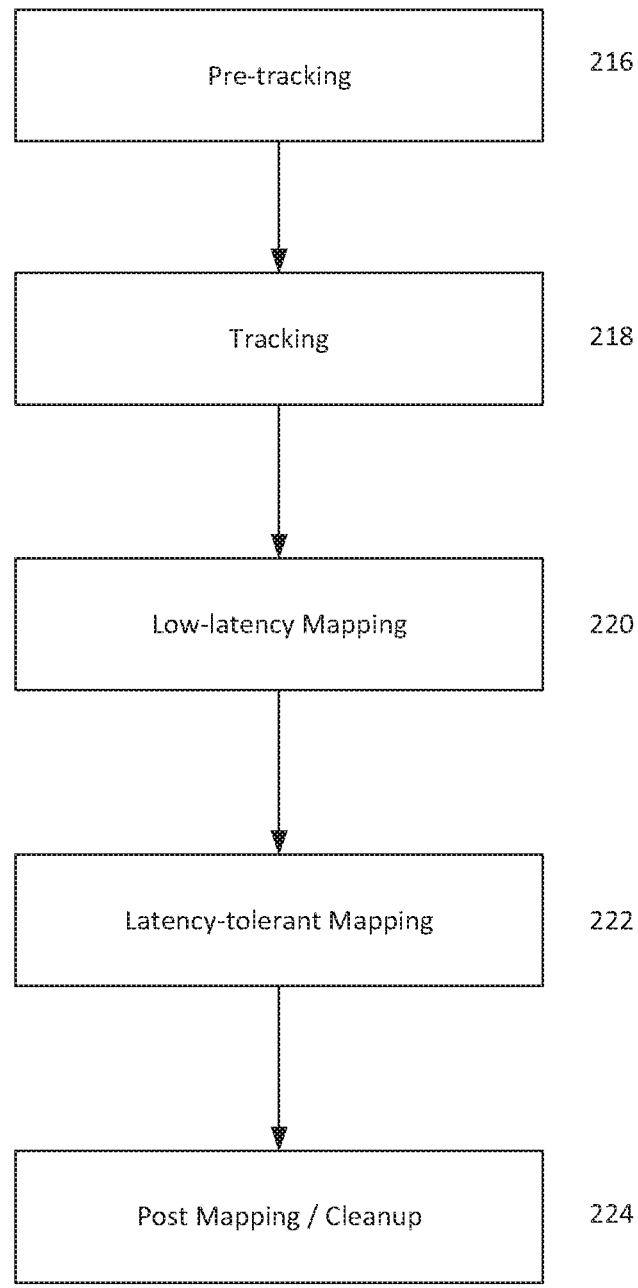
FIG. 27 is a flowchart that shows an example of a method for vision based pose calculation.

Referring to FIG. 27, in one embodiment, vision based pose calculation may be split into 5 stages (e.g., pre-tracking 216, tracking 218, low-latency mapping 220, latency-tolerant mapping 222, post mapping/cleanup 224) to assist with precision and optimization for embedded processor configurations wherein computation, power, and sensing resources may be limited. The vision based posed calculation can be performed by the local processing and data module 70 or the remote processing and data module 72, 74.

With regard to pretracking (216), the system may be configured to identify which map points project into the image before the image information arrives. In other words, the system may be configure to identify which map points would project into the image given that the system knows where the user was before, and has a sense or where the user is going. The notion of "sensor fusion" is discussed further below, but it is worth noting here that one of the inputs that the system may get from a sensor fusion module or functionality may be "post estimation" information, at a relatively fast rate, such as at 250 Hz from an inertial measurement unit ("IMU") or other sensor or device (this is a high rate relative to, say, 30 Hz, at which the vision based pose calculation operation may be providing updates). Thus there may be a much finer temporal resolution of pose information being derived from IMU or other device relative to vision based pose calculation; but it is also noteworthy that the data from devices such as IMUs tends to be somewhat noisy and susceptible to pose estimation drift, as discussed below. For relatively short time windows, such as 10-15 milliseconds, the IMU data may be quite useful in predicting pose, and, again, when combined with other data in a sensor fusion configuration, an optimized overall result may be determined.

Pose information coming from a sensor fusion module or functionality may be termed "pose prior", and this pose prior may be utilized by the system to estimate which sets of points are going to project into the current image. Thus in one embodiment, the system is configured in a "pre tracking" step (216) to pre-fetch those map points and conduct some pre-processing that helps to reduce latency of overall processing. Each of the 3-D map points may be associated with a descriptor, so that the system may identify them uniquely and match them to regions in the image. For example, if a given map point was created by using a feature that has a patch around it, the system may be configured to maintain some semblance of that patch along with the map point, so that when the map point is seen projected onto other images, the system can look back at the original image used to create the map, examine the patch correlation, and determine if they are the same point. Thus in pre-processing, the system may be configured to do some amount of fetching of map points, and some amount of pre-processing associated with the patches associated with those map points. Thus in pre-tracking (216), the system may be configured to pre-fetch map points, and pre-warp image patches (a "warp" of an image may be done to ensure that the system can match the patch associated with the map point with the current image; a warp is an example of a way to make sure that the data being compared is compatible).

Referring back to FIG. 27, a tracking stage may comprise several components, such as feature detection, optical flow analysis, feature matching, and pose estimation. While detecting features in the incoming image data, the system may be configured to utilize optical flow analysis to save computational time in feature detection by trying to follow features from one or more previous images. Once features have been identified in the current image, the system may be configured to try to match the features with projected map points—this may be deemed the "feature matching" portion of the configuration. In the pre-tracking stage (216), the system preferably has already identified which map points are of interest, and fetched them; in feature mapping, they are projected into the current image and the system tries to match them with the features. The output of feature mapping is the set of 2-D to 3-D correspondences, and with that in hand, the system is configured to estimate the pose.

As the user is tracking his head around, coupled to the head mounted component (58), the system preferably is configured to identify if the user is looking at a new region of the environment or not, to determine whether a new key frame is needed. In one embodiment, such analysis of whether a new key frame is needed may be almost purely based upon geometry; for example, the system may be configured to look at the distance (translational distance; also field-of-view capture reorientation—the user's head may be close translationally but re-oriented such that completely new map points may be required, for example) from the current frame to the remaining key frames. Once the system has determined that a new key frame should be inserted, the mapping stage may be started. As noted above, the system may be configured to operate mapping as three different operations (low-latency mapping, latency-tolerant mapping, post/mapping or cleanup), as opposed to a single mapping operation more likely seen in a conventional SLAM or PTAM operation.

Low-latency mapping (220), which may be thought of in a simplistic form as triangulation and creation of new map points, is a critical stage, with the system preferably configured to conduct such stage immediately, because the paradigm of tracking discussed herein relies upon map points, with the system only finding a position if there are map points available to track against. The "low-latency" denomination refers to the notion that there is no tolerance for unexcused latency (in other words, this part of the mapping needs to be conducted as quickly as possible or the system has a tracking problem).

Latency-tolerant mapping (222) may be thought of in a simplistic form as an optimization stage. The overall process does not absolutely require low latency to conduct this operation known as "bundle adjustment", which provides a global optimization in the result. The system may be configured to examine the positions of 3-D points, as well as where they were observed from. There are many errors that can chain together in the process of creating map points. The bundle adjustment process may take, for example, particular points that were observed from two different view locations and use all of this information to gain a better sense of the actual 3-D geometry. The result may be that the 3-D points and also the calculated trajectory (e.g., location, path of the capturing cameras) may be adjusted by a small amount. It is desirable to conduct these kinds of processes to not accumulate errors through the mapping/tracking process.

The post mapping/cleanup (224) stage is one in which the system may be configured to remove points on the map that do not provide valuable information in the mapping and tracking analysis. In this stage, these points that do not provide useful information about the scene are removed, and such analysis is helpful in keeping the entire mapping and tracking process scalable.

During the vision pose calculation process, there is an assumption that features being viewed by the outward-facing cameras are static features (e.g., not moving from frame to frame relative to the global coordinate system). In various embodiments, semantic segmentation and/or object detection techniques may be utilized to remove moving objects from the pertinent field, such as humans, moving vehicles, and the like, so that features for mapping and tracking are not extracted from these regions of the various images. In one embodiment, deep learning techniques, such as those described below, may be utilized for segmenting out these non-static objects.

Examples of Sensor Fusion

Referring to FIGS. 28A-28F, a sensor fusion configuration may be utilized to benefit from one source of information coming from a sensor with relatively high update frequency (such as an IMU updating gyroscope, accelerometer, and/or magnetometer data pertinent to head pose at a frequency such as 250 Hz) and another information source updating at a lower frequency (such as a vision based head pose measurement process updating at a frequency such as 30 Hz). In various embodiments, the higher frequency sensor data is at frequencies above 100 Hz and the lower frequency sensor data is at frequencies below 100 Hz. In some embodiments, the higher frequency sensor data is at frequencies greater than 3 times, 5 times, 10 times, 25 times, 100 times, or greater than the frequencies at which the lower frequency sensor takes data.

Figure 28A:
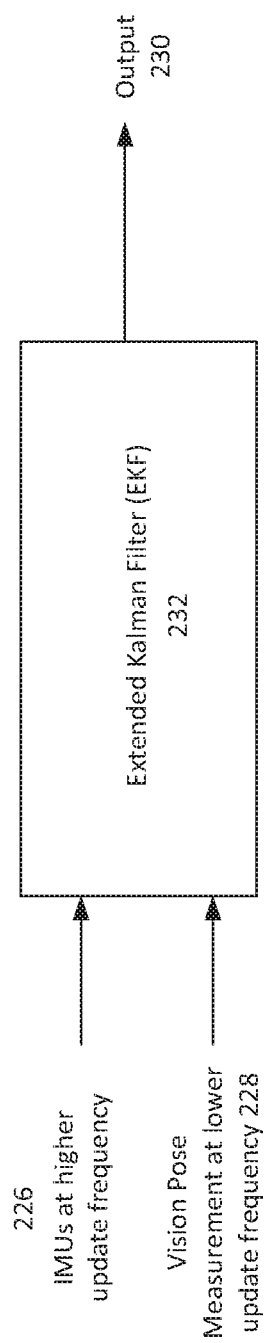
Figure 28B:
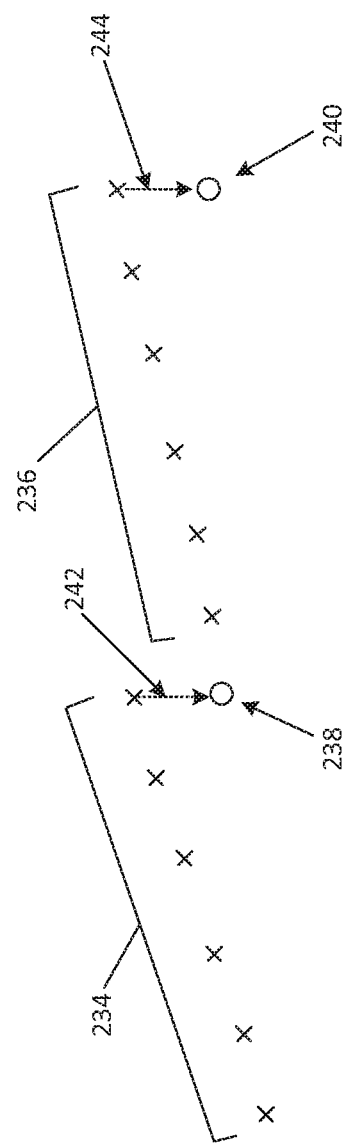

Referring to FIG. 28A, in one embodiment the system may be configured to use an extended Kalman filter (EKF, 232) and to track a significant amount of information regarding the device. For example, in one embodiment, it may account for 32 states, such as angular velocity (e.g., from the IMU gyroscope), translational acceleration (e.g., from the IMU accelerometers), calibration information for the IMU itself (e.g., coordinate systems and calibration factors for the gyros and accelerometers; the IMU may also comprise one or more magnetometers). Thus the system may be configured to take in IMU measurements at a relatively high update frequency (226), such as 250 Hz, as well as data from some other source at a lower update frequency (e.g., calculated vision pose measurement, odometry data, etc.), for example, vision pose measurement (228) at an update frequency such as 30 Hz.

Each time the EKF gets a round of IMU measurements, the system may be configured to integrate the angular velocity information to get rotational information (e.g., the integral of angular velocity (change in rotational position over change in time) is angular position (change in angular position)); likewise for translational information (in other words, by doing a double integral of the translational acceleration, the system will get position data). With such calculation the system can be configured to get 6 degree-of-freedom (DOF) pose information from the head (translation in X, Y, Z; orientation for the three rotational axes)—at the high frequency from the IMU (e.g., 250 Hz in one embodiment). Each time an integration is done, noise is accumulated in the data; doing a double integration on the translational or rotational acceleration can propagate noise. Generally the system is configured to not rely on such data which is susceptible to "drift" due to noise for too long a time window, such as any longer than about 100 milliseconds in one embodiment. The incoming lower frequency (e.g., updated at about 30 Hz in one embodiment) data from the vision pose measurement (228) may be utilized to operate as a correction factor with the EKF (232), producing a corrected output (230).

Referring to FIGS. 28B-28F, to illustrate how the data from one source at a higher update frequency may be combined with the data from another source at a lower update frequency, a first group of points (234) from an IMU at a higher frequency, such as 250 Hz, is shown, with a point (238) coming in at a lower frequency, such as 30 Hz, from a vision pose calculation process. The system may be configured to correct (242) to the vision pose calculation point when such information is available, and then continue forward with more points from the IMU data (236) and another correction (244) from another point (240) available from the vision pose calculation process. The may be termed applying an "update" with the vision pose data to the "propagation" of data coming from the IMU, using the EKF.

In is notable that in some embodiments, the data from the second source (e.g., such as the vision pose data) may come in not only at a lower update frequency, but also with some latency—meaning that the system preferably is configured to navigate a time domain adjustment as the information from IMU and vision pose calculation are integrated. In one embodiment, to ensure that the system is fusing in the vision pose calculation input at the correct time domain position in the IMU data, a buffer of IMU data may be maintained, to go back, to a time (say "Tx") in the IMU data to do the fusion and calculate the "update" or adjustment at the time pertinent to the input from the vision pose calculation, and then account for that in forward propagation to the current time (say "Tcurrent"), which leaves a gap between the adjusted position and/or orientation data and the most current data coming from the IMU. To ensure that there is not too much of a "jump" or "jitter" in the presentation to the user, the system may be configured to use smoothing techniques. One way to address this issue is to use weighted averaging techniques, which may be linear, nonlinear, exponential, etc., to eventually drive the fused data stream down to the adjusted path.

Figure 28C:
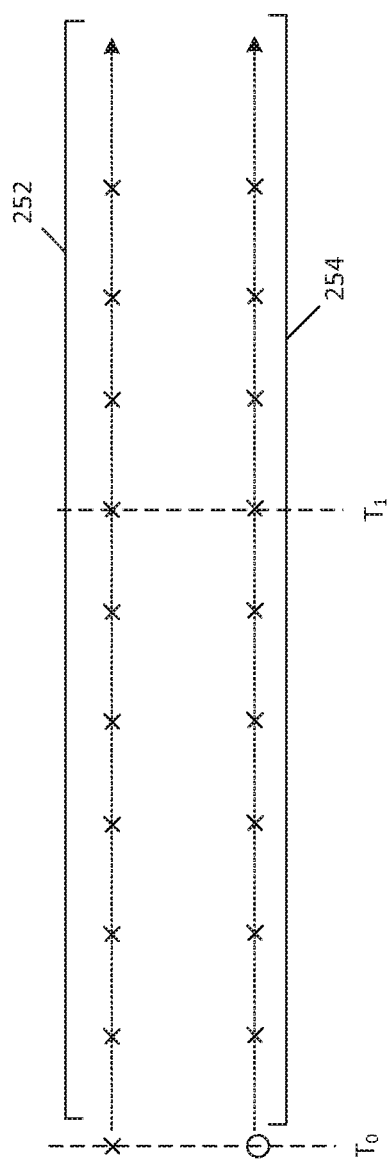
Figure 28D:
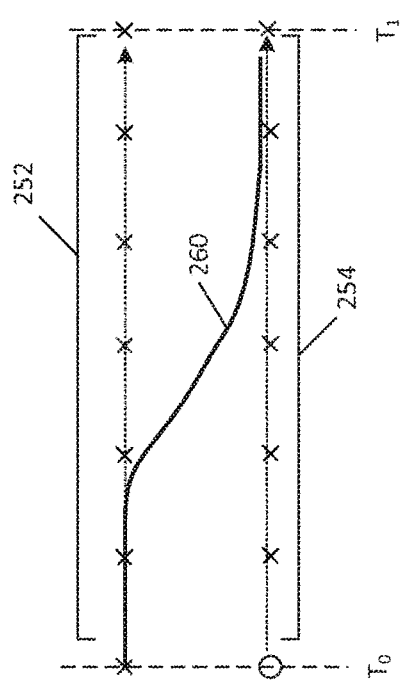

Referring to FIG. 28C, for example, weighted averaging techniques may be utilized over the time domain between T0 and T1 to drive the signal from the unadjusted path (252; e.g., coming straight from the IMU) to the adjusted path (254; e.g., based upon data coming from the visual pose calculation process); one example is shown in FIG. 28D, wherein a fused result (260) is shown starting at the unadjusted path (252) and time T0 and moving exponentially to the adjusted path (254) by T1. Referring to FIG. 28E, a series of correction opportunities is shown with an exponential time domain correction of the fused result (260) toward the lower path from the upper path in each sequence (first correction is from the first path 252, say from the IMU, to the second path 254, say from vision based pose calculation; then continuing with the similar pattern forward, using the continued IMU data while correcting, down in this example toward successive corrected lower paths 256, 258 based upon successive points from vision pose, using each incoming vision based pose calculation point). Referring to FIG. 28F, with short enough time windows between the "updates" or corrections, the overall fused result (260) functionally may be perceived as a relatively smooth patterned result (262).

In other embodiment, rather than rely directly upon the vision pose measurement, the system may be configured to examine the derivative EKF; in other words, rather than using vision pose calculation result directly, the system uses the change in vision pose from the current time to the previous time. Such a configuration may be pursued, for example, if the amount of noise in the vision pose difference is a lot less than the amount of noise in the absolute vision pose measurement. It is preferable to not have instantaneous errors throwing off the fused result, because the output of all of this is pose, which gets sent back as the "pose prior" values to the vision system.

Although certain embodiments use an EKF, other embodiments may use different estimation algorithms such as, e.g., unscented Kalman filters, linear Kalman filters, Bayesian models, hidden Markov models, particle filters, sequential Monte Carlo models, or other estimation techniques.

Example Pose Service

The external system-based "consumer" of the pose result may be termed the "Pose Service", and the system may be configured such that all other system components tap into the Pose Service when requesting a pose at any given time. The Pose Service may be configured to be a queue or stack (e.g., a buffer), with data for a sequences of time slices, one end having the most recent data. If a request of the Pose Service is the current pose, or some other pose that is in the buffer, then it may be outputted immediately; in certain configurations, the Pose Service will receive a request for: what is the pose going to be 20 milliseconds forward in time from now (for example, in a video game content rendering scenario—it may be desirable for a related service to know that it needs to be rendering something in a given position and/or orientation slightly in the future from now). In one model for producing a future pose value, the system may be configured to use a constant velocity prediction model (e.g., assume that the user's head is moving with a constant velocity and/or angular velocity); in another model for producing a future pose value, the system may be configured to use a constant acceleration prediction model (e.g. assume that the user's head is translating and/or rotating with constant acceleration). The data in the data buffer may be utilized to extrapolate where the pose will be using such models. A constant acceleration model uses a bit longer tail into the data of the buffer for prediction than does a constant velocity model, and we have found that the subject systems can predict into the range of 20 milliseconds in the future without substantial degradation. Thus the Pose Service may be configured to have a data buffer going back in time, as well as about 20 milliseconds or more going forward, in terms of data that may be utilized to output pose. Operationally, content operations generally will be configured to identify when the next frame draw is going to be coming in time (for example, it will either try to draw at a time T, or at a time T+N, the N being the next interval of updated data available from the Pose Service).

The use of user-facing (e.g., inward-facing, such as toward the user's eyes) cameras, such as those depicted in FIG. 16B (14) may be utilized to conduct eye tracking, as described, for example, in U.S. patent application Ser. Nos. 14/707,000 and 15/238,516, which are hereby incorporated by reference herein in their entireties. The system may be configured to conduct several steps in eye tracking, such as first taking an image of the eye of the user; then using segmenting analysis to segment anatomy of the eye (for example, to segment the pupil, from the iris, from the sclera, from the surrounding skin); then the system may be configured to estimate the pupil center using glint locations identified in the images of the eye, the glints resulting from small illumination sources (16), such as LEDs, which may be placed around the inward-facing side of the head mounted component (58); from these steps, the system may be configured to use geometric relationships to determine an accurate estimate regarding where in space the particular eye is gazing. Such processes are fairly computationally intensive for two eyes, particularly in view of the resources available on a portable system, such as a head mounted component (58) featuring on on-board embedded processor and limited power.

Deep learning techniques may be trained and utilized to address these and other computational challenges. For example, in one embodiment, a deep learning network may be utilized to conduct the segmentation portion of the aforementioned eye tracking paradigm (e.g., a deep convolutional network may be utilized for robust pixel-wise segmentation of the left and right eye images into iris, pupil, sclera, and rest classes), with everything else remaining the same; such a configuration takes one of the large computationally intensive portions of the process and makes it significantly more efficient. In another embodiment, one joint deep learning model may be trained and utilized to conduct segmentation, pupil detection, and glint detection (e.g., a deep convolutional network may be utilized for robust pixel-wise segmentation of the left and right eye images into iris, pupil, sclera, and rest classes; eye segmentation may then be utilized to narrow down the 2-D glint locations of active inward-facing LED illumination sources); then the geometry calculations to determine gaze may be conducted. Such a paradigm also streamlines computation. In a third embodiment, a deep learning model may be trained and utilized to directly estimate gaze based upon the two images of the eyes coming from the inward-facing cameras (e.g., in such an embodiment, a deep learning model solely using the pictures of the user's eyes may be configured to tell the system where the user is gazing in three dimensional space; a deep convolutional network may be utilized for robust pixel-wise segmentation of the left and right eye images into iris, pupil, sclera, and rest classes; eye segmentation may then be utilized to narrow down the 2-D glint locations of active inward-facing LED illumination sources; the 2-D glint locations along with 3-D LED locations may be utilized to detect the cornea center in 3-D; note that all 3-D locations may be in the respective camera coordinate system; then eye segmentation may also be utilized to detect the pupil center in the 2-D image using ellipse fitting; using offline calibration information, the 2-D pupil center may be mapped to a 3-D gaze point, with depth being determined during calibration; the line connecting the cornea 3-D location and the 3-D gaze point location is the gaze vector for that eye); such a paradigm also streamlines computation, and the pertinent deep network may be trained to directly predict the 3-D gaze point given the left and right images. The loss function for such deep network to perform such a training may be a simple Euclidean loss, or also include the well-known geometric constraints of the eye model.

Further, deep learning models may be included for biometric identification using images of the user's iris from the inward-facing cameras. Such models may also be utilized to determine if a user is wearing a contact lens—because the model will jump out in the Fourier transform of the image data from the inward-facing cameras.

The use of outward-facing cameras, such as those depicted in FIG. 16A (124, 154, 156) may be utilized to conduct SLAM or PTAM analysis for the determination of pose, such as the pose of a user's head relative to the environment in which he is present wearing a head-mounted component (58), as described above. Most SLAM techniques are dependent upon tracking and matching of geometric features, as described in the embodiments above. Generally it is helpful to be in a "textured" world wherein the outward-facing cameras are able to detect corners, edges, and other features; further, certain assumptions may be made about the permanence/statics of features that are detected in scenes, and it is helpful to have significant computing and power resources available for all of this mapping and tracking analysis with SLAM or PTAM processes; such resources may be in short supply with certain systems, such as some of those which are portable or wearable, and which may have limited embedded processing capabilities and power available.

Example DeepSLAM Networks

Deep learning networks may be incorporated into various embodiments to observe differences in image data, and based upon training and configuration, play a key role in the SLAM analysis (in the context of SLAM, the deep networks herein may be deemed "DeepSLAM" networks) of variations of the subject system.

In one embodiment, a DeepSLAM network may be utilized to estimate pose between a pair of frames captured from cameras coupled to a component to be tracked, such as the head mounted component (58) of an augmented reality system. The system may comprise a convolutional neural network configured to learn transformation of pose (for example, the pose of a head mounted component 58) and apply this in a tracking manner. The system may be configured to start looking at a particular vector and orientation, such as straight ahead at a known origin (so 0, 0, 0 as X, Y, Z). Then the user's head may be moved, for example, to the right a bit, then to the left a bit between frame 0 and frame 1 with the goal of seeking the pose transform or relative pose transformation. The associated deep network may be trained on a pair of images, for example, wherein we know pose A and pose B, and image A and image B; this leads to a certain pose transformation. With the pose transformation determined, one may then integrate associated IMU data (from accelerometers, gyros, etc.—as discussed above) into the pose transformation and continue tracking as the user moves away from the origin, around the room, and at whatever trajectory. Such a system may be termed a "relative pose net", which as noted above, is trained based upon pairs of frames wherein the known pose information is available (the transformation is determined from one frame to the other, and based upon the variation in the actual images, the system learns what the pose transformation is in terms of translation and rotation). Deep homography estimation, or relative pose estimation, has been discussed, for example, in U.S. Patent Application Ser. No. 62/339,799, which is hereby incorporated by reference herein in its entirety.

When such configurations are utilized to conduct pose estimation from frame 0 to frame 1, the result generally is not perfect, and the system can implement a method for dealing with drift. As the system moves forward from frame 1 to 2 to 3 to 4 and estimates relative pose, there is a small amount of error brought in between each pair of frames. This error generally accumulates and becomes a problem (for example, without addressing this error-based drift, the system can end up placing the user and his or her associated system componentry in the wrong location and orientation with pose estimation. In one embodiment, the notion of "loop closure" may be applied to solve what may be termed the "relocalization" problem. In other words, the system may be configured to determine if it has been in a particular place before—and if so, then the predicted pose information should make sense in view of the previous pose information for the same location. For example, the system may be configured such that anytime it sees a frame on the map that has been seen before, it relocalizes; if the translation is off, say by 5 mm in the X direction, and the rotation is off, say by 5 degrees in the theta direction, then the system fixes this discrepancy along with those of the other associated frames; thus the trajectory becomes the true one, as opposed to the wrong one. Relocalization is discussed in U.S. Patent Application Ser. No. 62/263,529, which is hereby incorporated by reference herein in its entirety.

It also turns out that when pose is estimated, in particular by using IMU information (e.g., such as data from associated accelerometers, gyros, and the like, as described above), there is noise in the determined position and orientation data. If such data is directly utilized by the system without further processing to present images, for example, there is likely to be undesirable jitter and instability experienced by the user; this is why in certain techniques, such as some of those described above, Kalman filters, sensor fusion techniques, and smoothing functions may be utilized. With deep network solutions, such as those described above using convolutional neural nets to estimate pose, the smoothing issue may be addressed using a recurrent neural networks (RNN), which is akin to a long short term memory network. In other words, the system may be configured to build up the convolutional neural net, and on top of that, the RNN is placed. Traditional neural nets are feed forward in design, static in time; given an image or pair of images, they give you an answer. With the RNN, the output of a layer is added to the next input and fed back into the same layer again—which typically is the only layer in the net; can be envisioned as a "passage through time"—at each point in time, the same net layer is reconsidering a slightly temporally tuned input, and this cycle is repeated. Further, unlike feed forward nets, an RNN can receive a sequence of values as an input (e.g., sequenced over time)—and can also produce a sequence of values as output. The simple structure of the RNN with built in feedback loop that allows it to behave like a forecasting engine, and the result when combined with the convolutional neural net in this embodiment is that the system can take relatively noisy trajectory data from the convolutional neural net, push it through the RNN, and it will output a trajectory that is much smoother, much more like human motion, such as motion of a user's head which may be coupled to a head mounted component (58) of a wearable computing system.

The system may also be configured to determine depth of an object from a stereo pair of images, wherein you have a deep network and left and right images are input. The convolutional neural net may be configured to output the disparity between left and right cameras (such as between left eye camera and right eye camera on a head mounted component 58); the determined disparity is the inverse of the depth if the focal distance of the cameras is known, so the system can be configured to efficiently calculate depth having the disparity information; then meshing and other processes may be conducted without involving alternative components for sensing depth, such as depth sensors, which may require relatively high computing and power resource loads.

As regards semantic analysis and the application of deep networks to various embodiments of the subject augmented reality configurations, several areas are of particular interest and applicability, including but not limited to detection of gestures and keypoints, face recognition, and 3-D object recognition.

With regard to gesture recognition, in various embodiments the system is configured to recognize certain gestures by a user's hands to control the system. In one embodiment, the embedded processor may be configured to utilize what are known as "random forests" along with sensed depth information to recognize certain gestures by the user. A random forest model is a nondeterministic model which may use a fairly large library of parameters, and may use relatively large processing capacity and therefore power demand. Further, depth sensors may not always be optimally suited for reading hand gestures with certain backgrounds, such as desk or tabletops or walls which are near to the depth of the subject hand, due to noise limitations with certain depth sensors and inabilities to determine differences between, for example, 1 or 2 cm in depth accurately. In certain embodiments, random forest type of gesture recognition may be replaced with deep learning networks. One of the challenges in utilizing deep networks for such a configuration is in labelling portions of the image information, such as pixels, as "hand" or "not hand"; training and utilizing deep networks with such segmentation challenges may require doing segmentations with millions of images, which is very expensive and time consuming. To address this, in one embodiment, during training time, a thermal camera, such as those available for military or security purposes, may be coupled to the conventional outward-facing camera, such that the thermal camera essentially does the segmentation of "hand" and "no hand" itself by showing which portions of the image are hot enough to be human hand, and which are not.

With regard to face recognition, and given that the subject augmented reality system is configured to be worn in a social setting with other persons, understanding who is around the user may be of relatively high value—not only for simply identifying other nearby persons, but also for adjusting the information presented (for example, if the system identifies a nearby person as an adult friend, it may suggest that you play chess and assist in that; if the system identifies a nearby person as your child, it may suggest that you go and play soccer and may assist in that; if the system fails to identify a nearby person, or identifies them as a known danger, the user may be inclined to avoid proximity with such person). In certain embodiments, deep neural network configurations may be utilized to assist with face recognition, in a manner similar to that discussed above in relation to deep relocalization. The model may be trained with a plurality of different faces pertinent to the user's life, and then when a face comes near the system, such as near the head mounted component (58), the system can take that face image in pixel space, translate it, for example, into a 128-dimensional vector, and then use vectors as points in high dimensional space to figure out whether this person is present in your known list of people or not. In essence, the system may be configured to do a "nearest neighbor" search in that space, and as it turns out, such a configuration can be very accurate, with false positive rates running in the 1 out of 1,000 range.

With regard to 3-D object detection, in certain embodiments, it is useful to have a deep neural network incorporated which will tell the user about the space they are in from a 3-dimensional perspective (e.g., not only walls, floors, ceiling, but also objects populating the room, such as couches, chairs, cabinets, and the like—not just from a traditional 2-dimensional sense, but from a true 3-dimensional sense). For example, in one embodiment it is desirable for a user to have a model which understands the true volumetric bounds of a couch in the room—so that the user knows what volume is occupied by the volume of the couch in the event that a virtual ball or other object is to be thrown, for example. A deep neural network model may be utilized to form a cuboid model with a high level of sophistication.

In certain embodiments, deep reinforcement networks, or deep reinforcement learning, may be utilized to learn effectively what an agent should be doing in a specific context, without the user ever having to directly tell the agent. For example, if a user wants to always have a virtual representation of his dog walking around the room that he is occupying, but he wants the dog representation to always be visible (e.g., not hidden behind a wall or cabinet), a deep reinforcement approach may turn the scenario into a game of sorts, wherein the virtual agent (here a virtual dog) is allowed to roam around in the physical space near the user, but during training time, a reward is given if the dog stays in acceptable locations from, say T0 to T1, and a penalty is given if the user's view of the dog becomes occluded, lost, or the dog bumps into a wall or object. With such an embodiment, the deep network starts learning what it needs to do to win points rather than lose points, and pretty soon it knows what it needs to know to provide the desired function.

The system may also be configured to address lighting of the virtual world in a manner that approximates or matches the lighting of the actual world around the user. For example, to make a virtual perception blend in as optimally as possible with actual perception in augmented reality, lighting color, shadowing, and lighting vectoring is reproduced as realistically as possible with the virtual objects. In other words, if a virtual opaque coffee cup is to be positioned upon an actual tabletop in a room with yellow-ish tinted light coming from one particular corner of the room that creates shadowing from the real world objects on the real world table, then optimally the light tinting and shadowing of the virtual coffee cup would match the actual scenario. In certain embodiments, a deep learning model may be utilized to learn the illumination of an actual environment in which the system component is placed. For example, a model may be utilized that, given an image or sequences of images from the actual environment, learns the illumination of the room to determine factors such as brightness, hue, and vectoring by one or more light sources. Such a model may be trained from synthetic data, and from images captured from the user's device, such as from the user's head mounted component (58).

Example Hydra Architecture

Figure 29:
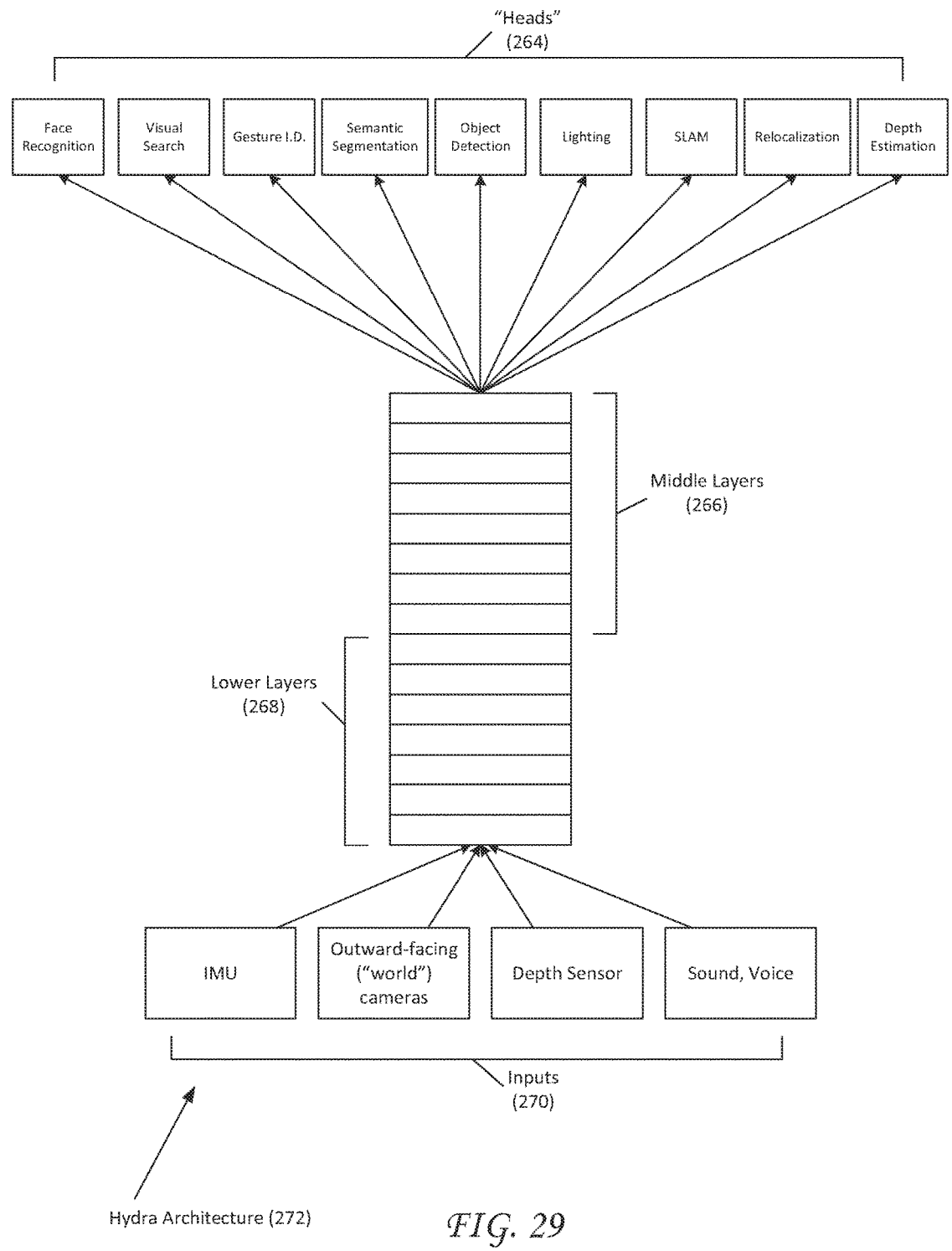
FIG. 29 schematically illustrates an example of a Hydra neural network architecture.

Referring to FIG. 29, a deep learning network architecture which may be called a "Hydra" architecture (272) is illustrated. With such a configuration, a variety of inputs (270), such as IMU data (from accelerometers, gyros, magnetometers), outward-facing camera data, depth sensing camera data, and/or sound or voice data may be channeled to a multilayer centralized processing resource having a group or a plurality of lower layers (268) which conduct a significant portion of the overall processing, pass their results to a group or a plurality of middle layers (266), and ultimately to one or more of a plurality of associated "heads" (264) representing various process functionalities, such as face recognition, visual search, gesture identification, semantic segmentation, object detection, lighting detection/determination, SLAM, relocalization, and/or depth estimation (such as from stereo image information, as discussed above). Occurrence, determination, or identification of a gesture, an object, relocation, or a depth (or any state associated with any of the functionalities) can be referred to as an event associated with a particular functionality. In wearable display systems, the Hydra architecture may be implemented on and performed by the local processing and data module 70 or the remote processing module and data repository 72, 74, in various embodiments. The plurality of lower layers (268) and middle layers (266) can be referred to as a plurality of intermediate layers.

Conventionally, when using deep networks to achieve various tasks, an algorithm will be built for each task. Thus if it desired to recognize automobiles, then an algorithm will be built for that; if it is desired to recognize faces, then an algorithm will be built for that; and these algorithms may be run simultaneously. If unlimited or high levels of power and computation resource are available, then such a configuration will work well and get results; but in many scenarios, such as the scenario of a portable augmented reality system with a limited power supply and limited processing capability in an embedded processor, computing and power resources can be relatively limited, and it may be desirable to process certain aspects of the tasks together. Further, if one algorithm has knowledge from another, then it may make the second algorithm better in some embodiments. For example, if one deep network algorithm knows about dogs and cats, knowledge transfer (also termed "domain adaptation") from that may help another algorithm recognize shoes better. So there is reason to have some kind of crosstalk between algorithms during training and inference.

Further, there is a consideration related to algorithm design and modification. Preferably if further capabilities are needed relative to an initial version of an algorithm, one will not need to completely rebuild a new one from scratch. The depicted Hydra architecture (272) may be utilized to address these challenges, as well as the computing and power efficiency challenge, because as noted above, it is the case that there are common aspects of certain computing processes that can be shared. For example, in the depicted Hydra architecture (272), inputs (270), such as image information from one or more cameras, may be brought into the lower layers (268) where feature extraction on a relatively low level may be conducted. For example, Gabor functions, derivatives of Gaussians, things that basically effect lines, edges, corners, colors—these are uniform for many problems at the low level. Thus, regardless of task variation, low level feature extraction can be the same, whether it is the objective to extract cats, cars, or cows—and therefore the computation related thereto can be shared. Hydra architecture (272) is a high-level paradigm which allows knowledge sharing across algorithms to make each better, it allows for feature sharing so that computation can be shared, reduced, and not redundant, and allows one to be able to expand the suite of capabilities without having to rewrite everything—rather, new capabilities may be stacked upon the foundation with the existing capabilities.

Thus, as noted above, in the depicted embodiment, the Hydra architecture represents a deep neural network that has one unified pathway. The bottom layers (268) of the network are shared, and they extract basic units of visual primitives from input images and other inputs (270). The system may be configured to go through a few layers of convolutions to extract edges, lines, contours, junctions, and the like. The basic components that programmers used to feature-engineer, now become learned by the deep network. As it turns out, these features are useful for many algorithms, whether the algorithm is face recognition, tracking, etc. Thus once the lower computational work has been done and there is a shared representation from images or other inputs into all of the other algorithms, then there can be individual pathways, one per problem or functionality. Thus on top of this shared representation, there is a pathway that leads to face recognition that is very specific to faces, there's a pathway that leads to tracking that is very specific to SLAM, and so on for the other "heads" (264) of the architecture (272). With such an embodiment, one has all of this shared computation that allows for multiplying additions basically, and on the other hand one has very specific pathways that are on top of the general knowledge and allow one to fine tune and find answers to very specific questions.

Also of value with such a configuration is the fact that such neural networks are designed so that the lower layers (268), which are closer to the input (270), utilize more computation, because at each layer of computation, the system takes the original input and transforms it into some other dimensional space where typically the dimensionality of things is reduced. So once the fifth layer of the network from the bottom layer is achieved, the amount of computation may be in the range of 5, 10, 20, 100 (or more) times less than what was utilized in the lowest level (e.g., because the input was much larger and much larger matrix multiplication was used). In one embodiment, by the time the system has extracted the shared computation, it's fairly agnostic to the problems that need to be solved. A large portion of the computation of almost any algorithm has been completed in the lower layers, so when new pathways are added for face recognition, tracking, depth, lighting, and the like, these contribute relatively little to the computational constraints—and thus such an architecture provides plenty of capability for expansion. In one embodiment, for the first few layers, there may be no pooling to retain the highest resolution data; middle layers may have pooling processes because at that point, high resolution is not needed (for example, high resolution is not needed to know where the wheel of a car is in a middle layer; the network generally needs to know where the nut and bolt are located from the lower levels in high resolution, and then the image data can be significantly shrunk as it is passed to the middle layers for location of the wheel of the car). For example the features generated in the lower levels comprise features having a first resolution, and the features generated in the middle layers comprise features having a second resolution that is less than the first resolution. Further, once the network has all of the learned connections, everything is loosely wired and the connections are advantageously learned through the data. The middle layers (266) may be configured to start learning parts, for example—object parts, face features, and the like; so rather than simple Gabor functions, the middle layers are processing more complex constructs or higher level features (e.g., squiggly shapes, shading, etc.). Then as the process moves higher toward the top, there are split-offs into the unique head components (264), some of which may have many layers, and some of which may have few. The layers of a head component (264) can be referred to a head component layers. Again, the scalability and efficiency is largely due to the fact that a large portion, such as 90%, of the processing power (e.g., measured in floating point operations per second (flops)) are within the lower layers (268), then a small portion, such as 5% of the flops, are at the middle layers (266), and another 5% is in the heads (264).

Such networks may be pre-trained using information that already exists. For example, in one embodiment, ImageNet, a large group (in the range of 10 million) of images from a large group of classes (in the range of 1,000) may be utilized to train all of the classes. In one embodiment, once it's trained, the top layer that distinguishes the classes may be thrown out, but all of the weights learned in the training process are kept.

The process of training a neural network with a hydra architecture (272) involves presenting the network with both input data and corresponding target output data. This data, comprising both example inputs and target outputs, can be referred to as a training set. Through the process of training, the weights of the network, including weights associated with the lower layers (268), the middle layers (266), and the head components (264) can be incrementally or iteratively adapted such that the output of the network, given a particular input data from the training set, comes to match (e.g., as closely as possible) the target output corresponding to that particular input data.

Example NNs

A layer of a neural network (NN), such as a deep neural network (DNN) can apply a linear or non-linear transformation to its input to generate its output. A deep neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if x≥0 and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in the lower layers (268) or the middle layers (266)

can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n× m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

Additional Aspects and Advantages

In a 1st aspect, a head mounted display system is disclosed. The head mounted display system comprises: a plurality of sensors for capturing different types of sensor data; non-transitory memory configured to store: executable instructions, and a deep neural network for performing a plurality of functionalities associated with a user using the sensor data captured by the plurality of sensors, wherein the deep neural network comprises an input layer for receiving input of the deep neural network, a plurality of lower layers, a plurality of middle layers, and a plurality of head components for outputting results of the deep neural network associated with the plurality of functionalities, wherein the input layer is connected to a first layer of the plurality lower layers, wherein a last layer of the plurality of lower layers is connected to a first layer of the middle layers, wherein a head component of the plurality of head components comprises a head output node, and wherein the head output node is connected to a last layer of the middle layers through a plurality of head component layers representing a unique pathway from the plurality of middle layers to the head component; a display configured to display information related to at least one functionality of the plurality of functionalities to the user; and a hardware processor in communication with the plurality of sensors, the non-transitory memory, and the display, the hardware processor programmed by the executable instructions to: receive the different types of sensor data from the plurality of sensors; determine the results of the deep neural network using the different types of sensor data; and cause display of the information related to the at least one functionalities of the plurality of functionalities to the user.

In a 2nd aspect, the system of aspect 1, wherein the plurality of sensors comprises an inertial measurement unit, an outward-facing camera, a depth sensing camera, a microphone, or any combination thereof.

In a 3rd aspect, the system of any one of aspects 1-2, wherein the plurality of functionalities comprises face recognition, visual search, gesture identification, semantic segmentation, object detection, lighting detection, simultaneous localization and mapping, relocalization, or any combination thereof.

In a 4th aspect, the system of any one of aspects 1-3, wherein the plurality of lower layers is trained to extract lower level features from the different types of sensor data.

In a 5th aspect, the system of aspect 4, wherein the plurality of middle layers is trained to extract higher level features from the lower level features extracted.

In a 6th aspect, the system of aspect 5, the head component uses a subset of the higher level features to determine the at least one event of the plurality of events.

In a 7th aspect, the system of any one of aspects 1-6, the head component is connected to a subset of the plurality of middle layers through the plurality of head component layers.

In a 8th aspect, the system of any one of aspects 1-7, the head component is connected to each of the plurality of middle layers through the plurality of head component layers.

In a 9th aspect, the system of any one of aspects 1-8, wherein a number of weights associated with the plurality of lower layers is more than 50% of weights associated with the deep neural network, and wherein a sum of a number of weights associated with the plurality of middle layers and a number of weights associated with the plurality of head components is less than 50% of the weights associated with the deep neural network.

In a 10th aspect, the system of any one of aspects 1-9, wherein computation associated with the plurality of lower layers is more than 50% of total computation associated with the deep neural network, and wherein computation associated with the plurality of middle layers and the plurality of head components is less than 50% of the computation involving the deep neural network.

In a 11th aspect, the system of any one of aspects 1-10, wherein the plurality of lower layers, the plurality of middle layers, or the plurality of head component layers comprises a convolution layer, a brightness normalization layer, a batch normalization layer, a rectified linear layer, an upsampling layer, a concatenation layer, a fully connected layer, a linear fully connected layer, a softsign layer, a recurrent layer, or any combination thereof.

In a 12th aspect, the system of any one of aspects 1-11, wherein the plurality of middle layers or the plurality of head component layers comprises a pooling layer.

In a 13th aspect, a system for training a neural network for determining a plurality of different types of events is disclosed. The system comprises: computer-readable memory storing executable instructions; and one or more processors programmed by the executable instructions to at least: receive different types of sensor data, wherein the sensor data is associated with a plurality of different types of events; generate a training set comprising the different types of sensor data as input data and the plurality of different types of events as corresponding target output data; and train a neural network, for determining a plurality of different types of events, using the training set, wherein the neural network comprises an input layer for receiving input of the neural network, a plurality of intermediate layers, and a plurality of head components for outputting results of the neural network, wherein the input layer is connected to a first layer of the plurality intermediate layers, wherein a head component of the plurality of head components comprises a head output node, and wherein the head output node is connected to a last layer of the intermediate layers through a plurality of head component layers.

In a 14th aspect, the system of aspect 13, wherein the different types of sensor data comprises inertial measurement unit data, image data, depth data, sound data, voice data, or any combination thereof.

In a 15th aspect, the system of any one of aspects 13-14, wherein the plurality of different types of events comprises face recognition, visual search, gesture identification, semantic segmentation, object detection, lighting detection, simultaneous localization and mapping, relocalization, or any combination thereof.

In a 16th aspect, the system of any one of aspects 13-15, wherein the plurality of intermediate layers comprises a plurality of lower layers and a plurality of middle layers, wherein the plurality of lower layers is trained to extract lower level features from the different types of sensor data, and wherein the plurality of middle layers is trained to extract the higher level features from the lower level features extracted.

In a 17th aspect, the system of any one of aspects 13-16, the head component is connected to a subset of the plurality of intermediate layers through the plurality of head component layers.

In a 18th aspect, the system of any one of aspects 13-17, the head component is connected to each of the plurality of intermediate layers through the plurality of head component layers.

In a 19th aspect, the system of any one of aspects 13-18, wherein the plurality of intermediate layers or the plurality of head component layers comprises a convolution layer, a brightness normalization layer, a batch normalization layer, a rectified linear layer, an upsampling layer, a pooling layer, a concatenation layer, a fully connected layer, a linear fully connected layer, a softsign layer, a recurrent layer, or any combination thereof.

In a 20th aspect, the system of any one of aspects 13-19, wherein the one or more processors is further programmed by the executable instructions to at least: receive a second different type of sensor data, wherein the second different type of sensor data is associated with a second different type of events; generate a retraining set comprising the second different type of sensor data as input data and the second different type of events as corresponding target output data; and retrain the neural network, for determining the second different type of events, using the retraining set, wherein a second head component of the plurality of head components comprises a second head output node for outputting results associated with the second different type of events, and wherein the head output node is connected to the last layer of the intermediate layers through a plurality of second head component layers.

In a 21st aspect, the system of aspect 20, wherein to retrain the neural network, the one or more processors are programmed by the executable instructions to at least: update weights associated with the plurality of second head component layers.

In a 22nd aspect, the system of aspect 20, wherein the neural network is retrained without updating weights associated with the plurality of intermediate layers.

In a 23rd aspect, the system of any one of aspects 13-22, wherein the plurality of different types of sensor data is associated with a second different types of events, and wherein the one or more processors is further programmed by the executable instructions to at least: generate a retraining set comprising the different types of sensor data as input data and the second different type of events as corresponding target output data; and retrain the neural network, for determining the second different type of events, using the retraining set.

In a 24th aspect, the system of aspect 23, wherein to retrain the neural network, the one or more processors are programmed by the executable instructions to at least: update weights associated with the plurality of second head component layers.

In a 25th aspect, the system of any one of aspects 23-24, wherein the neural network is retrained without updating weights associated with the plurality of intermediate layers.

In a 26th aspect, a method is disclosed. The method is under control of a hardware processor and comprises: receiving different types of training sensor data, wherein the training sensor data is associated with a plurality of different types of events; generating a training set comprising the different types of training sensor data as input data and the plurality of different types of events as corresponding target output data; and training a neural network, for determining a plurality of different types of events, using the training set, wherein the neural network comprises an input layer for receiving input of the neural network, a plurality of intermediate layers, and a plurality of head components for outputting results of the neural network, wherein the input layer is connected to a first layer of the plurality intermediate layers, wherein a head component of the plurality of head components comprises a head output node, and wherein the head output node is connected to a last layer of the intermediate layers through a plurality of head component layers.

In a 27th aspect, the method of aspect 26, wherein the different types of training sensor data comprises inertial measurement unit data, image data, depth data, sound data, voice data, or any combination thereof.

In a 28th aspect, the method of any one of aspects 26-27, wherein the plurality of different types of events comprises face recognition, visual search, gesture identification, semantic segmentation, object detection, lighting detection, simultaneous localization and mapping, relocalization, or any combination thereof.

In a 29th aspect, the method of any one of aspects 26-28, wherein the plurality of intermediate layers comprises a plurality of lower layers and a plurality of middle layers.

In a 30th aspect, the method of aspect 29, wherein the plurality of lower layers is trained to extract lower level features from the different types of training sensor data.

In a 31st aspect, the method of aspect 30, wherein the plurality of middle layers is trained to extract higher level features from the lower level features extracted.

In a 32nd aspect, the method of any one of aspects 26-31, wherein a number of weights associated with the plurality of lower layers is more than 50% of weights associated with the neural network, and wherein a sum of a number of weights associated with the plurality of middle layers and a number of weights associated with the plurality of head components is less than 50% of the weights associated with the neural network.

In a 33rd aspect, the method of any one of aspects 26-32, wherein computation associated with the plurality of lower layers when training the neural network is more than 50% of total computation associated with training the neural network, and wherein computation associated with the plurality of middle layers and the plurality of head components is less than 50% of the computation involving the neural network.

In a 34th aspect, the method of any one of aspects 26-33, wherein the plurality of intermediate layers or the plurality of head component layers comprises a convolution layer, a brightness normalization layer, a batch normalization layer, a rectified linear layer, an upsampling layer, a pooling layer, a concatenation layer, a fully connected layer, a linear fully connected layer, a softsign layer, a recurrent layer, or any combination thereof.

In a 35th aspect, the method of any one of aspects 26-34, further comprising: receiving a second different type of training sensor data, wherein the second different type of training sensor data is associated with a second different type of events; generating a retraining set comprising the second different type of training sensor data as input data and the second different type of events as corresponding target output data; and retraining the neural network, for determining the second different type of events, using the retraining set, wherein a second head component of the plurality of head components comprises a second head output node for outputting results associated with the second different type of events, and wherein the head output node is connected to the last layer of the intermediate layers through a plurality of second head component layers.

In a 36th aspect, the method of aspect 35, wherein to retrain the neural network, the one or more processors are programmed by the executable instructions to at least: update weights associated with the plurality of second head component layers.

In a 37th aspect, the method of aspect 35, wherein the neural network is retrained without updating weights associated with the plurality of intermediate layers.

In a 38th aspect, the method of any one of aspects 26-37, wherein the plurality of different types of training sensor data is associated with a second different types of events, the method further comprising: generating a retraining set comprising the different types of training sensor data as input data and the second different type of events as corresponding target output data; and retraining the neural network, for determining the second different type of events, using the retraining set.

In a 39th aspect, the method of any one of aspects 26-38, further comprising: receiving different types of user sensor data corresponding to the different types of training sensor data; and determining, using the neural network and the different types of user sensor data, an event of the plurality of different types of events. In a 40th aspect, the method of aspect 39, further comprising displaying information related to the event.

In a 40th aspect, a wearable display system comprising a first sensor configured to operate at a first frequency, a second sensor configured to operate at a second frequency, the second frequency lower than the first frequency, a hardware processor programmed to receive a first input from the first sensor and a second input from the second sensor, filter the first input and the second input, and output a filtered result. In some embodiments, to filter the first input in the second input, the hardware processor is programmed to utilize an extended Kalman filter.

In a 41st aspect, a wearable display system comprising a plurality of sensors, and a hardware processor programmed to receive input from each of the plurality of sensors, evaluate a Hydra neural network architecture, and generate a plurality of functional outputs. The Hydra neural network can comprise a plurality of lower layers configured to receive the input from each of the plurality of sensors and to extract a plurality of lower-level features, a plurality of middle layers configured to receive input from the plurality of lower layers and to extract a plurality of higher-level features, the higher-level features having a resolution that is less than the lower-level features, and a plurality of heads configured to receive input from the middle layers and to generate the plurality of functional outputs. The plurality of sensors can include an inertial measurement unit (IMU), an outward-facing camera, a depth sensor, or an audio sensor. The plurality of functional outputs can include face recognition, visual search, gesture identification, semantic segmentation, object detection, lighting, localization and mapping, relocalization, or depth estimation. In some aspects, the lower layers do not include a pooling layer, whereas the middle layers do include a pooling layer. In some aspects, the Hydra neural network architecture is configured such that the lower layers perform a first fraction of the computation of the neural network, the middle layers perform a second fraction of the computation of the neural network, and the heads perform a third fraction of the computation of the neural network, where the first fraction is greater than the second fraction or the third fraction by a factor in a range from 5 to 100.

Additional Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Except as specifically defined herein, all technical and scientific terms used herein are to be given as broad a commonly understood meaning as possible while maintaining claim validity. It is further noted that the claims may be drafted to exclude any optional element.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A head mounted display system comprising:
 a plurality of sensors for capturing different types of sensor data, each of the plurality of sensors disposed on a frame of the head mounted display system, the frame configured to be worn on the head of a user and to position a display system in front of the eyes of the user, the plurality of sensors comprising an outward-facing camera configured to obtain face images;
 non-transitory memory configured to store
  executable instructions, and
  a deep neural network for performing face recognition and lighting detection using the sensor data captured by the plurality of sensors,
   wherein the deep neural network comprises an input layer for receiving input of the deep neural network, a plurality of lower layers, a plurality of middle layers, and a plurality of head components for outputting results of the deep neural network associated with the face recognition and the lighting detection,
   wherein the input layer is connected to a first layer of the plurality lower layers,
   wherein a last layer of the plurality of lower layers is connected to a first layer of the middle layers,
   wherein a head component of the plurality of head components comprises a head output node, and
   wherein the head output node is connected to a last layer of the middle layers through a plurality of head component layers representing a unique pathway from the plurality of middle layers to the head component;
 a display configured to display information related to the face recognition and the lighting detection; and
 a hardware processor in communication with the plurality of sensors, the non-transitory memory, and the display, the hardware processor programmed by the executable instructions to:
  receive the different types of sensor data from the plurality of sensors;
  determine the results of the deep neural network using the different types of sensor data; and
  cause display of the information related to the face recognition and the lighting detection.

2. The system of claim 1, wherein the plurality of sensors comprises an inertial measurement unit, a depth sensing camera, a microphone, an eye imaging camera, or any combination thereof.

3. The system of claim 1, wherein the plurality of lower layers is trained to extract lower level features from the different types of sensor data.

4. The system of claim 3, wherein the plurality of middle layers is trained to extract higher level features from the lower level features extracted.

5. The system of claim 3, the head component uses a subset of the higher level features to determine the face recognition or the lighting detection.

6. The system of claim 1, the head component is connected to a subset of the plurality of middle layers through the plurality of head component layers.

7. The system of claim 1,
 wherein a number of weights associated with the plurality of lower layers is more than 50% of weights associated with the deep neural network, and
 wherein a sum of a number of weights associated with the plurality of middle layers and a number of weights associated with the plurality of head components is less than 50% of the weights associated with the deep neural network.

8. The system of claim 1,
 wherein a computation associated with the plurality of lower layers is more than 50% of a total computation associated with the deep neural network, and
 wherein a computation associated with the plurality of middle layers and the plurality of head components is less than 50% of the total computation associated with the deep neural network.

9. The system of claim 1, wherein the plurality of lower layers, the plurality of middle layers, or the plurality of head component layers comprises a convolution layer, a brightness normalization layer, a batch normalization layer, a rectified linear layer, an upsampling layer, a concatenation layer, a fully connected layer, a linear fully connected layer, a softsign layer, a recurrent layer, or any combination thereof.

10. The system of claim 1, wherein the plurality of middle layers or the plurality of head component layers comprises a pooling layer.

* * * * *